(12) United States Patent
Sato et al.

(10) Patent No.: US 11,327,906 B2
(45) Date of Patent: *May 10, 2022

(54) STORAGE DEVICE HAVING A WIRELESS COMMUNICATION FUNCTION

(71) Applicant: KIOXIA CORPORATION, Tokyo (JP)

(72) Inventors: Keisuke Sato, Kanagawa (JP);
Masaomi Teranishi, Kanagawa (JP);
Shuichi Sakurai, Kanagawa (JP);
Masahiko Nakashima, Kanagawa (JP);
Shigeki Koizumi, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 18 days.

This patent is subject to a terminal disclaimer.

(21) Appl. No.: 16/901,983

(22) Filed: Jun. 15, 2020

(65) Prior Publication Data

US 2020/0310991 A1 Oct. 1, 2020

Related U.S. Application Data

(62) Division of application No. 15/253,884, filed on Sep. 1, 2016, now Pat. No. 10,719,457.

(30) Foreign Application Priority Data

Sep. 30, 2015 (JP) .................................. 2015-193341
May 9, 2016 (JP) .................................. 2016-093885

(51) Int. Cl.
*G06F 12/00* (2006.01)
*G06F 13/16* (2006.01)
(Continued)

(52) U.S. Cl.
CPC .......... *G06F 13/16* (2013.01); *G06F 12/1441* (2013.01); *G06F 12/1458* (2013.01);
(Continued)

(58) Field of Classification Search
CPC ...... G06F 13/16; G06F 12/1458; G06F 21/44; G06F 2212/1052; G06F 21/79;
(Continued)

(56) References Cited

U.S. PATENT DOCUMENTS 7,250,867 B2 7/2007 Sakama et al.
7,482,934 B2 1/2009 Nakamura et al.
(Continued)

FOREIGN PATENT DOCUMENTS

CN 101576858 A 11/2009
CN 102946484 A 2/2013
(Continued)

OTHER PUBLICATIONS

"SanDisk Introduces Wifi combo CF cards", 2003, Digital Photography Review, all; retrieved from: https://www.dpreview.com/articles/0529287241/sandiskwifi (Year: 2003).
(Continued)

*Primary Examiner* — Arvind Talukdar
(74) *Attorney, Agent, or Firm* — Kim & Stewart LLP

(57) ABSTRACT

A storage device includes an antenna, a first nonvolatile memory that is operable using power generated at the antenna by an electromagnetic induction caused by an external device, and stores lock state information, a first controller configured to change the lock state information in response to a command that is wirelessly transmitted from the external device through the antenna, a second nonvolatile memory, and a second controller configured to allow access to a memory region of the second nonvolatile memory depending on the lock state information stored in the first nonvolatile memory.

19 Claims, 24 Drawing Sheets

(51) Int. Cl.
*G06F 12/14* (2006.01)
*G06F 21/44* (2013.01)
*G06F 21/62* (2013.01)
*G06F 12/0873* (2016.01)

(52) U.S. Cl.
CPC .......... *G06F 21/44* (2013.01); *G06F 21/6209* (2013.01); *G06F 12/0873* (2013.01); *G06F 12/14* (2013.01); *G06F 12/145* (2013.01); *G06F 12/1408* (2013.01); *G06F 12/1425* (2013.01); *G06F 12/1433* (2013.01); *G06F 12/1466* (2013.01); *G06F 12/1475* (2013.01); *G06F 12/1483* (2013.01); *G06F 12/1491* (2013.01); *G06F 2212/1052* (2013.01); *G06F 2212/402* (2013.01); *G06F 2212/466* (2013.01); *Y04S 40/20* (2013.01)

(58) Field of Classification Search
CPC .......... G06F 12/1441; G06F 2212/402; G06F 12/0873; G06F 2212/466; G06F 12/14; G06F 12/1408; G06F 12/1416; G06F 12/1425; G06F 12/1433; G06F 12/145; G06F 12/1466; G06F 12/1475; G06F 12/1483; G06F 12/1491; Y04S 40/20
See application file for complete search history.

(56) References Cited

U.S. PATENT DOCUMENTS

| | | | |
|---|---|---|---|
| 9,269,038 | B2 | 2/2016 | Ikemoto et al. |
| 9,396,429 | B2 | 7/2016 | Sato |
| 2007/0226402 | A1 | 9/2007 | Kohinata et al. |
| 2007/0252706 | A1 | 11/2007 | Furutani |
| 2008/0155217 | A1 | 6/2008 | Kato et al. |
| 2008/0303631 | A1 | 12/2008 | Beekley et al. |
| 2011/0131662 | A1 | 6/2011 | Matsuoka |
| 2013/0024679 | A1 | 1/2013 | Isozaki |
| 2013/0031614 | A1 | 1/2013 | Cossard et al. |
| 2014/0226293 | A1 | 8/2014 | Sato |
| 2014/0246504 | A1 | 9/2014 | Ikemoto et al. |
| 2014/0259153 | A1 | 9/2014 | Le et al. |
| 2015/0107316 | A1 | 4/2015 | Kirkjan |
| 2016/0284148 | A1 | 9/2016 | Almomani |
| 2017/0085546 | A1 | 3/2017 | Velusamy |

FOREIGN PATENT DOCUMENTS

| | | |
|---|---|---|
| CN | 104915707 A | 9/2015 |
| JP | 2005210676 A | 8/2005 |
| JP | 2007025870 A | 2/2007 |
| JP | 2007241539 A | 9/2007 |
| JP | 2010055371 A | 3/2010 |
| JP | 4667397 B2 | 4/2011 |
| JP | 2014154777 A | 8/2014 |
| JP | 2014174980 A | 9/2014 |
| JP | 2015170355 A | 9/2015 |
| WO | 2006075359 A1 | 7/2006 |
| WO | 2015057161 A1 | 4/2015 |

OTHER PUBLICATIONS

"Flash Programming Solutions for the TMS320F28xxx DSCs", 2008, Texas Instruments; retrieved from: http://www.ti.com/lit/an/spraal3.pdf (Year: 2008).

"Low-Power SoC with MCU, Memory, 2.4 Ghz RF Transceiver, and USB Controller", 2013, Texas Instruments, retrieved from: http://www.ti.com/lit/ds/symlink/cc2511 .pdf (Year: 2013).

Jain, "Safety & security architecture for automotive ICs", 2013, EDN Network, retrieved from: https://www.edn.com/design/automotive/4421704/Safety----security-architecture-for-automotive-ICs (Year: 2013).

Rajput, "How to design secure USB-based dongls", 2011, EE Times, all; retrieved from : https://www.eetimes.com/document.asp?doc_id=1279307&print=yes (Year: 2011).

"Flash Memory Guide", 2015, Kingston Technology; retrieved from: http://media.kingston.com/pdfs/MKF_283.1_Flash_Memory_Guide_US.pdf (Year: 2015).

Schultz, "10 Cool Things you can do with a flash drive", 2009, Tech Republic; retrieved from: https://www.techrepublic.com/blog/10-things/10-cool-things-you-can-do-with-a-usb-flash-drive/ (Year:2009).

Jeong, "Vulnerability Analysis of Secure USB Flash Drives", 2007, all, IEEE; retrieved from: https://ieeexplore.ieee.org/stamp/stamp.jsp?tp=&arnumber=4547620 (Year: 2007).

Chakrabarty et al., "Atlas: Leveraging Lock for Non-volatile Memory Consistency", 2014, all, Hewlett Packard; retrieved from : https://www.hpl.hp.com/techreports/2013/HPL-2013-78.pdf (Year: 2014).

"Motorola MC9090 Device Reset Instructions", 2015, all, Motoroola; retrieved from: http://www.redbeam.com/knowledgebase/motorola-mc9090-device-reset/ (Year: 2015).

Bai, "Microcontroller Engineering with MSP432", 2016, CRC Press, sections 6.5.1.2-6.5.1.3; retrieved from: http://mirknig.su.knigi/apparatura/92059-microcontroller-engineering-with-msp432-fundamentals-and-application.html (Year: 2016).

Chen et al., "Antennas for RFID Applications", 2010, IEEE all; retrieved from: https://ieeexplore.ieee.org/stamp/stamp/stamp.jsp?arnumber=5464865 (Year: 2010).

Pavel, "Smart Lock System", 2015, Vaasan Ammattikorkeakoulu University of Applied Sciences, pp. 25, 31,36; retrieved; from: https://www.theseus.fi/bitstream/handle/10024/98023/Stogu_Pavel.pdf?sequence=1 (Year: 2015).

Sauter, "Beyond 3G—Bringing Networks, Terminals and the Web Together", 2009, Wiley, pp. 101-104; retrieved from: https://onlinelibrary.wiley.com/doi/book/10.1002/9780470741085 (Year: 2008).

Saini et al. "Securing flash memory in automotive applications", 2015, Embedded Systems Conference, all; retrieved from: https://www.embedded.com/design/safety-and-security/4439301/Securing-flash-memory-in-automotive-applications# (Year: 2015).

Colp et al. "Protecting Data on Smartphones and Tablets from Memory Attack", 2015, ACM, all; retrieved from: https://dl.acm.org/citation,cfm?id=2694380 (Year: 2015).

Chen, "Antennas for portable devices", 2007, Wiley, p. 59-111; Retrievable from: https://onlinelibrary.wiley.com/doi/book/10.1002/9780470319642 (Year: 2007).

Japanese Office Action dated Apr. 5, 2018, filed in Japanese counterpart Application No. 2016-093885, 18 pages (with translation).

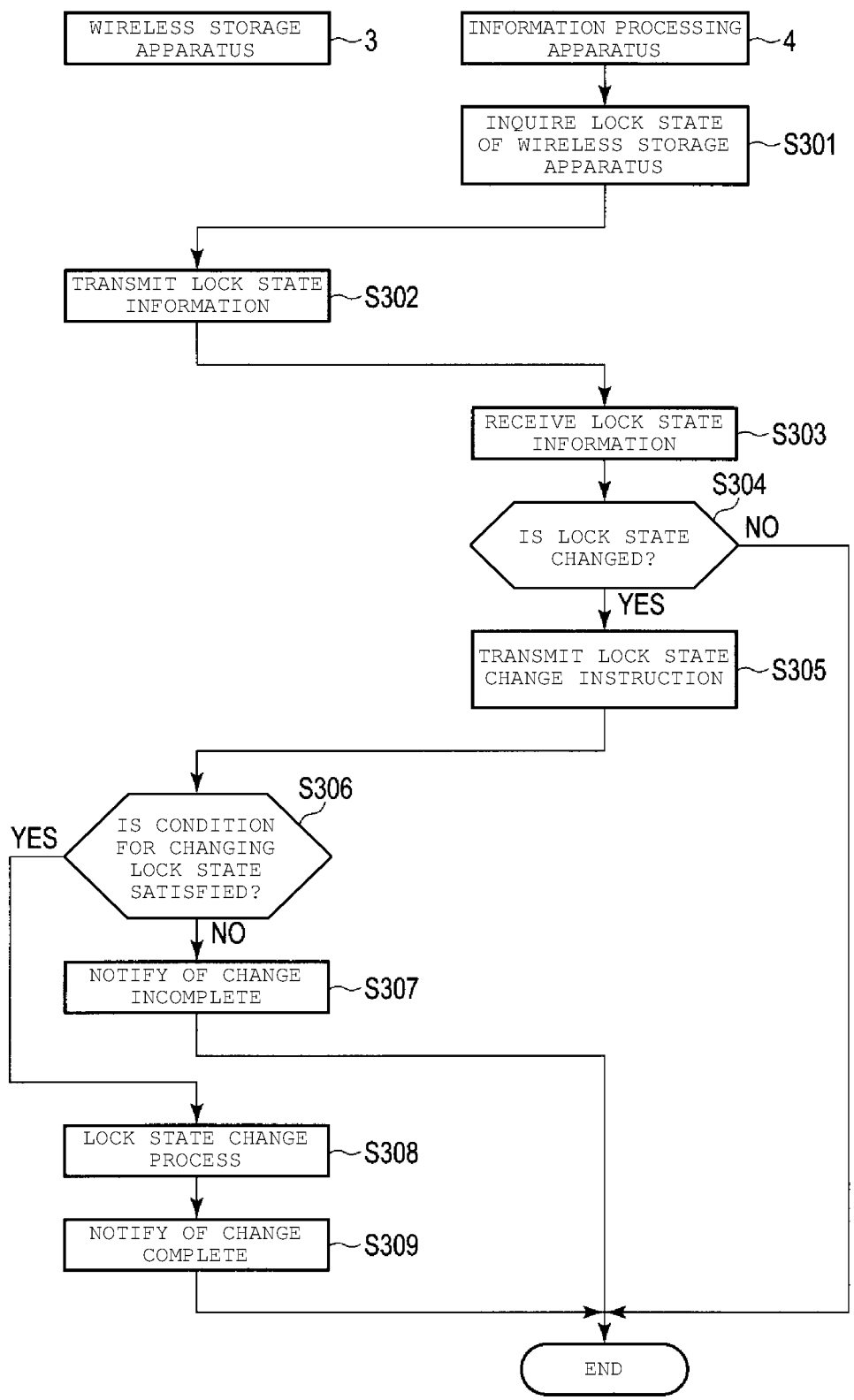

FIG. 4

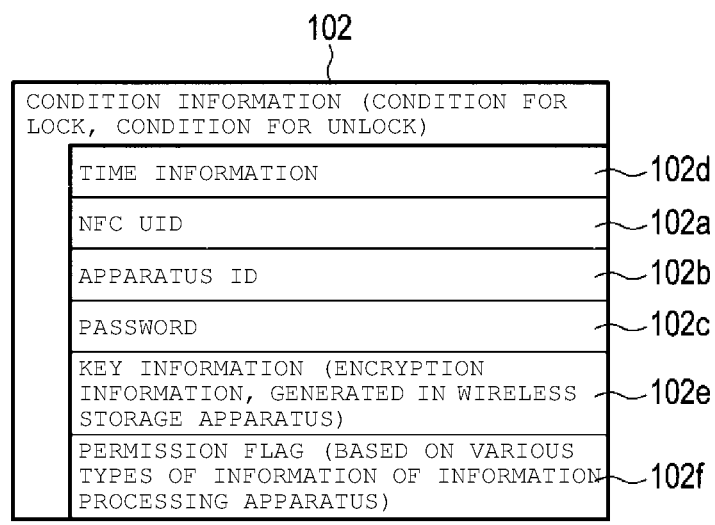

| CONDITION INFORMATION (CONDITION FOR LOCK, CONDITION FOR UNLOCK) | |
|---|---|
| TIME INFORMATION | 102d |
| NFC UID | 102a |
| APPARATUS ID | 102b |
| PASSWORD | 102c |
| KEY INFORMATION (ENCRYPTION INFORMATION, GENERATED IN WIRELESS STORAGE APPARATUS) | 102e |
| PERMISSION FLAG (BASED ON VARIOUS TYPES OF INFORMATION OF INFORMATION PROCESSING APPARATUS) | 102f |

FIG. 5

| CONDITION FOR LOCK OR UNLOCK | SECURITY LEVEL |
|---|---|
| NFC UID | △ |
| APPARATUS ID | △ |
| PASSWORD | ○ |
| KEY INFORMATION | ○ |
| PERMISSION FLAG | △ |

STORAGE DEVICE HAVING A WIRELESS COMMUNICATION FUNCTION

CROSS-REFERENCE TO RELATED APPLICATION

This application is a division of U.S. patent application Ser. No. 15/253,884, filed on Sep. 1, 2016, which is based upon and claims the benefit of priority from Japanese Patent Application No. 2015-193341, filed Sep. 30, 2015 and Japanese Patent Application No. 2016-093885, filed May 9, 2016; the entire contents of each of which are incorporated herein by reference.

FIELD

Embodiments described herein relate generally to a storage device, in particular, a storage device having a wireless communication function.

BACKGROUND

A portable storage apparatus such as a memory card is typically connectable to a host electronic apparatus. When the storage device is connected to a host electronic apparatus, the host electronic apparatus is able to store data in the storage apparatus, or read out the data stored in the storage apparatus.

A storage apparatus of one type includes a wireless antenna and has a wireless communication function.

DESCRIPTION OF THE DRAWINGS

FIG. 3 is a flow chart illustrating a process of changing a lock state of the wireless storage apparatus.

FIG. 4 illustrates a data structure of condition information according to the first embodiment.

FIG. 5 illustrates an example of security levels of the wireless storage apparatus according to the first embodiment.

DETAILED DESCRIPTION

Figure 1:
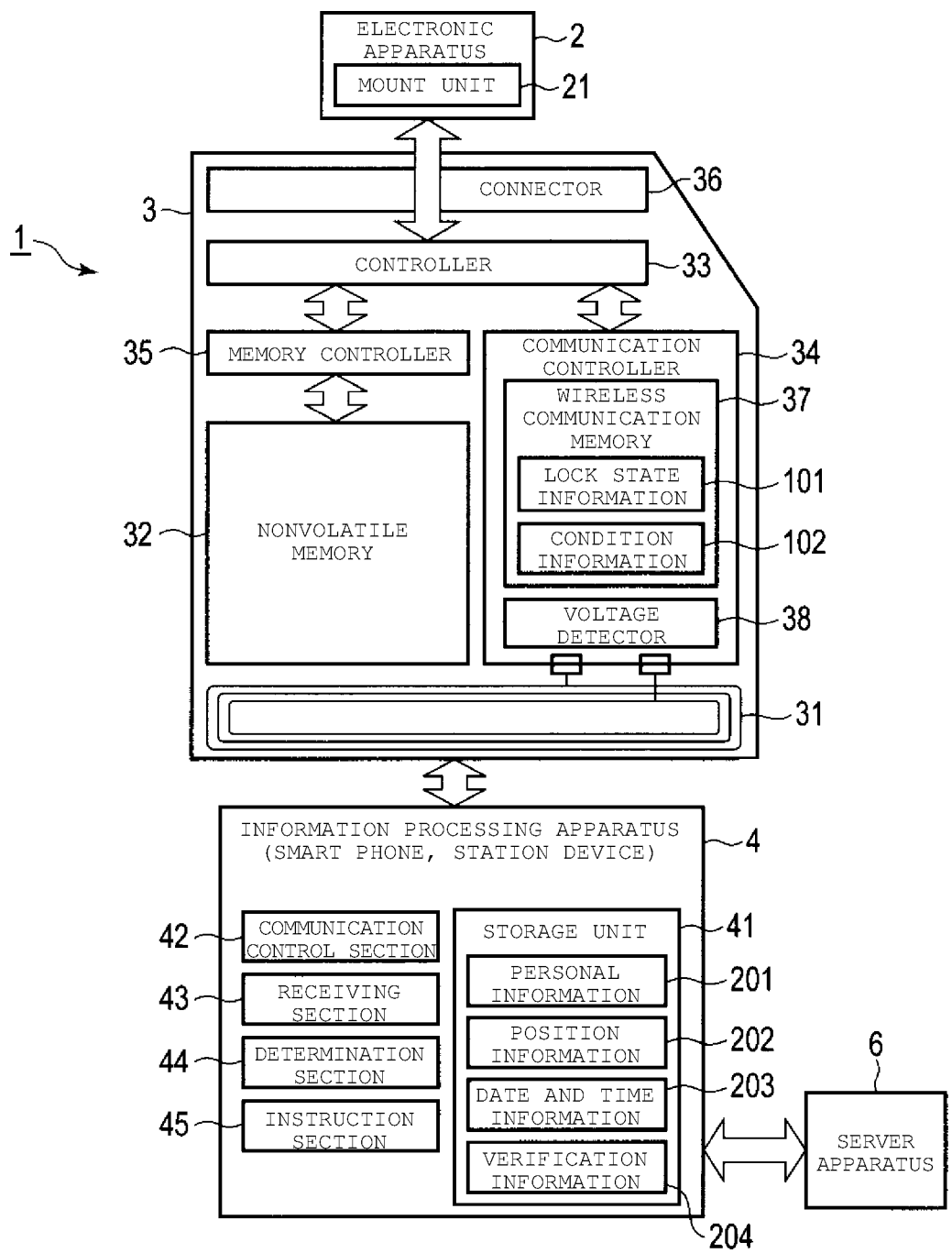
FIG. 1 is a block diagram illustrating an information processing system according to a first embodiment.

An embodiment provides a wirelessly communicable storage apparatus with high data security, and an information processing system including the storage apparatus.

In general, according to an embodiment, a storage device includes an antenna, a first nonvolatile memory that is operable using power generated at the antenna by an electromagnetic induction caused by an external device, and stores lock state information, a first controller configured to change the lock state information in response to a command that is wirelessly transmitted from the external device through the antenna, a second nonvolatile memory, and a second controller configured to allow access to a memory region of the second nonvolatile memory depending on the lock state information stored in the first nonvolatile memory. Hereinafter, respective embodiments will be described with reference to the drawings. In the following description, approximately or substantially the same functions and components are denoted by the same reference numerals, and a description will be given as necessary.

First Embodiment

A first embodiment describes a storage apparatus having a wireless communication function (hereinafter, referred to as a wireless storage apparatus), an electronic apparatus on which the wireless storage apparatus is detachably mountable, an information processing apparatus capable of performing wireless communication with the wireless storage apparatus, and an information processing system including the electronic apparatus, the wireless storage apparatus, and the information processing apparatus.

In the present embodiment, when the wireless storage apparatus is mounted thereon, the electronic apparatus is electrically connected to the wireless storage apparatus. When the wireless storage apparatus is unlocked, the electronic apparatus is capable of storing data in the wireless storage apparatus and reading the data stored in the wireless storage apparatus. When the wireless storage apparatus is locked, the electronic apparatus is not capable of storing data in the wireless storage apparatus and reading the data stored in the wireless storage apparatus.

The information processing apparatus performs wireless communication with the wireless storage apparatus. The information processing apparatus sends an instruction to change a lock state (locked or unlocked: an access right setting state), to the wireless storage apparatus, by wireless communication.

The wireless storage apparatus performs wireless communication with the information processing apparatus, and changes the lock state in response to the instruction from the information processing apparatus.

When the electronic apparatus attempts to read data from or write data to the wireless storage apparatus, or attempts to wirelessly communicate with the wireless storage apparatus, the wireless storage apparatus checks its own lock state. Then, when it is locked, the wireless storage apparatus rejects access thereto. When it is unlocked, the wireless storage apparatus permits access thereto.

In the present embodiment, when the wireless storage apparatus is locked, the wireless storage apparatus rejects both reading and writing of data by the electronic apparatus. However, for example, when the wireless storage apparatus is locked, the wireless storage apparatus may reject the reading of data, but permit the writing by the electronic apparatus.

In the present embodiment, the lock state of the wireless storage apparatus is changed based on an instruction from the information processing apparatus, but the lock state of the wireless storage apparatus may be changed based on an instruction from the electronic apparatus.

In the present embodiment, if a user moves the information processing apparatus close to, or brings it into contact or close contact with the wireless storage apparatus, locking or unlocking of the wireless storage apparatus can be carried out.

In the present embodiment, locking means prohibiting reading of data from the wireless storage apparatus and writing of data to the wireless storage apparatus, and unlocking means permitting writing and reading to and from the wireless storage apparatus for which the writing and reading have been prohibited. As described above, for example, locking may prohibit the reading of data from the wireless storage apparatus but permit the writing of data to the wireless storage apparatus. Unlocking may mean permitting reading to the wireless storage apparatus for which the reading has been prohibited.

In the present embodiment, an ID represents identification information, and an access represents both write data to and read data from the storage apparatus.

FIG. 1 is a block diagram of an information processing system according to the present embodiment.

An information processing system 1 includes an electronic apparatus 2, a wireless storage apparatus 3, an information processing apparatus 4, and a server apparatus 6.

The electronic apparatus 2 may be, for example, toys, smart watches, game machines, mobile phones, information processing apparatuses, computers, wearable terminals, digital cameras, or the like.

The electronic apparatus 2 includes a mount unit 21 into which the wireless storage apparatus 3 is detachably mountable. A user is able to insert the wireless storage apparatus 3 into the mount unit 21, and remove (draw) the wireless storage apparatus 3 from the mount unit 21.

If the wireless storage apparatus 3 is mounted on the mount unit 21, the electronic apparatus 2 is electrically connected to the wireless storage apparatus 3, and can communicate commands, addresses, data, information, instructions, signals, and the like with the wireless storage apparatus 3.

The wireless storage apparatus 3 is a storage apparatus having a wireless communication function, or may be, for example, various storage apparatuses such as a memory card (such as an SD memory card or a multimedia card), a universal serial bus (USB) memory, a storage apparatus such as a hard disk drive (HDD) or a solid state disk (SSD). In the present embodiment, the wireless storage apparatus 3 is assumed to be a memory card.

In the present embodiment, the wireless storage apparatus 3 performs, for example, wireless communication conforming to near field communication (NFC), which is the short-range wireless communication standard at a frequency of 13.56 MHz or the like. However, the wireless communication by the wireless storage apparatus 3 may be another wireless communication such as, for example, a wireless local area network (LAN). The NFC enables communication at lower power than a general wireless LAN.

If the wireless storage apparatus 3 is mounted on the electronic apparatus 2, the wireless storage apparatus 3 is electrically connected to the electronic apparatus 2, and is supplied with power from the electronic apparatus 2. The wireless storage apparatus 3 has a function of storing data from the electronic apparatus 2 (write function), and a function of transmitting the read data to the electronic apparatus 2 (read function). The wireless storage apparatus 3 has a function of communicating data using power generated (induced) by electromagnetic induction at the wireless antenna 31 even if power is not supplied from the electronic apparatus 2. In other words, the wireless storage apparatus 3 can perform, for example, wireless communication, and transmits or receives data to or from the information processing apparatus 4. In the wireless storage apparatus 3, at least some components are operable based on the power generated by electromagnetic induction based on radio waves emitted from the information processing apparatus 4, even if power is not supplied from the electronic apparatus 2.

Although the wireless storage apparatus 3 communicates data with the electronic apparatus 2 according to a wired interface such as, for example, an SD interface in the present embodiment, other interfaces may be used. Further, although the wireless storage apparatus 3 communicates data with the information processing apparatus 4 using, for example, an NFC interface, other wireless communication interfaces may be used.

The wireless storage apparatus 3 includes a wireless antenna 31, a nonvolatile memory 32, a controller 33, a communication controller 34, a memory controller 35, and a connector 36. The communication controller 34 includes a wireless communication memory 37 and a voltage detector 38. The communication controller 34 and the wireless communication memory 37 may be configured separately. It is possible to combine or separate the controller 33, the communication controller 34, and the memory controller 35. For example, the memory controller 35 may be included in the controller 33.

The controller 33, the memory controller 35, and the nonvolatile memory 32 can operate, when the wireless storage apparatus 3 is supplied with power from the electronic apparatus 2. When the wireless storage apparatus 3 is supplied with power only through the wireless antenna 31, and is not supplied with power from the electronic apparatus 2, the controller 33, the memory controller 35, and the nonvolatile memory 32 may not be able to operate. Meanwhile, the communication controller 34 is operable, even if the wireless storage apparatus 3 is supplied with power through the wireless antenna 31, and is not supplied with power from the electronic apparatus 2. In other words, if the wireless antenna 31 receives wireless radio waves of a predetermined frequency corresponding to NFC, the communication controller 34 is operable, and the wireless storage apparatus 3 can perform communication by NFC.

The nonvolatile memory 32 may be, for example, a nonvolatile semiconductor memory. The nonvolatile memory 32 is, for example, a NAND-type flash memory, but may be another nonvolatile semiconductor memory such as a NOR-type flash memory, a magnetoresistive random access memory (MRAM: a magnetoresistive memory), a phase-change random access memory (PRAM: a phase-change memory), a resistive random access memory (Re-RAM: a resistance-change memory), and a ferroelectric random access memory (FeRAM). For example, the nonvolatile memory 32 may be another type of nonvolatile memory, a magnetic memory, or the like. For example, the nonvolatile memory 32 may be a flash memory of a three-dimensional structure.

The nonvolatile memory 32 operates, for example, when the electronic apparatus 2 supplies power to the wireless storage apparatus 3.

The controller 33 receives commands, addresses, data, information, instructions, signals, or the like, from the electronic apparatus 2, the memory controller 35, and the communication controller 34.

The controller 33 outputs the commands, the addresses, the data, the information, the instructions, the signals, or the like, to the memory controller 35, the communication controller 34, and the electronic apparatus 2, based on the received command.

In the present embodiment, when a data store instruction or a data read instruction is received from the electronic apparatus 2, the controller 33 determines whether to permit or reject storage or reading of data, based on lock state information 101, which is managed in the wireless communication memory 37.

When the storage or reading of data is determined to be permitted, the controller 33 stores data in the nonvolatile memory 32 or reads data from the nonvolatile memory, through the memory controller 35, and transmits the read data to the electronic apparatus 2.

When the storage or reading of data is determined to be rejected, the controller 33 may transmit a reject signal indicating rejection of storing data to the electronic apparatus 2.

The memory controller 35 controls the nonvolatile memory 32. The memory controller 35 stores data into the nonvolatile memory 32, for example, based on commands or the like which are input from the controller 33. The memory controller 35 reads data from the nonvolatile memory 32 and outputs the data to the controller 33, for example, based on commands or the like which are input from the controller 33. The memory controller 35 may directly communicate with the communication controller 34 or the electronic apparatus 2, without using through the controller 33.

The wireless antenna 31 is, for example, a PCB pattern antenna. The operable frequency band of the wireless antenna 31 may be a predetermined frequency band corresponding to NFC.

The wireless antenna 31 is capable of generating power by electromagnetic induction, based on, for example, the radio waves emitted from the information processing apparatus 4. The wireless antenna 31 supplies the generated power to the communication controller 34.

The wireless antenna 31 receives commands, addresses, data, information, instructions, signals, or the like, from the information processing apparatus 4. The wireless antenna outputs the received command, or the like, to the communication controller 34.

The communication controller 34 performs communication with the information processing apparatus 4 and the like through the wireless antenna 31. The communication controller receives commands, addresses, data, information, instructions, signals, or the like from the controller 33 and the wireless antenna 31. The communication controller 34 outputs, for example, data and the like, to the controller 33 and the wireless antenna 31, based on the received command. The communication controller 34 reads data from the wireless communication memory 37, based on the received command, address, and the like, and outputs the read data to the controller 33, and the wireless antenna 31. The communication controller 34 stores data in the wireless communication memory 37, based on the received command, address, data and the like.

The commands, the addresses, the data, the information, the instructions, the signals, or the like, which are communicated among the electronic apparatus 2, the controller 33, the memory controller 35, the communication controller 34, the wireless antenna 31, and the like, do not necessarily match in data format thereof. As long as commands, addresses, data, information, instructions, signals, or the like can be recognizable by both communication parties, there is no need to be same as the data format of commands, addresses, data, information, instructions, signals, or the like, which are communicated by other parties.

When commands and data are received from the controller 33 or the wireless antenna 31, the communication controller 34 stores data in the wireless communication memory 37. The communication controller 34 may not necessarily perform the writing of data into the wireless communication memory 37.

In the present embodiment, when an inquiry of the lock state is received from the information processing apparatus 4 by wireless communication, the communication controller 34 reads the lock state information 101 which is stored in the wireless communication memory 37, and transmits the lock state information 101 to the information processing apparatus 4 by wireless communication.

When an instruction to change the lock state of the wireless storage apparatus 3 and verification information 204 is received from the information processing apparatus 4 by wireless communication, the communication controller 34 determines whether or not the contents of the verification information 204 satisfy the contents of the condition information 102 indicating a condition for permitting the change of the lock state. When the contents are satisfied, the communication controller 34 changes the lock state information 101 stored in the wireless communication memory 37, and transmits a change complete notification to the information processing apparatus 4 by wireless communication. When the contents are not satisfied, the communication controller 34 transmits a change incomplete notification to the information processing apparatus 4 by wireless communication.

The communication controller 34 encrypts data to be transmitted to the information processing apparatus 4 through the wireless antenna 31, using key information stored in the wireless communication memory 37. In addition, the communication controller 34 decrypts the encrypted data that is received from the information processing apparatus 4 through the wireless antenna 31, using the key information stored in the wireless communication memory 37.

The wireless communication memory 37 is, for example, a nonvolatile memory. The wireless communication memory 37 stores data under control of the communication controller 34 or the memory controller 35. Here, data storage in the wireless communication memory 37 may be temporary. For example, an electrically erasable programmable read-only memory (EEPROM) is used as the wireless communication memory 37. However, it is possible to use various types of memory similarly to the nonvolatile memory 32.

It is desirable that the nonvolatile memory used for the wireless communication memory 37 has lower power consumption per unit volume than that of the nonvolatile memory 32, so as to be operable at the power supplied from the wireless antenna 31. Specifically, a NOR-type memory may be used.

The wireless communication memory 37 includes lock state information 101 indicating whether or not the wireless storage apparatus 3 is in the lock state, and condition information 102 indicating conditions in which the lock state information 101 may be changed.

It is desirable that the lock state information 101 is stored in an address (secret area) of the wireless communication memory 37 which is not accessible from the electronic apparatus 2 and the information processing apparatus 4.

The lock state information 101 includes, for example, one or more bits of data indicating a read/write disabled state and a read/write enabled state. Alternatively, the lock state information 101 may be two or more bits of data including one or more bits of data indicating presence or absence of reading restriction and one or more bits of data indicating presence or absence of writing restriction. In other words, the wireless storage apparatus 3 can in one of four types of lock states: a read/write enabled state, a read-only enabled state, a write-only enabled state, and a read/write disabled state by switching ON/OFF of each bit. Here, the state that can be indicated by the lock state information 101 is not limited to the above.

Although the access limit using the lock state information 101 is used for the nonvolatile memory 32, the wireless communication memory 37 may be included in the access limit target.

For example, the nonvolatile memory 32 and the wireless communication memory 37 are divided into a plurality of areas, and the lock state information 101 may indicate whether or not reading is permitted or whether or not writing is permitted, for each of the plurality of areas. The plurality of areas may be set in, for example, unit of folder.

Condition information 102 indicates conditions for changing the lock state information 101. For example, the condition information 102 includes time information for maintaining the lock of the wireless storage apparatus 3, time information for changing the wireless storage apparatus 3 from a lock state to an unlock state, a user ID which is permitted to change the lock state information 101, an apparatus ID, a password, a group ID, key information used in wireless communication, and a permission flag indicating whether or not unlocking is permitted by other devices such as, for example, the information processing apparatus 4. When the conditions specified in the condition information 102 are satisfied, the change of the lock state information 101 is permitted.

The wireless communication memory 37 may store, for example, data related to the wireless storage apparatus 3 (some data stored in the nonvolatile memory 32 (for example, image data, audio data (music data, voice data, or the like), video data, or the like), data related to the data stored in the nonvolatile memory 32), or a command or data which is received from the controller 33, the information processing apparatus 4, or the like.

A specific example if the data stored in the wireless communication memory 37 will be described below. It should be noted that these are merely examples, and the data stored in the wireless communication memory 37 is not limited thereto.

The data relevant to the image data stored in the nonvolatile memory 32 is, for example, file name data, a first or last part of image data, thumbnail image data of image data, file generation time data, imaging time data, data ID, or the like.

The data relevant to the audio data stored in the nonvolatile memory 32 is, for example, file name data, a first or last part of audio data, output time data of audio data, file generation time data, data ID, or the like.

The data relevant to the nonvolatile memory 32 is memory capacity data, remaining capacity data, data of the number of files, or the like of the nonvolatile memory 32.

The voltage detector 38 is electrically connected to the wireless antenna 31. The voltage detector 38 detects the voltage of power supplied from the wireless antenna 31 to the communication controller 34. The voltage detector 38 issues a reset command of communication by NFC, until the voltage reaches a predetermined value at which the communication controller 34 is operable. The communication controller 34 does not perform communication by NFC while receiving the reset command. This reset command allows to prevent an abnormal activation and operation of communication by NFC. When the voltage reaches a predetermined value, the voltage detector 38 may output an operational command to the communication controller 34. Only when the operational command is received, the communication controller 34 performs communication by NFC.

The connector 36 is, for example, a standardized connection terminal, and is electrically connectable with the electronic apparatus 2.

The information processing apparatus 4 is, for example, mobile phones (including smart phones), computers, game machines, station apparatuses, wearable terminals, or the like. The station apparatuses are, for example, information processing apparatuses which are located in shopping malls, electronics stores, toy stores, or the like. The information processing apparatus 4 is able to transmit and receive commands, addresses, data, information, instructions, signals, or the like to and from the wireless storage apparatus 3.

The information processing apparatus 4 includes, for example, a storage unit 41, a communication control section 42, a receiving section 43, a determination section 44, and an instruction section 45. In the present embodiment, the communication control section 42, the receiving section 43, the determination section 44, and the instruction section 45 may be implemented, for example, by the information processing apparatus 4 executing a program which is downloaded from the server apparatus 6 to the information processing apparatus 4.

The storage unit 41 stores, for example, personal information 201, position information 202 of the information processing apparatus 4, date and time information 203, and verification information 204.

The personal information 201 includes information such as birthday, age, address, and schedule of the user of the information processing apparatus 4 or the electronic apparatus 2.

The position information 202 indicates a position of the information processing apparatus 4, which is obtained from, for example, a global positioning system (GPS).

The date and time information 203 is associated with date and time and an event correlated with the date and time. Examples of the event include New Year, traditional end of winter, Doll Festival, Children's Day, Christmas, New Year's Eve, or the like.

Here, the personal information 201 needs not be managed necessarily independently, for example, an address and the like may be managed as the position information 202, and birthday, schedule, and the like may be managed as the date and time information 203.

The personal information 201, the position information 202, and the date and time information 203 may not be stored in the storage unit 41. Instead, the information may be downloaded to the storage unit 41 from the server apparatus 6, by communication between the information processing apparatus 4 and the server apparatus 6.

The verification information 204 is information used to determine whether or not to permit the change of the lock state information 101 when the condition indicated by the condition information 102 is met. The verification information 204 includes, for example, a user ID of a user who uses the information processing apparatus 4, an apparatus ID, a password, and a group ID of the information processing apparatus 4, key information used in wireless communication, a permission flag indicating whether or not unlocking of the wireless storage apparatus 3 is permitted by the information processing apparatus 4, and the like.

The communication control section 42 controls reception of commands, data, information, instructions, signals, or the like from the wireless storage apparatus 3 by the information processing apparatus 4.

Further, the communication control section 42 controls transmission of commands, data, information, instructions, signals, or the like from the information processing apparatus 4 to the wireless storage apparatus 3.

Further, the communication control section 42 communicates commands, addresses, data, information, instructions, signals, or the like with the server apparatus 6 in a wireless or wired manner. Wireless communication standards such as, for example, a wireless LAN, 3rd Generation (3G), and long term evolution (LTE) are used for the communication between the information processing apparatus 4 and the server apparatus 6.

The communication control section 42 encrypts data to be transmitted to the wireless storage apparatus 3, using key information stored in the storage unit 41. In addition, the communication control section 42 decrypts the encrypted data that is received from the wireless storage apparatus 3, using the key information stored in the storage unit 41.

The receiving section 43 transmits an inquiry of a lock state to the wireless storage apparatus 3 by wireless communication, and receives the lock state information 101 as a response to the inquiry, from the wireless storage apparatus 3 by wireless communication.

The determination section 44 determines whether or not to change the lock state of the wireless storage apparatus 3, based on the lock state information 101.

When the determination section 44 determines to change the lock state of the wireless storage apparatus 3, the instruction section 45 transmits the change instruction and the verification information 204 to the wireless storage apparatus 3, by wireless communication. Here, for example, the instruction section 45 determines whether or not to permit the unlocking of the wireless storage apparatus 3, based on the necessary information among the personal information 201, the position information 202, the date and time information 203, which are stored in the storage unit 41, and may add a permission flag indicating the determination result to the verification information 204.

The server apparatus 6 provides various types of services to the users of respective information processing apparatuses 4. In addition, in the present embodiment, the server apparatus 6 may be omitted.

Figure 2:
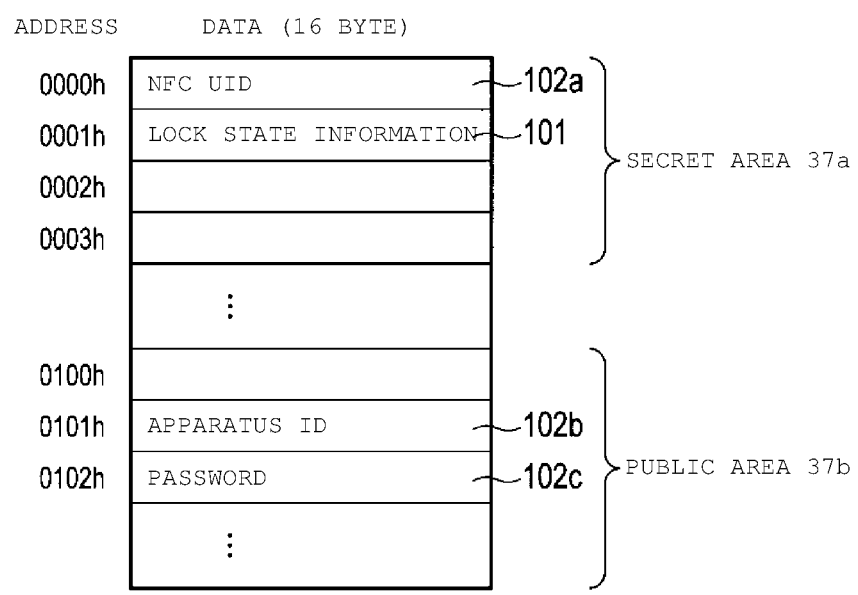
FIG. 2 illustrates an example of a data structure of data stored in a wireless storage apparatus according to the first embodiment.

FIG. 2 illustrates content of the wireless communication memory 37 according to the present embodiment. In the memory space of the wireless communication memory 37, for example, 16 bytes of data is allocated for a single address.

In FIG. 2, the wireless communication memory 37 stores the lock state information 101, and a NFC UID 102a, an apparatus ID 102b, and a password 102c, which are examples of the condition information 102.

The UID 102a is a unique ID assigned to the wireless storage apparatus 3, and for example, a unique product ID assigned during manufacturing thereof, a unique ID assigned to the wireless storage apparatus 3 after manufacturing thereof, or the like.

The apparatus ID 102b is an identification number which is arbitrarily assigned to a device for which the change of the lock state is permitted.

The password 102c is used to determine whether or not to permit the change of the lock state.

The condition information 102 may include various types of data necessary to determine whether or not to permit the change of the lock state, in addition to the UID 102a, the apparatus ID 102b, and the password 102c.

The wireless communication memory 37 includes, for example, a secret area 37a from which data cannot be read by external apparatuses such as the information processing apparatus 4, and a public area 37b from which data can be read by the external apparatuses. For example, the lock state information 101 and the NFC UID 102a are stored in the secret area 37a. For example, the apparatus ID 102b and the password 102c are stored in the public area 37b.

It should be noted that the allocation of each data to the address is not limited to that shown in FIG. 2.

FIG. 3 is a flow chart illustrating a process of changing the lock state of the wireless storage apparatus 3 according to the present embodiment.

In step S301, the receiving section 43 of the information processing apparatus 4 transmits an inquiry of a lock state to the wireless storage apparatus 3, by performing wireless communication with the wireless storage apparatus 3.

In step S302, when an inquiry of the lock state is received from the information processing apparatus 4 by wireless communication, the communication controller 34 of the wireless storage apparatus 3 reads the lock state information 101 stored in the wireless communication memory 37, and transmits the lock state information 101 to the information processing apparatus 4 by wireless communication.

In step S303, the receiving section 43 of the information processing apparatus 4 receives the lock state information 101 as a response to the inquiry by wireless communication.

In step S304, the determination section 44 of the information processing apparatus 4 determines whether or not to change the lock state of the wireless storage apparatus 3, based on the lock state information 101. Specifically, upon receipt of an instruction to lock the wireless storage apparatus 3 from the user when the lock state information 101 indicates a lock state, the determination section 44 determines that it is not necessary to change the lock state. Upon receipt of an instruction to lock the wireless storage apparatus 3 from the user when the lock state information 101 indicates an unlock state, the determination section 44 determines that it is necessary to change the unlock state to the lock state. Upon receipt of an instruction to unlock the wireless storage apparatus 3 from the user when the lock state information 101 indicates a lock state, the determination section 44 determines that it is necessary to change the lock state to the unlock state. Upon receipt of an instruction to unlock the wireless storage apparatus 3 from the user when the lock state information 101 indicates an unlock state, the determination section 44 determines that it is not necessary to change the unlock state.

When the determination section 44 determines not to change the lock state in step S304, the process ends.

When the determination section 44 determines to change the lock state in step S304, the instruction section 45 transmits a change instruction and the verification information 204 to the wireless storage apparatus 3 by wireless communication in step S305. Here, for example, the instruction section 45 determines whether or not to permit the unlocking of the wireless storage apparatus 3, based on the necessary information among the personal information 201, the position information 202, and the date and time information 203, which are stored in the storage unit 41, and may add a permission flag indicating the determination result to the verification information 204.

In step S306, when an instruction to change the lock state of the wireless storage apparatus 3 and the verification information 204 is received from the information processing apparatus 4 by wireless communication, the communication controller 34 of the wireless storage apparatus 3 determines whether or not the contents of the verification information 204 satisfy the conditions of the condition information 102 for changing the lock state, in other words, the conditions for changing the lock state. For example, the communication controller 34 determines whether or not the information processing apparatus 4, which is a partner of the wireless communication, has an authority to change the lock state, based on the UID 102a, the apparatus ID 102b, and the password 102c. For example, the communication controller 34 determines whether or not unlocking is permitted to the information processing apparatus 4, based on the permission flag.

When the communication controller 34 determines that the conditions for changing the lock state are not satisfied, the communication controller 34 transmits a change incomplete notification to the information processing apparatus 4 by wireless communication in step S307.

When the communication controller 34 determines that the conditions for changing the lock state are satisfied, the communication controller 34 changes the lock state information 101 stored in the wireless communication memory 37 in step S308. Specifically, when the lock state information 101 indicates lock, the communication controller 34 performs locking; and when the lock state information 101 indicates unlock, the communication controller 34 performs unlocking.

In step S309, the communication controller transmits a change complete notification to the information processing apparatus 4 by wireless communication.

FIG. 4 illustrates a data structure of the condition information 102 according to the present embodiment.

The condition information 102 includes, for example, time information 102d, an NFC UID 102a, an apparatus ID 102b, a password 102c, key information 102e, and a permission flag 102f.

The time information 102d indicates, for example, time to maintain a lock state, or time to permit unlock. For example, the communication controller 34 determines that the condition for changing the lock state is satisfied after a lapse of time to maintain a lock state or after the time to permit unlock.

The NFC UID 102a, the apparatus ID 102b, and the password 102c are information for determining whether or not the user or the information processing apparatus 4 which is the partner of wireless communication has an authority to change the lock state. For example, when the NFC UID 102a, the apparatus ID 102b, and the password 102c, which are included in the condition information 102, match the NFC UID, the apparatus ID, and the password, which are included in the verification information 204 received from the information processing apparatus 4 through the wireless communication, the communication controller 34 determines that the user or the information processing apparatus 4 has an authority to change the lock state.

The key information 102e, for example, is used to encrypt the data which is transmitted and received in wireless communication between the wireless storage apparatus 3 and the information processing apparatus 4. For example, the key information 102e is generated by the communication controller 34, stored in the wireless communication memory 37 as a part of the condition information 102, and provided to the information processing apparatus 4. When the key information 102e included in the condition information 102 matches the key information included in the verification information 204 received from the information processing apparatus 4 by wireless communication, the communication controller 34 determines that the user or the information processing apparatus 4 has an authority to change the lock state.

The permission flag 102f is information generated by the information processing apparatus 4, and indicates whether or not the unlocking of the wireless storage apparatus 3 is permitted by the information processing apparatus 4. For example, when the position of the information processing apparatus 4 is within a predetermined area, the permission flag 102f is set. For example, if a predetermined time and date that allows data publication, the permission flag 102f is set. When the permission flag 102f indicating that the unlocking is permitted is included in the condition information 102, the communication controller 34 has an authority to unlock.

FIG. 5 illustrates an example of a security level of the wireless storage apparatus 3 according to the present embodiment.

According to the example of the security level illustrated in FIG. 5, the locking or unlocking based on the password 102c or the key information 102e which is stored in the secret area 37a has a higher security level than the locking or unlocking based on the UID 102a, the apparatus ID 102b, and the permission flag 102f.

In the present embodiment, it is possible to adjust and increase the security level of the wireless storage apparatus 3 by combining various security levels.

Figure 6:
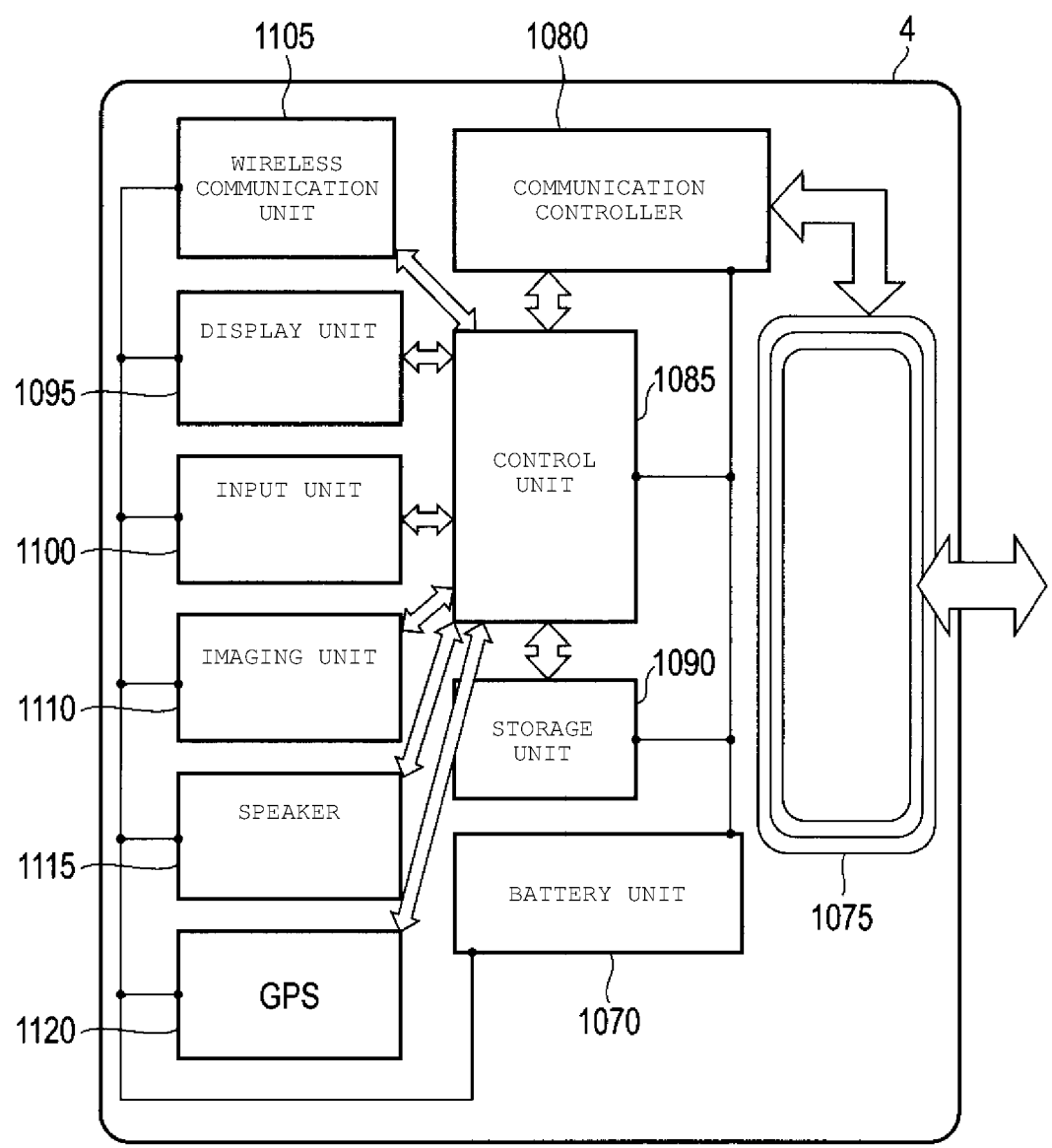
FIG. 6 is a block diagram illustrating a first configuration of an information processing apparatus according to the first embodiment.

FIG. 6 is a block diagram illustrating a first configuration of the information processing apparatus 4 according to the present embodiment. The information processing apparatus 4, for example, has a wireless communication function, such as a smart phone, a personal digital assistant (PDA), a tablet terminal, and a computer.

The information processing apparatus 4 includes a battery unit 1070, a wireless antenna 1075, a communication controller 1080, a control unit 1085, a storage unit 1090, a display unit 1095, an input unit 1100, a wireless communication unit 1105, an imaging unit 1110, a speaker 1115, and a GPS 1120. The communication controller 1080 and the control unit 1085 may be implemented as a single controller.

In the present embodiment, the communication controller 1080 and the wireless communication unit 1105 correspond to, for example, the communication control section 42 in FIG. 1.

The information processing apparatus 4 is able to operate and communicate, with power supplied from the battery unit 1070.

The information processing apparatus 4 is able to transmit and receive data, for example, according to an NFC interface. The information processing apparatus 4 may use another wireless communication interface.

The battery unit 1070 is a power source for supplying power to the information processing apparatus 4. The battery unit 1070 is, for example, a battery. The battery unit 1070 may be dry batteries, storage batteries, fuel cells, or the like. More specifically, a lithium ion battery may be used as the battery unit 1070. The battery unit 1070 may be external to the information processing apparatus 4, and for example, may be an AC adapter connected to a commercial power supply, or the like.

The operable frequency band of the wireless antenna 1075 is set to a predetermined frequency band corresponding to NFC.

The wireless antenna 1075 receives commands, addresses, data, information, instructions, signals, or the like, and outputs to the communication controller 1080, the received commands, addresses, data, information, instructions, signals, or the like. The wireless antenna 1075 outputs the commands, the addresses, the data, the information, the instructions, the signals, or the like, which are received from the communication controller 1080. The wireless antenna 1075 is, for example, a PCB pattern antenna.

The communication controller 1080 controls the wireless antenna 1075. The communication controller 1080 is capable of outputting the commands, the addresses, the data, the information, the instructions, the signals, or the like, which are received from the control unit 1085, through the wireless antenna 1075. The communication controller 1080 is capable of outputting the data that is received by the wireless antenna 1075, to the control unit 1085.

The control unit 1085 controls various operations of the respective units, for example, based on input from the input unit 1100, the wireless communication unit 1105, the imaging unit 1110, and the wireless storage apparatus 3. The control unit 1085 controls the respective units, based on the input data or the calculation result of the data, and outputs the commands or the like to the respective units as necessary.

The control unit 1085 is, for example, a semiconductor chip, a circuit formed on a substrate, or one or a plurality of combinations thereof. The control unit 1085 may include at least one of a cache memory and a register that store data temporarily.

The control unit 1085 is capable of outputting the commands, the addresses, the data, the information, the instructions, the signals, or the like to the wireless antenna 1075 through the communication controller 1080. The control unit 1085 receives the commands, the addresses, the data, the information, the instructions, the signals, or the like which are received by the wireless antenna 1075, and the commands, the addresses, the data, the information, the instructions, the signals, or the like which are read from the wireless storage apparatus 3, through the communication controller 1080.

When writing data into the wireless storage apparatus 3, the control unit 1085 outputs data input from each unit or the calculation result of these data, a write command, and an address, to the communication controller 1080.

The control unit 1085 is electrically connected to each unit, and electrically communicates with each unit. In other words, the control unit 1085 is able to receive data from each unit, and output the data or the calculation result of the data. For example, the control unit 1085 calculates (generates) synthetic image data obtained by highlighting the captured data that is captured by the imaging unit 1110, and is able to output the synthetic image data to the display unit 1095. For example, the control unit 1085 calculates (generates) synthetic image data, based on the image data which is read from the storage unit 1090, and is able to output the synthetic image data to the display unit 1095. These are merely examples, and the control unit 1085 receives data from the respective units, and is able to output the calculation result of the data.

In the present embodiment, the control unit 1085 may include the receiving section 43, the determination section 44, and the instruction section 45 in FIG. 1. The control unit 1085 may be implemented by hardware, or may be even implemented by the processor executing the software.

The storage unit 1090 outputs the stored data to the control unit 1085, based on communication with the control unit 1085. The storage unit 1090 stores data received from the control unit 1085, based on communication with the control unit 1085. The storage unit 1090 is, for example, a memory controller and a nonvolatile memory. Similar to the nonvolatile memory 32, various types of memory can be used as the nonvolatile memory. The memory controller controls the nonvolatile memory. The storage unit 1090 may be, for example, a hard disk drive (HDD), a solid state disk (SSD), or the like. In the present embodiment, the storage unit 1090 may include the storage unit 41 in FIG. 1.

The display unit 1095 displays data which is received from the control unit 1085 in a form that a user can recognize. The display unit 1095 is, for example, a display. The user is able to visually recognize the data displayed on the display. Specifically, various types of displays such as a liquid crystal display, a plasma display, an organic EL display, and a three-dimensional display may be used for the display unit 1095. The display unit 1095 displays the data received from the control unit 1085, on the display. The display unit 1095 is able to concurrently display, for example, an image or moving images which is captured by the imaging unit 1110.

The input unit 1100 outputs the input of the user as input data, to the control unit 1085. The input unit 1100 is, for example, a touch panel provided on the display. If the user touches an image on the display, the input unit 1100 detects the pressed position on the touch panel, and outputs position information as input data to the control unit 1085. Specifically, switches arranged in a matrix, or various touch panels of a resistive type, a surface acoustic wave type, an infrared type, an electromagnetic induction type, and an electrostatic capacitance type may be used for the input unit 1100.

The input unit 1100 may be, for example, a microphone. If the user utters a voice, the input unit 1100 may detect the voice, extract input data by voice conversion, and output the extracted input data to the control unit 1085.

The wireless communication unit 1105 includes a wireless antenna and a wireless controller. The wireless communication unit 1105 communicates data, by wireless communication with an external device. The wireless communication unit 1105 outputs the data received from the external device to the control unit 1085. The wireless communication unit 1105 transmits data received from the control unit 1085 to the external device.

The imaging unit 1110 is able to capture one or both of a still image and moving images. The imaging unit 1110 outputs the captured data (image data) of a still image or moving images to the control unit 1085. The imaging unit 1110 may capture a code indicated on the surface of the wireless storage apparatus 3. The imaging unit 1110 is, for example, a camera. More specifically, the imaging unit 1110 is, a solid photographing device, for example, a camera using a charge coupled device (CCD) sensor, and a complementary metal oxide semiconductor (CMOS) sensor.

The speaker 1115 outputs sound corresponding to audio data received from the control unit 1085.

The GPS 1120 acquires position information of the information processing apparatus 4, and outputs the position information to the control unit 1085.

Figure 7:
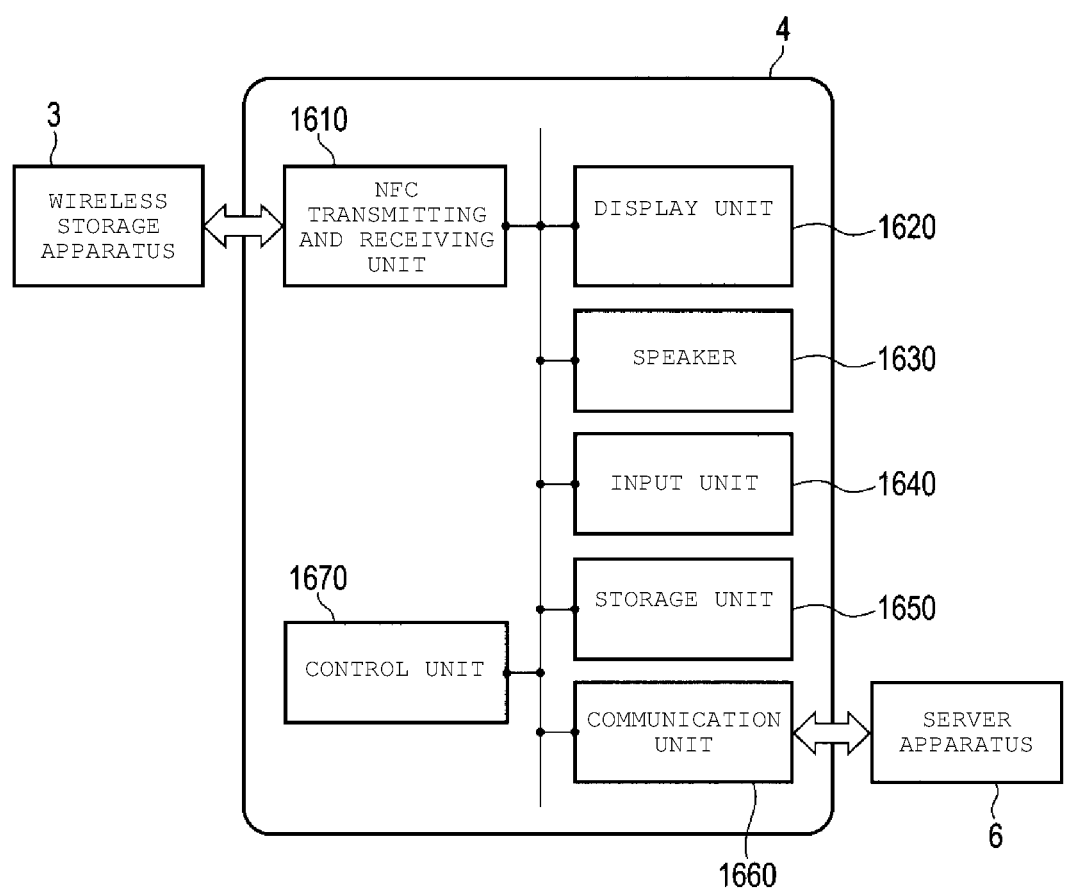
FIG. 7 is a block diagram illustrating a second configuration of the information processing apparatus according to the first embodiment.

FIG. 7 is a block diagram illustrating a second configuration of the information processing apparatus 4 according to the present embodiment. The information processing apparatus 4 illustrated in FIG. 7 is a station apparatus.

The information processing apparatus 4 includes a NFC transmitting and receiving unit 1610, a display unit (display) 1620, a speaker 1630, an input unit 1640, a storage unit 1650, a communication unit 1660, and a control unit 1670.

In the present embodiment, the NFC transmitting and receiving unit 1610 and the communication unit 1660 correspond to, for example, the communication control section 42 in FIG. 1.

The NFC transmitting and receiving unit 1610 performs NFC communication with apparatuses external to the information processing apparatus 4, in response to the instruction of the control unit 1670. For example, the NFC transmitting and receiving unit 1610 performs NFC communication with the wireless storage apparatus 3.

The display unit 1620 is, for example, any display such as a liquid crystal display and an organic EL display. The display unit 1620 displays, for example, a message that the information processing apparatus 4 is in NFC communication, and a message that the communication has been completed.

The speaker 1630 generates a sound in response to the instruction of the control unit 1670. The input unit 1640 is, for example, a keyboard or a button. Alternatively, the display unit 1620 is a display, and a touch panel may be the input unit 1640.

The storage unit 1650 is, for example, any storage element such as a HDD, an SSD, and a flash memory. The storage unit 1650 stores, for example, data to be transmitted to an external device. Examples of the data include voice data of the character, moving image data, or the like. In the present embodiment, the storage unit 1650 may include the storage unit 41 in FIG. 1.

The communication unit 1660 communicates with for example, the server apparatus 6 in the outside of the information processing apparatus 4, through wired or wireless communication, in response to the instruction of the control unit 1670. The communication unit 1660 acquires data to be stored to the storage unit 1650, from the external server apparatus 6.

The control unit 1670 controls the NFC transmitting and receiving unit 1610, the display unit 1620, the speaker 1630, the input unit 1640, the storage unit 1650, and the communication unit 1660.

In the present embodiment, the control unit 1670 may include the receiving section 43, the determination section 44, and the instruction section 45 in FIG. 1. The control unit 1670 may be implemented by hardware, or may be even implemented by the processor executing the software.

In the present embodiment described above, since the electronic apparatus 2 or the information processing apparatus 4 gives specific instructions to the wireless storage apparatus 3, the lock state of reading of data from the wireless storage apparatus 3 can be changed. Since wireless communication is used in the communication between the information processing apparatus 4 and the wireless storage apparatus 3, even if the wireless storage apparatus 3 is not mounted on another device, it is possible to easily lock or unlock the wireless storage apparatus 3, only by the user moving the information processing apparatus 4 close to the wireless storage apparatus 3. Thus, it is possible to enhance the security of the wireless storage apparatus 3, and easily perform the lock or unlock of the wireless storage apparatus 3.

In the present embodiment, it is possible to change the lock state, also by an instruction from the information processing apparatus 4 to the wireless storage apparatus 3, and an instruction from the electronic apparatus 2 to the wireless storage apparatus 3. Thus, for example, if the wireless storage apparatus 3 is mounted on the electronic apparatus 2 after locking the wireless storage apparatus 3 by wireless communication with the information processing apparatus 4, the electronic apparatus 2 is able to unlock the wireless storage apparatus 3. In addition, to the contrary, for example, if the wireless storage apparatus 3 is removed from the electronic apparatus 2 after locking the wireless storage apparatus 3 using the electronic apparatus 2, the information processing apparatus 4 is able to unlock the wireless storage apparatus 3 by wireless communication.

In the present embodiment, when the conditions that the user desires are satisfied, based on the personal information 201, the position information 202, the date and time information 203, and the like, which are stored in the storage unit 41 of the information processing apparatus 4, the change of the lock state of the wireless storage apparatus 3 is permitted. As a result, it is possible to flexibly cope with the user's needs of ensuring security.

In the present embodiment, by using multiple conditions for locking or unlocking, it is possible to increase the security level, and adjust the security level, as compared to change of the lock state based on a single condition.

For example, a storage apparatus such as an SD card or a USB memory is a portable device. There is USB memory that prevents leakage of data by locking the stored data with a password. However, to manage the password may be a burden to the user, and it takes time and effort to input the password.

In contrast, in the present embodiment, it is possible to change the lock state of the wireless storage apparatus 3, by locating the information processing apparatus 4 close to the wireless storage apparatus 3. Therefore, it is not necessary to enter a password each time to unlock the wireless storage apparatus 3. For that reason, it is possible to reduce the need to manage the password, and the user conveniently uses the wireless storage apparatus 3.

In the present embodiment, since the data transmitted and received between the information processing apparatus 4 and the wireless storage apparatus 3 is encrypted, it is possible to further enhance the security.

In the present embodiment, the communication controller 34 changes the lock state of the wireless storage apparatus 3, and the wireless communication memory 37 stores the lock state information 101 and the condition information 102 for determining the change of the lock state. Thus, even when the wireless storage apparatus 3 is not supplied with power from the electronic apparatus 2, it is possible to change the lock state of the wireless storage apparatus 3.

In the present embodiment, it is possible to properly manage private data using the wireless storage apparatus 3.

In the present embodiment, for example, a group ID is assigned to a plurality of users, and the wireless storage apparatus 3 may be unlocked by performing authentication of the group ID, such that the wireless storage apparatus 3 can be shared between the plurality of users.

Second Embodiment

In a second embodiment, various detailed examples of the information processing system 1 according to the first embodiment will be described.

Figure 8:
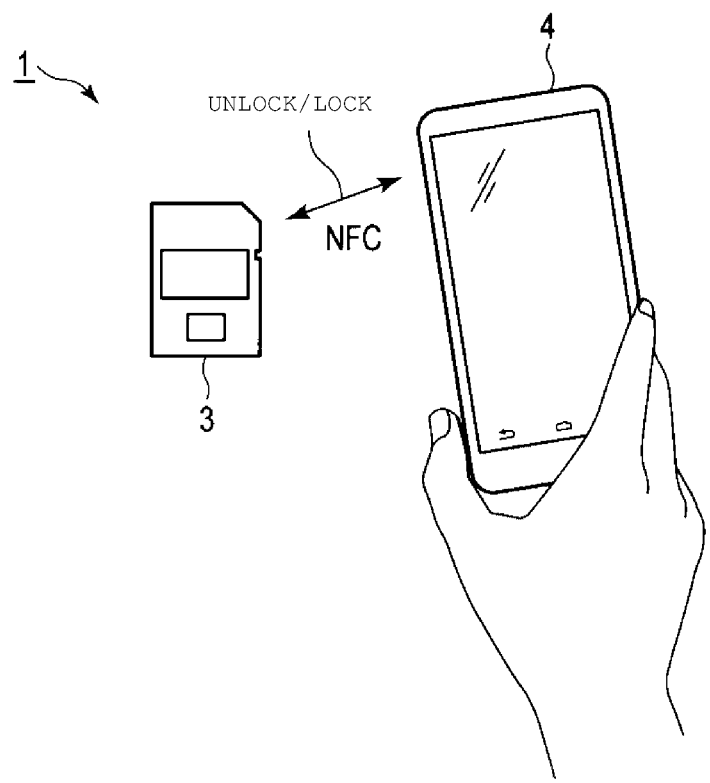
FIG. 8 schematically illustrates a use example of an information processing system according to a second embodiment.

FIG. 8 is a conceptual diagram illustrating an aspect of the information processing system 1 according to the present embodiment.

In FIG. 8, the wireless storage apparatus 3 is assumed to be, for example, a memory card. The information processing apparatus 4 may be, for example, a smart phone or a personal computer (PC) that performs wireless communication.

First Example

In a first example, the lock or unlock of the wireless storage apparatus 3 is performed based on the apparatus ID.

The wireless storage apparatus 3 stores the condition information 102 including the apparatus ID 102b of the information processing apparatus 4, as initial setting. As the apparatus ID 102b, for example, a media access control address (MAC) address, a service set identifier (SSID) or the like may be used. Specifically, the apparatus ID 102b of the information processing apparatus 4 is acquired by the application executed on the information processing apparatus 4, and the wireless storage apparatus 3 stores the condition information 102 including the apparatus ID 102b in the wireless communication memory 37. For example, the wireless storage apparatus 3 is locked initially.

During wireless communication after the initial setting, the information processing apparatus 4 transmits its own apparatus ID stored in the storage unit 41 to the wireless storage apparatus 3 by wireless communication. The wireless storage apparatus 3 performs authentication based on the apparatus ID 102b included in the condition information 102 and the received apparatus ID. When the apparatus ID 102b included in the condition information 102 matches the received apparatus ID, the wireless storage apparatus 3 permits change of the lock state.

Although the authentication of an apparatus ID is performed by the wireless storage apparatus 3 in the present example, the information processing apparatus 4 may receive the apparatus ID 102b stored in the condition information 102 of the wireless storage apparatus 3, and the information processing apparatus 4 may perform the authentication.

In the present aspect, the change of the lock state of the wireless storage apparatus 3 can be performed only by a predetermined information processing apparatus 4 that has the apparatus ID. Even if another information processing apparatus is moved close to the wireless storage apparatus 3, the wireless storage apparatus 3 rejects the change of the lock state because the information processing apparatus has a different apparatus ID.

Second Example

In a second example, lock or unlock of the wireless storage apparatus 3 is performed based on password.

The wireless storage apparatus 3 stores the condition information 102 including the password 102c, as initial setting. Specifically, the password 102c, that the user enters, is acquired by the application executed on the information processing apparatus 4, and the wireless storage apparatus 3 stores the condition information 102 including the password 102c in the wireless communication memory 37. For example, the wireless storage apparatus 3 is locked initially.

During wireless communication after the initial setting, the information processing apparatus 4 receives an inquiry of password from the wireless storage apparatus 3. The information processing apparatus 4 transmits the password stored in the storage unit 41 to the wireless storage apparatus 3 by wireless communication. The wireless storage apparatus 3 performs authentication based on the password 102c included in the condition information 102 and the received password. When the password 102c included in the condition information 102 matches the received password, the wireless storage apparatus 3 permits change of the lock state.

Although the authentication of the password is performed by the wireless storage apparatus 3 in the present example, the information processing apparatus 4 may receive the password 102c stored in the condition information 102 of the wireless storage apparatus 3, and the information processing apparatus 4 may perform the authentication.

Since matching of the passwords is performed in the present example, differently from first example, as long as a password is matched even when a different information processing apparatus is used, it is possible to change the lock state of the wireless storage apparatus 3.

In addition, the setting of the password 102c and the change of the locked state for the wireless storage apparatus 3 may not be performed by the information processing apparatus 4, but may be performed, for example, the electronic apparatus 2 such as a PC.

Third Example

In a third example, two conditions are used by combining the first example and the second example.

The wireless storage apparatus 3 stores the condition information 102 including the apparatus ID 102b and the password 102c, as initial setting. Specifically, the apparatus ID 102b of the information processing apparatus 4 and the password 102c, that the user enters, are acquired by the application executed on the information processing apparatus 4, and the wireless storage apparatus 3 stores the condition information 102 including the apparatus ID 102b and the password 102c in the wireless communication memory 37.

During wireless communication after the initial setting, the information processing apparatus 4 transmits its own apparatus ID stored in the storage unit 41 to the wireless storage apparatus 3 by wireless communication. The wireless storage apparatus 3 performs authentication based on the apparatus ID 102b included in the condition information 102 and the received apparatus ID. When the apparatus ID 102b included in the condition information 102 matches the received apparatus ID, the wireless storage apparatus 3 transmits an inquiry of a password to the information processing apparatus 4. When the inquiry of a password is received from the wireless storage apparatus 3, the information processing apparatus 4 transmits the password stored in the storage unit 41 to the wireless storage apparatus 3 by wireless communication. The wireless storage apparatus 3 performs authentication based on the password 102c included in the condition information 102 and the received password. When the password 102c included in the condition information 102 matches the received password, the wireless storage apparatus 3 permits change of the lock state.

In the present example, when wireless communication is performed between the wireless storage apparatus 3 and the information processing apparatus 4, the authentication of the apparatus ID is performed, and when the apparatus IDs match, the authentication of the password is performed. However, in the reverse order, the authentication of the password may be performed first, and when the passwords match, the authentication of the apparatus ID may be performed.

In the present example, when the apparatus ID and the password are both matched, the change of the lock state of the wireless storage apparatus 3 is permitted.

Alternatively, in the present example, the information processing apparatus 4 may perform at least one of the authentication of the apparatus ID and the authentication of the password.

Fourth Example

In a fourth example, lock or unlock of the wireless storage apparatus 3 is performed based on the key information 102e which is automatically generated by the wireless storage apparatus 3.

In the initial setting, the wireless storage apparatus 3 generates key information 102e. The wireless storage apparatus 3 stores the condition information 102 including the key information 102e in the wireless communication memory 37, and transmits the key information 102e to the information processing apparatus 4 by wireless communication. The wireless storage apparatus 3 stores the key information 102e in the secret area 37a of the wireless communication memory 37. The information processing apparatus 4 stores the key information 102e in the secret area of the storage unit 41. The key information 102e is used for encryption and decryption of data in the wireless communication between the wireless storage apparatus 3 and the information processing apparatus 4.

During wireless communication after the initial setting, the information processing apparatus 4 transmits the key information that is stored in the storage unit 41 to the wireless storage apparatus 3 by wireless communication. The wireless storage apparatus 3 performs authentication based on the key information 102e included in the condition information 102 and the received key information. When the key information 102e included in the condition information 102 matches the received key information, the wireless storage apparatus 3 permits change of the lock state.

In addition, although the wireless storage apparatus 3 performs the authentication of key information in the present example, the information processing apparatus 4 may receive the key information 102e which is stored in the condition information 102 of the wireless storage apparatus 3, and the information processing apparatus 4 may perform the authentication.

According to the present example, the change of the lock state of the wireless storage apparatus 3 can be performed only by a predetermined information processing apparatus 4 that has the key information 102e. Even if another information processing apparatus is moved close to the wireless storage apparatus 3, the wireless storage apparatus 3 rejects the change of the lock state because the key information is different.

In the present example, the wireless storage apparatus 3 stores the key information 102e in the secret area 37a of the wireless communication memory 37, and the information processing apparatus 4 stores the key information in the secret area of the storage unit 41. For that reason, a third party is not able to see key information, and it is possible to increase the security level than in the first example.

Fifth Example

In a fifth example, lock or unlock of the wireless storage apparatus 3 is performed based on position information 202 or date and time information 203 of the information processing apparatus 4.

The wireless storage apparatus 3 sets a specific area of the wireless communication memory 37 as an area for storing the permission flag 102f.

When the permission flag 102f stored in the specific area is in an ON state, the wireless storage apparatus 3 becomes unlocked. When the permission flag 102f stored in the specific area is in an OFF state, the wireless storage apparatus 3 is locked.

The instruction section 45 which is achieved by the application that is executed on the information processing apparatus 4 determines whether or not the wireless storage apparatus 3 may be unlocked, based on necessary information among the personal information 201, the position information 202, and the date and time information 203 stored in the storage unit 41.

For example, when the user wants to unlock the wireless storage apparatus 3 only at home, the instruction section 45 determines whether or not the current position is within a predetermined area including the home based on the position information 202. When the current position is determined to be within the predetermined area, the instruction section 45 transmits the verification information 204 including the permission flag 102f to the information processing apparatus 4 by wireless communication.

For example, when the wireless storage apparatus 3 is set to be unlocked after a predetermined period of time or date and time, the instruction section 45 determines whether or not the predetermined period of time or date and time has elapsed, based on the date and time information 203, and if the predetermined period of time or the date and time is determined to have elapsed, the instruction section 45 transmits the verification information 204 including the permission flag 102f to the wireless storage apparatus 3 by wireless communication.

The wireless storage apparatus 3 stores the permission flag 102f that is included in the verification information 204 received by wireless communication, in the specific area of the wireless communication memory 37.

When the permission flag 102f that is stored in the specific area of the wireless communication memory 37 is in ON state, the wireless storage apparatus 3 performs unlocking.

It should be noted that, in the present example, the information processing apparatus 4 determines whether or not the wireless storage apparatus 3 may be unlocked. However, the wireless storage apparatus 3 may determine on its own whether or not the wireless storage apparatus 3 may be unlocked.

Although the wireless storage apparatus 3 stores contents that are locked and the user is not able to view the content in the present example, it is possible to unlock the contents and browse the contents, for example, at a predetermined location such as a concert venue or a predetermined date.

Sixth Example

In a sixth example, the wireless storage apparatus 3 is assumed to be used in a service industry. In the present example, a service provider is, for example, a law firm, or the like, and a user is a consultant.

First, the user makes a database of counselling contents, stores it in the wireless storage apparatus 3, and locks the wireless storage apparatus 3.

The matching of an apparatus ID and the matching of a password are used as unlock conditions. The apparatus ID is assumed to be an ID of the information processing apparatus 4 of the user. The user determines a password. The apparatus ID and the password are stored in the condition information 102 of the wireless storage apparatus 3, and the verification information 204 of the storage unit 41 of the information processing apparatus 4, by the application or the like that is executed on the information processing apparatus 4.

At the time of counseling at a law firm or the like, the user unlocks the wireless storage apparatus 3 by the information processing apparatus 4, and gets counseling based on the data stored in the wireless storage apparatus 3. After counselling, the information processing apparatus 4 locks the wireless storage apparatus 3. Thereafter, the user moves the information processing apparatus 4 close to the wireless storage apparatus 3 in the home. The wireless storage apparatus 3 performs unlocking, by authentication of the apparatus ID and the password.

In a state where the wireless storage apparatus 3 is unlocked, the user is able to check the counselling contents by a PC or a television or the like in the home.

According to the present example, even when the user has lost the wireless storage apparatus 3, if there is no apparatus ID and password of the information processing apparatus 4 of the user, it is not possible to unlock the wireless storage apparatus 3. For that reason, it is possible to increase the confidentiality of the personal information.

Seventh Example

In a seventh example, the wireless storage apparatus 3 is assumed to be used in advertisement and publicity in a real estate industry or the like. In this example, a service provider is, for example, a real estate agent, and a user is a general customer of the service provider.

First, the service provider stores data of unpublished articles in the wireless storage apparatus 3, locks the wireless storage apparatus 3, and distributes the locked wireless storage apparatus 3 to the user. For example, the service provider may distribute the wireless storage apparatus 3 on the street, together with paper media, leaflets, brochures, or samples.

The wireless storage apparatus 3 stores time information 102d indicating the publication permit time, and unlocks a first lock of the data of the unpublished articles after the publication permit time.

Next, if the password that is written on the paper media, leaflets, brochures, or samples is input, the wireless storage apparatus 3 unlocks a second lock of the data of the unpublished articles.

According to the present example, the user can see the data of the articles stored in the wireless storage apparatus 3, for example, on the electronic apparatus 2 or the information processing apparatus 4, after the date and time of removal of ban of article publicity.

According to the present example, it is possible to unpublish the contents stored in the wireless storage apparatus up to the publication permit time, and increase the expectation and interest of the user.

Eighth Example

In an eighth example, the wireless storage apparatus 3 is assumed to be used in a financial industry, an insurance industry, or the like. The service provider in this aspect is, for example, an insurer, and the user is a general customer of the service provider.

First, the service provider distributes a biological activity meter and the wireless storage apparatus 3 to the user at the time of insurance contract. The biological activity meter may perform wireless communication with the wireless storage apparatus 3.

It is assumed that locking conditions of the wireless storage apparatus 3 are the matching of the apparatus ID of the biological activity meter, and that the numerical value of the activity meter (or the numerical range) is within a predetermined range. The numerical value of the biological activity meter is, for example, body fat percentage, blood pressure, or the like of the user, and a predetermined range determined by the service provider is included in the condition information 102, and stored in the wireless communication memory 37.

Conditions for unlocking are matching of the apparatus ID of the information processing apparatus 4 that the service provider owns.

The user stores the body fat percentage or the blood pressure in the wireless storage apparatus 3, as a daily health record, by using the distributed activity meter. The storage of the body fat percentage or the blood pressure is performed by, for example, through communication or wireless communication between the biological activity meter and the wireless storage apparatus 3.

When storing the body fat percentage or the blood pressure in the wireless storage apparatus 3, the wireless storage apparatus 3 determines whether or not the stored numerical value is within a predetermined range stored in the condition information 102, and if the value is out of the predetermined range, the wireless storage apparatus 3 is locked.

Here, it is assumed that the unlocking of the locked wireless storage apparatus 3 can be performed only by the information processing apparatus that the service provider owns.

For example, if the wireless storage apparatus 3 is not locked during a certain period, the service provider offers the user a reward such as the discount.

According to the present example, it is possible to promote healthy life of the user, in cooperation with the wireless storage apparatus 3 and the biological activity meter, and the service provider is able to offer a discount to the user. Thus, the service provider can provide a new insurance service.

Ninth Example

In a ninth example, the wireless storage apparatus 3 is assumed to be used in a service industry or the like. In this example, the service provider is, for example, an event supplier of an idol group or the like, and the user is a general customer of the service provider.

First, the service provider sells an advance ticket of an event and the wireless storage apparatus 3 which is locked and stores contents, to the user.

The conditions for unlocking are, for example, matching of a password and an apparatus ID of the information processing apparatus 4 that the service provider owns. The password is determined by the service provider, and is previously stored in the condition information 102 of the wireless storage apparatus 3.

If the user goes to the event venue, and presents, for example, the wireless storage apparatus 3 at the reception of the event venue, the service provider moves the information processing apparatus 4 close to the wireless storage apparatus 3 of the user. Thus, if the apparatus ID and the password respectively match, the wireless storage apparatus 3 is unlocked. Alternatively, the user may input the password that has been described in the advance ticket to the information processing apparatus 4, and the information processing apparatus 4 may transmit the input password to the wireless storage apparatus 3.

By the above-described operation, when the user goes to the event venue, the user can unlock the wireless storage apparatus 3, and view the contents stored in the wireless storage apparatus 3 after the event.

According to the present example, the service provider can sell an advance ticket with contents that can be used after the event, and put an added value to the advance ticket.

Tenth Example

In a tenth example, the wireless storage apparatus 3 is assumed to be used in agriculture or the like. In this example, the service provider is, for example, a producer of agricultural products, and the user is, for example, a member of a store or a member of a courier service.

First, the service provider stores data such as locality information of agricultural products in the wireless storage apparatus 3, and sends the wireless storage apparatus 3 to the store or the home of a courier service member, together with agricultural products, in a state in which the wireless storage apparatus 3 is locked. Further, in the services for the members of the store, the wireless storage apparatus 3 is placed in, for example, the agricultural product sales place of the store.

The condition for unlocking is assumed to be, for example, matching of a group ID.

The user moves the information processing apparatus 4 to the wireless storage apparatus 3 which is placed in the store, or the wireless storage apparatus 3 which is sent together with the agricultural products. Since the group ID matches, the wireless storage apparatus 3 can be unlocked. The user can view the locality information stored in the wireless storage apparatus 3.

According to the present example, the locality information can be transmitted to a particular member, from the locality or the producer which is a service provider.

Eleventh Example

In an eleventh example, private data are assumed to be stored in the wireless storage apparatus 3.

First, when shipping the wireless storage apparatus 3, the user stores contents (private data) to be sent to a recipient in the wireless storage apparatus 3. In addition, the user stores the condition information 102 including the phone number and the like in the wireless storage apparatus 3 and locks the wireless storage apparatus 3, through the application executed on the information processing apparatus 4. The user ships the wireless storage apparatus 3 to the recipient.

The condition for unlocking is assumed to be, for example, matching of the phone number of the wireless storage apparatus 3. The recipient of the wireless storage apparatus 3 wirelessly communicates with the received wireless storage apparatus 3 by using the information processing apparatus 4. The information processing apparatus 4 transmits, for example, the phone number stored in the storage unit 41 of the information processing apparatus 4, to the wireless storage apparatus 3. If the phone number is matched in the wireless storage apparatus 3, the wireless storage apparatus 3 unlocks the lock. Thus, the recipient of the wireless storage apparatus 3 can view the contents stored in the wireless storage apparatus 3.

According to the present example, it is possible to safely and privately mail the contents stored in the wireless storage apparatus 3.

Twelfth Example

In a twelfth example, personal information is assumed to be stored in the wireless storage apparatus 3.

In this example, the wireless storage apparatus 3 is used to transport personal information. The user stores personal information (face photo data of a student or a customer, performance data, my number, or the like) or trade secret of a company for which the user works, in the wireless storage apparatus 3, and locks it.

The condition for unlocking is assumed to be, for example, matching of a password and the apparatus ID of the information processing apparatus 4 that the user owns.

To read the personal information stored in the wireless storage apparatus 3, the user unlocks the wireless storage apparatus 3, and when data reading is finished, the user locks again the wireless storage apparatus 3. This makes it possible to increase security of the personal information stored in the wireless storage apparatus 3.

According to the present example, even if the user loses the wireless storage apparatus 3, since the wireless storage apparatus 3 cannot be unlocked if there is no information processing apparatus 4 and password of the user, it is possible to enhance confidentiality of personal information.

Thirteenth Example

In a thirteenth example, the wireless storage apparatus 3 is assumed to be used in an education and learning support industry. In this example, the service provider is for example, a publisher of a learning magazine, or the like, and the user is a general customer of the service provider.

First, the service provider stores for example, the commentary data related to a historical place in the wireless storage apparatus 3, and sells the wireless storage apparatus 3 as an appendix of a learning booklet or the like in a state where the wireless storage apparatus 3 is locked. It should be noted that, if the data amount of the commentary data is larger than the capacity of the wireless storage apparatus 3, the wireless storage apparatus 3 may store the links to commentary data.

The conditions for unlocking are that, for example, position information is within a predetermined area, and the match of the apparatus ID of the information processing apparatus 4 that the user owns. The predetermined area represents, for example, position that the service provider determines in advance, such as historical places.

When the user goes to a designated historical place, the wireless storage apparatus 3 is unlocked. The electronic apparatus 2 or the information processing apparatus 4 reads the commentary data from the wireless storage apparatus 3, and displays the data. Thus, the user can view the commentary at the historical place.

In addition, the wireless storage apparatus 3 may store the visit and stay history of the user. In the present example, the service provider can provide a learning support service which increases the expectation and interest of the user and improves the learning motivation.

Fourteenth Example

In a fourteenth example, the wireless storage apparatus 3 is assumed to be used in a medical and welfare industry. In this example, the service provider is for example, a hospital, or the like, and the user is a patient, or the like.

The service provider stores personal information of a patient (such as medical record data, diagnosis result, visit history, surgery history, and growth data) in the wireless storage apparatus 3, and locks the wireless storage apparatus 3.

The conditions for unlocking are for example, the match of the password, and the match of the apparatus ID of the information processing apparatus 4 that the service provider owns. For example, the password is determined by the service provider, and is added to the condition information 102 of the wireless communication memory 37 of the wireless storage apparatus 3 through the application or the like executed in the information processing apparatus 4.

When examining the user, or performing an administrative procedure about the user, the service provider unlocks the wireless storage apparatus 3, and locks the wireless storage apparatus 3 again at the end of the diagnosis or procedure. This prevents unnecessary personal information from being referred to.

According to the present example, even if the user has lost the wireless storage apparatus 3, or even if the wireless storage apparatus 3 is passed to the hospital staff who is not required to refer to the personal information, since the wireless storage apparatus 3 cannot be unlocked if a specific information processing apparatus 4 and the password do not match, it is possible to safely pass the personal information.

Fifteenth Example

In a fifteenth example, the wireless storage apparatus 3 is assumed to be used in education and learning support or the like. In this example, the service provider is, for example, a tutoring school, and the user is a general customer of the service provider.

The service provider may store text data in the wireless storage apparatus 3, lock the wireless storage apparatus 3, and distribute the locked wireless storage apparatus 3 to the users. For example, the user may store the wireless storage apparatus 3 in an ID card.

The conditions for unlocking are, for example, a lapse of a predetermined period of time, and the match of the apparatus ID of the information processing apparatus 4 that the user owns. The information processing apparatus 4 may be, for example, a tablet that the user uses in a tutoring school.

If the predetermined period of time indicated by the time information included in the condition information 102 has elapsed and the apparatus IDs match, the wireless storage apparatus 3 is unlocked, and the user can view the text data which is stored in the wireless storage apparatus 3 after a lapse of the predetermined period of time.

According to the present example, the service provider can provide a service that encourages the user to re-implement problems that the user makes a mistake, in a limited time, and increase the learning effect.

Sixteenth Example

In a sixteenth example, the data of a three-dimensional (3D) printer is assumed to be stored in the wireless storage apparatus 3. The service provider in this example is, for example, a 3D figure production supplier or the like, and a user is a general customer of the service provider or the like.

The user stores 3D data of a human body, which is personal information, in the wireless storage apparatus 3, locks the wireless storage apparatus 3, and passes the data to the service provider.

The conditions for unlocking are, for example, the match of a password and the apparatus ID of the information processing apparatus 4 that the service provider owns. The password may be shared by the user and the service provider.

The user unlocks the wireless storage apparatus 3, stores the 3D data of the user, and then locks the wireless storage apparatus 3.

The user passes the wireless storage apparatus 3 which stores the 3D data, to the service provider. The service provider unlocks the wireless storage apparatus 3, and creates a figure by using the 3D printer, based on the 3D data stored in the wireless storage apparatus 3.

According to the present aspect, it is possible to enhance confidentiality of personal information. In the present example, even when the user or the service provider loses the wireless storage apparatus 3, if there is no specific information processing apparatus 4 and password, it is not possible to unlock the wireless storage apparatus 3, thereby securely passing the personal information.

Third Embodiment

In a third embodiment, the information processing system 1 according to the first and second embodiments will be described in more detail, or a modification example of the information processing system 1 according to the first and second embodiments will be described.

In the information processing system 1, the wireless storage apparatus 3 stores, for example, the condition information 102 including the apparatus ID and the password, in the wireless communication memory 37. The information processing apparatus 4 transmits the verification information 204 including the apparatus ID and the password to the wireless storage apparatus 3 by wireless communication.

The communication controller 34 of the wireless storage apparatus 3 performs authentication using the apparatus ID and the password, based on the condition information 102 and the verification information 204.

When the authentication is successful, the wireless storage apparatus 3 notifies the information processing apparatus 4 that the authentication is successful, by wireless communication.

When the authentication is successful, the information processing apparatus 4 sends an instruction to lock or unlock to the wireless storage apparatus 3 by wireless communication. The communication controller 34 of the wireless storage apparatus 3 stores the lock state information 101 indicating a lock state or an unlock state, in response to the instruction to lock or unlock, in a specific area of the wireless communication memory 37.

When the electronic apparatus 2 supplies power to the wireless storage apparatus 3, the controller 33 reads the lock state information 101 from the specific area of the wireless communication memory 37, and determines whether the lock state information indicates lock or unlock.

When it is determined that the lock state information indicates lock, the controller 33 rejects reading of data and writing of data from and to the nonvolatile memory 32.

For example, the apparatus ID in the condition information 102 may be read regardless of the success or failure of the authentication, and the password may be read and written only when the authentication is successful. As a result, it is possible to enhance the security of the password.

When authentication is successful, the information processing apparatus 4 may be capable of writing data and reading data to and from the wireless communication memory 37, by wireless communication.

Figure 9:
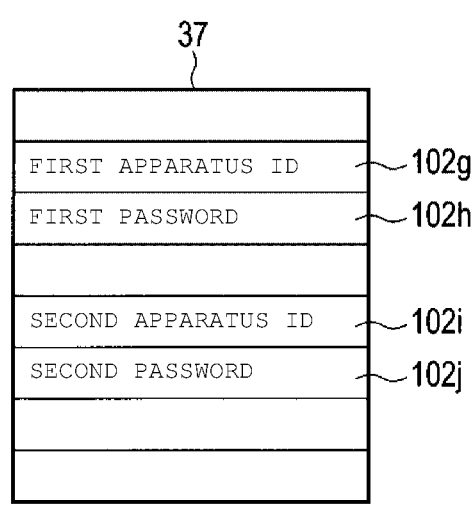
FIG. 9 illustrates a data structure of data stored in the wireless storage apparatus when a plurality of information processing apparatuses has access to the storage apparatus.

FIG. 9 illustrates an example of the wireless communication memory 37 when a plurality of information processing apparatuses has access to the wireless communication memory 37. FIG. 9 illustrates the wireless communication memory 37 when a first information processing apparatus and a second information processing apparatus have access, but three or more information processing apparatuses may have access.

The wireless communication memory 37 stores a first apparatus ID 102g of the first information processing apparatus and a first password 102h corresponding to the first information processing apparatus.

The wireless communication memory 37 also stores a second apparatus ID 102i of the second information processing apparatus and a second password 102j corresponding to the second information processing apparatus.

Here, a specific method of storing the first apparatus ID 102g, the first password 102h, the second apparatus ID 102i, and the second password 102j in the wireless communication memory 37 will be described below.

The wireless communication memory 37 stores the first apparatus ID 102g and the first password 102h for the first information processing apparatus in advance.

The second information processing apparatus transmits the second apparatus ID 102i and the second password 102j to the first information processing apparatus by using an NFC P2P mode between the first information processing apparatus and the second information processing apparatus. The NFC P2P mode is a function of transmitting and receiving data by NFC communication between apparatuses using an NFC wireless communication function.

Next, the first information processing apparatus transmits the second apparatus ID 102i and the second password 102j which are received from the second information processing apparatus, to the wireless storage apparatus 3 by wireless communication, and the wireless communication memory 37 of the wireless storage apparatus 3 stores the second apparatus ID 102i and the second password 102j.

According to the present embodiment, it is possible to increase the number of information processing apparatuses capable of locking or unlocking the wireless storage apparatus 3.

In the present embodiment, information on the second information processing apparatus is stored in the wireless communication memory 37 through the first information processing apparatus. Thus, it is possible to prevent information from being stored in the wireless communication memory 37 by an external apparatus which is not intended by the user. Further, it is possible to simplify an operation of storing information in the wireless communication memory 37 and simply increase the number of apparatuses having access by the wireless storage apparatus 3, by using wireless communication.

Figure 10:
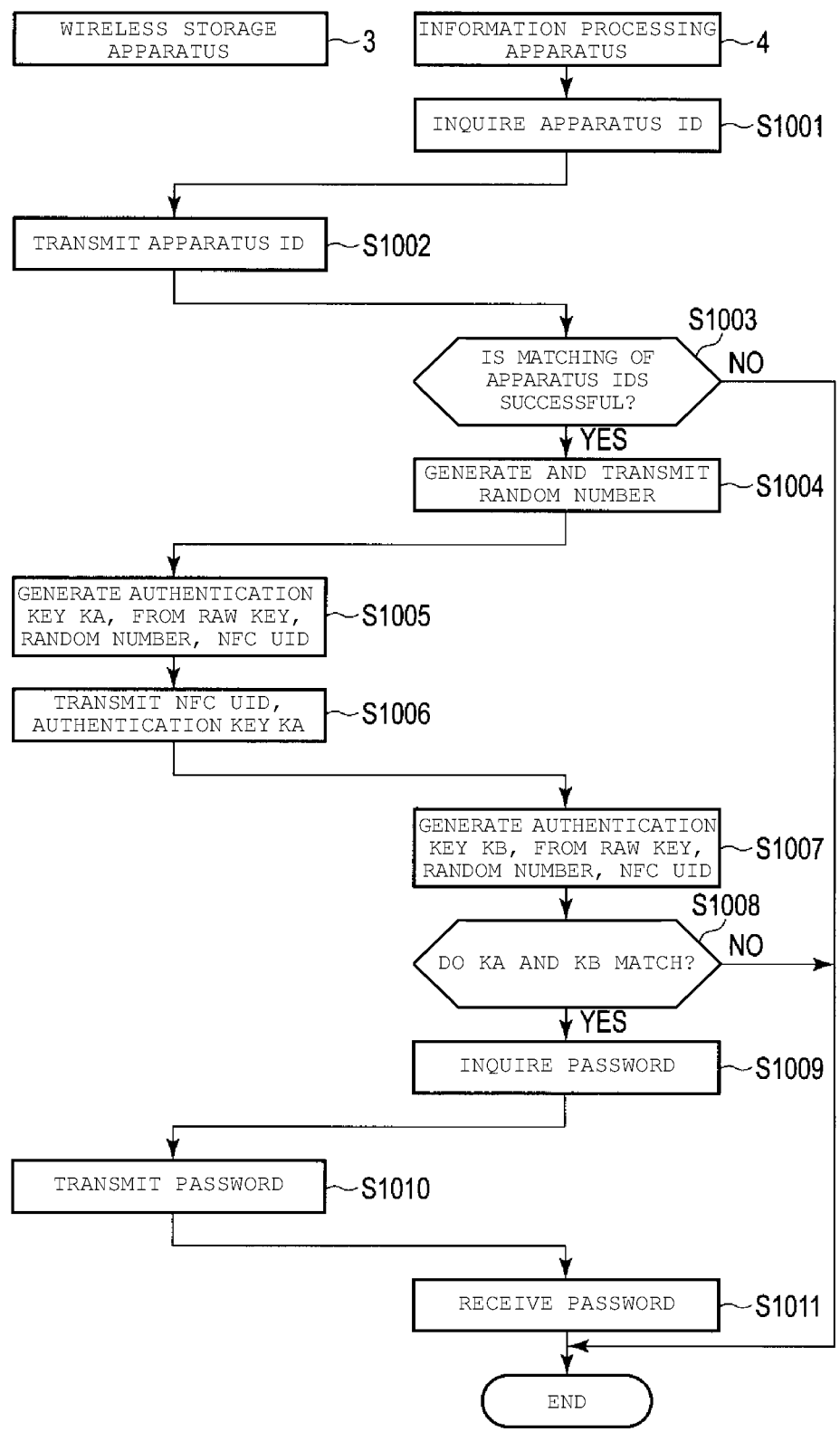
FIG. 10 is a flow chart illustrating an authentication process performed by a wireless storage apparatus and an information processing apparatus according to a third embodiment.

FIG. 10 is a flow chart illustrating an authentication process by the wireless storage apparatus 3 and the information processing apparatus 4 according to the present embodiment. In FIG. 10, the information processing apparatus 4 acquires a password based on an authentication result. The information processing apparatus 4 controls an access to the wireless storage apparatus 3 using the password.

As an initial setting, the wireless storage apparatus 3 and the information processing apparatus 4 are assumed to have a common key. The wireless storage apparatus 3 stores the apparatus ID and the password to be authenticated.

In the present embodiment, the common key is data required to generate the authentication key which is used for encryption of communication data. For example, the common key is stored in the secret area 37a of the wireless communication memory 37 and the secret area of the storage unit 41 of the information processing apparatus 4.

During wireless communication after the initial setting, first, in step S1001, the information processing apparatus 4 transmits an inquiry of an apparatus ID to the wireless storage apparatus 3, by wireless communication.

In step S1002, the wireless storage apparatus 3 transmits the apparatus ID stored in the wireless communication memory 37 to the information processing apparatus 4.

In step S1003, the information processing apparatus 4 determines whether or not the apparatus ID received from the wireless storage apparatus 3 matches the apparatus ID of the information processing apparatus 4.

When the apparatus IDs do not match, the process ends. When the apparatus IDs match, the information processing apparatus 4 generates a random number, and transmits the number to the wireless storage apparatus 3 in step S1004.

In step S1005, the wireless storage apparatus 3 generates an authentication key KA, based on the common key, the random number received from the information processing apparatus 4, and an NFC UID, which is a unique apparatus ID of the wireless storage apparatus 3. In step S1006, the wireless storage apparatus 3 transmits the generated authentication key KA and the NFC UID to the information processing apparatus 4.

In step S1007, the information processing apparatus 4 generates an authentication key KB, based on the common key stored in the information processing apparatus 4, the random number generated in step S1004, and the NFC UID received from the wireless storage apparatus 3.

In step S1008, the information processing apparatus 4 determines whether or not the authentication key KA matches the authentication key KB.

When the authentication keys do not match, the process ends. When the authentication keys match, the information processing apparatus 4 transmits an inquiry of a password to the wireless storage apparatus 3 in step S1009.

In step S1010, the wireless storage apparatus 3 transmits the password stored in the wireless communication memory 37 to the information processing apparatus 4.

In step S1011, the information processing apparatus 4 receives the password from the wireless storage apparatus 3. For example, the information processing apparatus 4 determines whether or not the password received from the wireless storage apparatus 3 matches the password which is stored in the information processing apparatus 4, for example, the password which is input by the user. When the passwords match, it is determined that the authentication is completed.

In the present embodiment, the information processing apparatus 4 acquires the password of the wireless storage apparatus 3 based on the authentication result, and controls the access to the wireless storage apparatus 3.

In the present embodiment, the wireless storage apparatus 3 and the information processing apparatus 4 have the common key. The wireless storage apparatus 3 and the information processing apparatus 4 respectively generate the authentication keys KA and KB by using the random number generated by the information processing apparatus 4. The wireless storage apparatus 3 and the information processing apparatus 4 do not transmit and receive the common key to each other, and check that they have a legitimate key, based on the authentication keys KA and KB.

According to the present embodiment, when the authentication keys KA and KB match, the reading and writing from and to the specific area of the wireless communication memory 37 is permitted. Thus, it is possible to increase the security for a specific area of the wireless communication memory 37.

In FIG. 10, the information processing apparatus 4 performs authentication. Alternatively, the wireless storage apparatus 3 may perform authentication. For example, the wireless storage apparatus 3 may acquire the authentication key KB generated by the information processing apparatus 4, and the wireless storage apparatus 3 may determine whether or not the authentication key KA matches the authentication key KB.

Fourth Embodiment

In a fourth embodiment, a modification example of the first to third embodiments will be described. The wireless storage apparatus 3 according to the present embodiment operates in three different security modes (lock modes): a normal mode, a one-time unlock mode, and a read lock mode (a write-only mode).

In the present embodiment, locking (access limit) or unlocking (access permit) of an access to the nonvolatile memory 32 of the wireless storage apparatus 3 is simply referred to as locking or unlocking of the nonvolatile memory 32 or the wireless storage apparatus 3.

The normal mode is a mode in which the memory controller 35 locks or unlocks the access to the nonvolatile memory 32, by wireless communication from the information processing apparatus 4 to the communication controller 34, when the user locks or unlocks the access to the nonvolatile memory 32. In the normal mode, locking or unlocking means that for example, the controller 33 transmits a lock/unlock command to the memory controller 35, and the memory controller 35 locks or unlocks the access to the nonvolatile memory 32 in response to the lock/unlock command.

The one-time unlock mode is, for example, a mode of automatically locking the nonvolatile memory 32 which is unlocked, when the power supply from the electronic apparatus 2 to the wireless storage apparatus 3 is stopped. In the one-time unlock mode, a state in which the access to the nonvolatile memory 32 is locked is a basic state of the wireless storage apparatus 3, and a state in which the access to the nonvolatile memory 32 is unlocked is an exceptional state of the wireless storage apparatus 3. In the wireless storage apparatus 3 of the one-time unlock mode, for example, when the wireless storage apparatus 3 is detached from the electronic apparatus 2, or when the power supply from the electronic apparatus 2 to wireless storage apparatus 3 is stopped, the access to the nonvolatile memory 32 is locked. Also in the one-time unlock mode, similar to the above normal mode, locking or unlocking means that for example, the controller 33 transmits a lock/unlock command to the memory controller 35, and the memory controller 35 locks or unlocks the access to the nonvolatile memory 32 in response to the lock/unlock command.

The read lock mode is, for example, a mode in which the reading from the nonvolatile memory 32 is locked, and the controller 33 reads dummy data of data corresponding to a read command from the nonvolatile memory 32 through the memory controller 35, and returns the read dummy data to the electronic apparatus 2 which is the source of the read command, or a mode at which the controller 33 returns a response indicating that reading is not permitted, to the source of the read command. In the read lock mode, for example, even when reading from the nonvolatile memory 32 is locked, the controller 33 is able to write data corresponding to the write command to the nonvolatile memory 32 through the memory controller 35.

Although the wireless storage apparatus 3 according to the present embodiment is capable of freely switching the three security modes, the wireless storage apparatus 3 may implement one or two of the three security modes.

Figure 11:
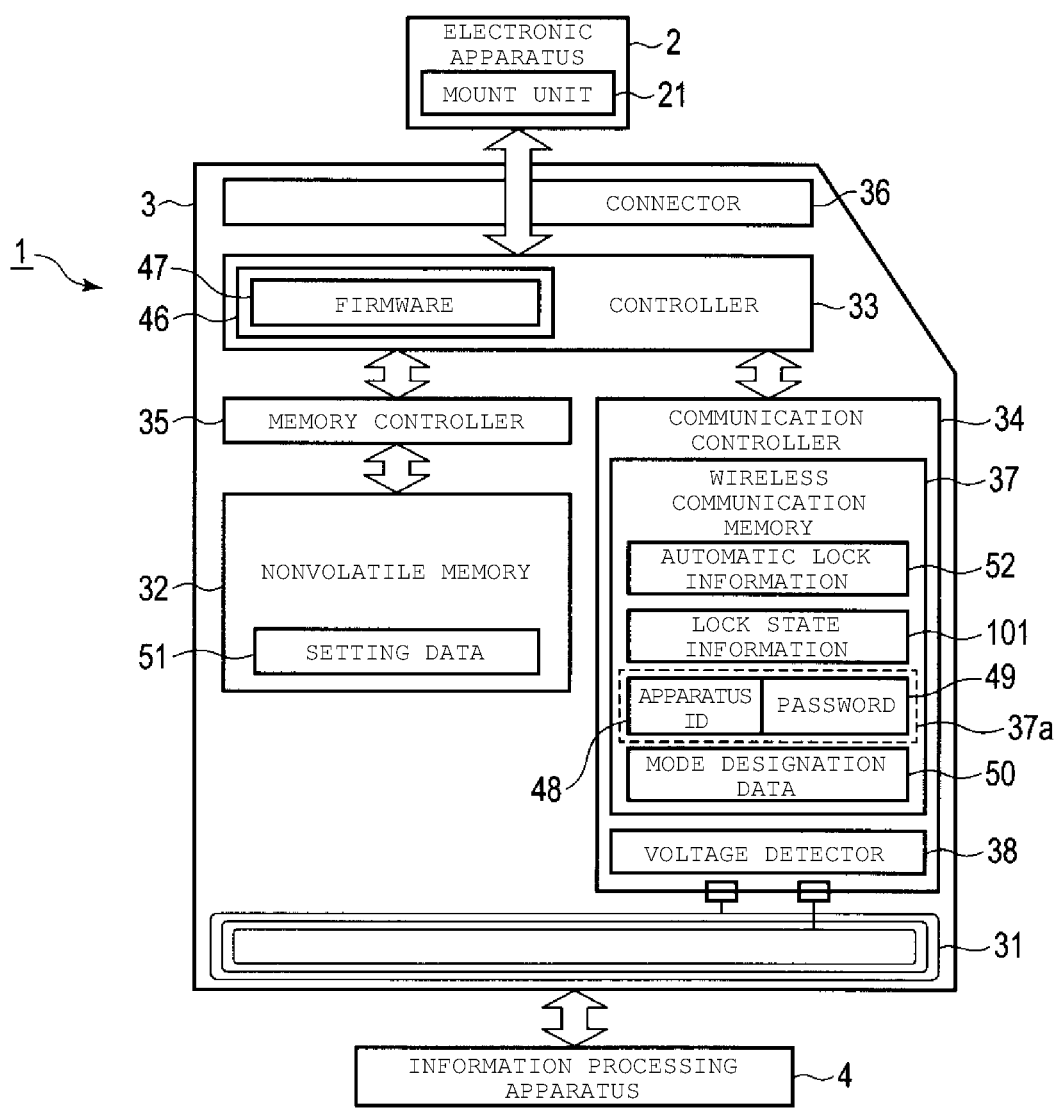
FIG. 11 is a block diagram of an information processing system including a wireless storage apparatus according to a fourth embodiment.

FIG. 11 is a block diagram of the information processing system 1 including the wireless storage apparatus 3 according to the present embodiment.

The controller 33 of the wireless storage apparatus 3 includes a memory 46. The memory 46 stores firmware 47. The controller 33 performs various controls by reading and executing the firmware 47 stored in the memory 46. The controller 33 is, for example, a bridge controller that controls transmission and reception of data between the communication controller 34 and the memory controller 35.

The communication controller 34 receives the apparatus ID 48 and the password 49 of the information processing apparatus 4, and a write command of the apparatus ID 48 and the password 49, by wireless communication with the information processing apparatus 4 through the wireless antenna 31, and stores the received apparatus ID 48 and the password 49 in the secret area 37a of the wireless communication memory 37.

In the present embodiment, the secret area 37a is used as an authentication area by the communication controller 34. In the present embodiment, the authentication is performed by the communication controller 34 determining whether or not the apparatus ID 48 and the password 49 stored in the secret area 37a match the apparatus ID and the password that the communication controller 34 receives from an external apparatus through the wireless antenna 31. Alternatively, the authentication may be performed by the communication controller 34 determining whether or not one of the apparatus ID 48 and the password 49 matches one of the apparatus ID and the password that are received from an external apparatus. In the present embodiment, although the apparatus ID 48 and the password 49 are stored in the secret area 37a, one of the apparatus ID 48 and the password 49 may be stored in the secret area 37a and used for authentication.

The communication controller 34 receives mode designation data 50 and a write command of the mode designation data 50, by wireless communication from the information processing apparatus 4 through the wireless antenna 31, and stores the received mode designation data 50 in the wireless communication memory 37.

To change the mode designation data 50 stored in the wireless communication memory 37, a mode designation command may be transmitted to the communication controller 34 by wireless communication from the information processing apparatus 4 through the wireless antenna 31, and the communication controller 34 may update the mode designation data 50 stored in the wireless communication memory 37 in response to the mode designation command.

The mode designation data 50 is, for example, information designating a security mode among a normal mode, a one-time unlock mode, and a read lock mode in which the wireless storage apparatus 3 is to operate, and for example, flag information.

The controller 33 receives setting data 51 and a write command of the setting data 51 from the electronic apparatus 2 through the connector 36. Then, the controller 33 stores the setting data 51 in the nonvolatile memory 32 through the memory controller 35.

In the one-time unlock mode, the setting data 51 designates conditions for changing the nonvolatile memory 32 from the unlock state to the lock state.

More specifically, the setting data 51 includes, for example, at least one of first to seventh conditions.

The first condition is that for example, a file or a folder is stored in the nonvolatile memory 32. The second condition is that for example, there is a file of a predetermined size or less among the files stored in the nonvolatile memory 32. The third condition is that for example, the size of the latest file stored in the nonvolatile memory 32 is equal to or less than a predetermined value. The fourth condition is that for example, the total data amount of data stored in the nonvolatile memory 32 is a predetermined value or more. The fifth condition is that the startup time of the nonvolatile memory 32 is a predetermined value or more. The sixth condition is that a file having a particular extension is stored in the nonvolatile memory 32. When this sixth condition is used, for example, a file having a particular extension is stored in the nonvolatile memory 32, which allows the wireless storage apparatus 3 to be capable of performing an operation based on the one-time unlock mode. The seventh condition is that an image file is stored in the nonvolatile memory 32 and protected in response to a command from the electronic apparatus 2. When using the seventh condition, for example, the security of any of the data in the nonvolatile memory 32 is locked (protected), such that the wireless storage apparatus 3 can perform the operation based on the one-time unlock mode.

The setting data 51 includes, for example, the above first to seventh conditions, the parameters (for example, a predetermined value), and designation of one or more conditions to be used among the first to seventh conditions.

The setting data 51 may include, for example, designation of file names, folder names, or extension names which are excluded from the file names and the folder names which are stored in the nonvolatile memory 32, based on the determination using the above first to seventh conditions. The setting data 51 may include excluding conditions.

When the condition designated in the setting data 51 is met, the controller 33 permits the lock of an access to the nonvolatile memory 32.

The controller 33 reads out the setting data 51 from the nonvolatile memory 32 through the memory controller 35, and determines whether or not the condition specified in the setting data 51 is satisfied.

The wireless communication memory 37 further stores the lock state information 101 and the automatic lock information 52.

The lock state information 101 is information designating locking or unlocking the nonvolatile memory 32, and is, for example, flag information.

The automatic lock information 52 is information for automatically locking the access from the controller 33 of the wireless storage apparatus 3 to the nonvolatile memory 32 through the memory controller 35, if the one-time unlock mode is designated by the mode designation data 50, the condition designated in the setting data 51 is satisfied, and the power supply from the electronic apparatus 2 or another electronic apparatus which is electrically connected to the electronic apparatus 2 to the wireless storage apparatus 3 is resumed after the power supply from the electronic apparatus 2 to the wireless storage apparatus 3 is stopped. The automatic lock information 52 is, for example, flag information. In other words, the automatic lock information 52 is information for automatically locking the access from the memory controller 35 to the nonvolatile memory 32, when the power is supplied again by the electronic apparatus 2 or another electronic apparatus to the wireless storage apparatus 3 operating in the one-time unlock mode.

In addition, in the present embodiment, the apparatus ID 48, the password 49, the mode designation data 50, the lock state information 101, or the automatic lock information 52 may not be stored in the wireless communication memory 37, and instead in the nonvolatile memory 32 through the memory controller 35 by the controller 33. The setting data 51 is stored in the nonvolatile memory 32, but may be stored in the wireless communication memory 37 through the communication controller 34 by the controller 33.

The wireless storage apparatus 3 receives the apparatus ID 48, the password 49, and the mode designation data 50 by the communication controller 34 through the wireless antenna 31 from the information processing apparatus 4 in the present embodiment, but may receive them by the controller 33 from the electronic apparatus 2 through the connector 36. The wireless storage apparatus 3 receives the setting data 51 by the controller 33 from the electronic apparatus 2 through the connector 36, but may receive the data by the communication controller 34 from the information processing apparatus 4 through the wireless antenna 31. In other words, the wireless storage apparatus 3 may receive the apparatus ID 48, the password 49, the mode designation data 50, and the setting data 51, from either the electronic apparatus 2 or the information processing apparatus 4.

In the present embodiment, the controller 33 and the memory controller 35 may be combined. More specifically, the memory controller 35 may be included in the controller 33. The controller 33 and the memory controller 35 may be formed as, for example, a single chip.

In the present embodiment, the communication controller 34 is operable based on the power generated in the wireless antenna 31, but for example, the nonvolatile memory 32, the controller 33, and the memory controller 35 may also be operable based on the power generated in the wireless antenna 31. In this case, the controller 33, the communication controller 34, and the memory controller 35 can be freely combined.

The controller 33 switches locking and unlocking of the access to the nonvolatile memory 32, by referring to the apparatus ID 48, the password 49, the mode designation data 50, the lock state information 101, and the automatic lock information 52, which are stored in the wireless communication memory 37, through the communication controller 34, and the setting data 51 which is stored in the nonvolatile memory 32 through the memory controller 35.

The information processing system 1 according to the present embodiment performs the setting of the apparatus ID 48 and the password 49, for example, by the information processing apparatus 4 and the wireless storage apparatus 3, as a first initial setting. In the present embodiment, the communication controller 34 performs authentication of the information processing apparatus 4 by determining whether or not the apparatus ID 48 and the password 49 which are stored in the secret area 37a match the apparatus ID and the password which are received by the communication controller 34 from the information processing apparatus 4 through the wireless antenna 31. Since the communication controller 34 allows the information processing apparatus 4 that has been successfully authenticated to lock or unlock the access to the nonvolatile memory 32, the first initial setting is performed.

The information processing system 1 performs the setting of the security mode of the wireless storage apparatus 3, for example, by the information processing apparatus 4 and the wireless storage apparatus 3, as a second initial setting. The second initial setting is performed in order to enable the switching among the normal mode, the one-time unlock mode, and the read lock mode.

The information processing system 1 performs the storage of the setting data 51, for example, by the electronic apparatus 2 and the wireless storage apparatus 3, as a third initial setting. In the third initial setting, setting of detailed conditions included in the setting data 51 may be performed with respect to the one-time unlock mode.

The first to third initial settings are performed, for example, when the user first uses the wireless storage apparatus 3 or performs any setting of the wireless storage apparatus 3.

Further, the information processing system 1, as a first operation, rewrites the lock state information 101 that indicates the locking or unlocking of the nonvolatile memory 32 by the information processing apparatus 4.

The information processing system 1 performs an operation according to the security mode which is set, as a second operation.

Below, the first initial setting, the second initial setting, the third initial setting, the first operation, and the second operation by the information processing system 1 will be described with reference to flow charts.

Figure 12:
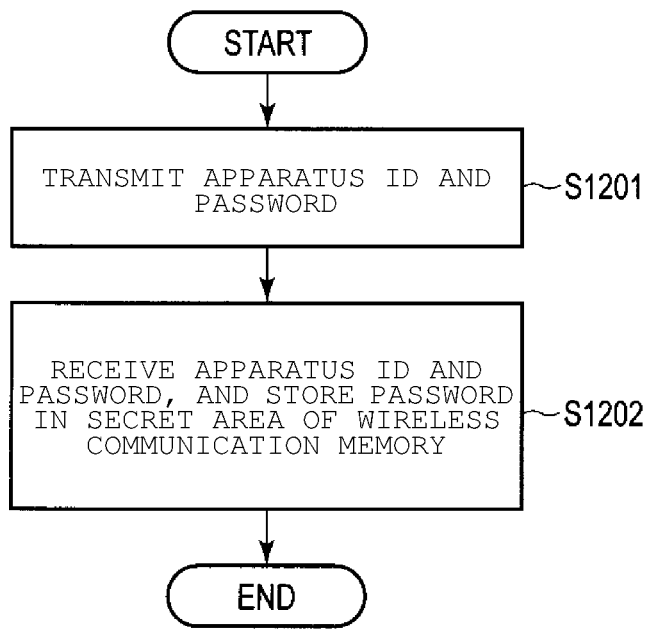
FIG. 12 is a flow chart illustrating an example of a first initial setting according to the fourth embodiment.

FIG. 12 is a flow chart illustrating an example of the first initial setting according to the present embodiment.

In step S1201, the control unit 1085 of the information processing apparatus 4 transmits, for example, the apparatus ID 48 and the password 49, which are stored in the storage unit 1090, and a write command, to the wireless storage apparatus 3 through the communication controller 1080 and the wireless antenna 1075, by wireless communication.

In step S1202, the communication controller 34 of the wireless storage apparatus 3 receives the apparatus ID 48, the password 49, and the write command, from the information processing apparatus 4 through the wireless antenna 31 by wireless communication, and stores the received apparatus ID 48 and the password 49 in the secret area 37a of the wireless communication memory 37.

Figure 13:
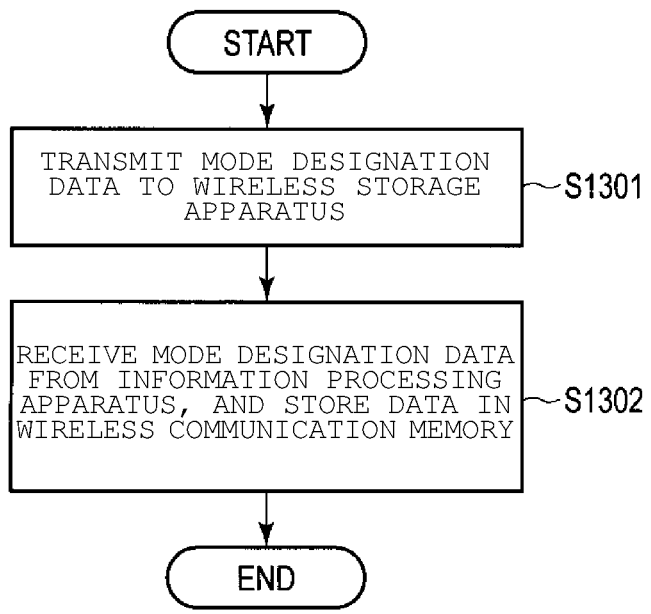
FIG. 13 is a flow chart illustrating an example of a second initial setting according to the fourth embodiment.

FIG. 13 is a flow chart illustrating an example of the second initial setting according to the present embodiment. This second initial setting enables the switching of the security mode. The communication controller 34 of the wireless storage apparatus 3 performs authentication of the information processing apparatus 4 by determining whether or not the apparatus ID 48 and the password 49 which are stored in the secret area 37a match the apparatus ID and the password which are received by the communication controller 34 from the information processing apparatus 4 through the wireless antenna 31. The process in FIG. 13 may be performed when the authentication result is successful.

In step S1301, the control unit 1085 of the information processing apparatus 4 transmits, for example, the mode designation data 50 which is designated by the user, and is stored in the storage unit 1090, and the write command, to the wireless storage apparatus 3, through the communication controller 1080 and the wireless antenna 1075, by wireless communication.

In step S1302, the communication controller 34 of the wireless storage apparatus 3 receives the mode designation data 50 and the write command from the information processing apparatus 4 through the wireless antenna 31, by wireless communication, and stores the received mode designation data 50 in the wireless communication memory 37.

Figure 14:
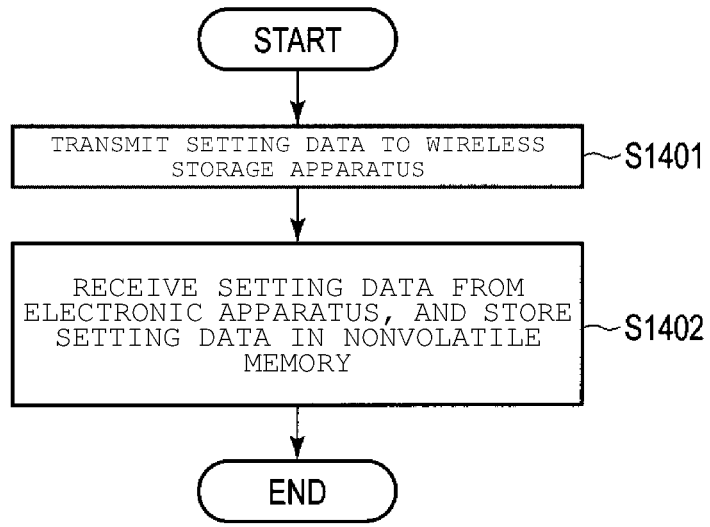
FIG. 14 is a flow chart illustrating an example of a third initial setting according to the fourth embodiment.

FIG. 14 is a flow chart illustrating an example of the third initial setting according to the present embodiment.

In step S1401, the electronic apparatus 2 transmits, for example, the setting data 51 to the wireless storage apparatus 3 which is mounted on the mount unit 21.

In step S1402, the controller 33 of the wireless storage apparatus 3 receives the setting data 51 from the electronic apparatus 2 through the connector 36, and stores the received setting data 51 in the nonvolatile memory 32, through the memory controller 35.

Figure 15:
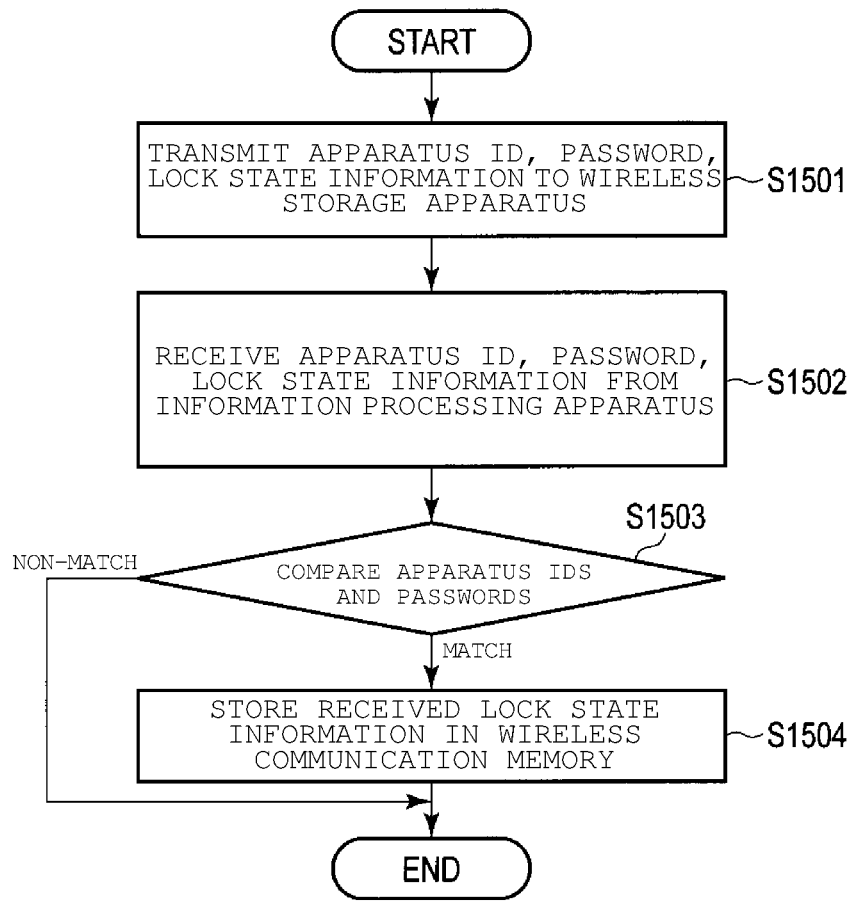
FIG. 15 is a flow chart illustrating an example of a first operation according to the fourth embodiment.

FIG. 15 is a flow chart illustrating an example of the first operation according to the present embodiment. In the first operation, when the lock state information 101 is rewritten, authentication is performed using the apparatus ID 48 and the password 49 for the information processing apparatus 4 which sends an instruction of rewriting of the lock state information 101. Therefore, only authenticated information processing apparatus 4 can switch the locking and the unlocking of the nonvolatile memory 32 of the wireless storage apparatus 3.

In step S1501, the information processing apparatus 4 transmits, for example, the lock state information 101 which is designated by the user, and is stored in the storage unit 1090, the apparatus ID and password, and a write command, to the wireless storage apparatus 3, through the communication controller 1080 and the wireless antenna 1075, by wireless communication.

In step S1502, the communication controller 34 of the wireless storage apparatus 3 receives the lock state information 101, the apparatus ID and password, and the write command, from the information processing apparatus 4, through the wireless antenna 31, by wireless communication.

In step S1503, the communication controller 34 reads the apparatus ID 48 and the password 49 from the wireless communication memory 37, and compares the apparatus ID 48 and the password 49 which are read with the apparatus ID and the password which are received.

When the apparatus ID 48 and the password 49 which are read do not match the apparatus ID and the password which are received, the process ends.

When the apparatus ID 48 and the password 49 which are read match the apparatus ID and the password which are received, the communication controller 34 stores the received lock state information 101 in the wireless communication memory 37, in step S1504.

Figure 16:
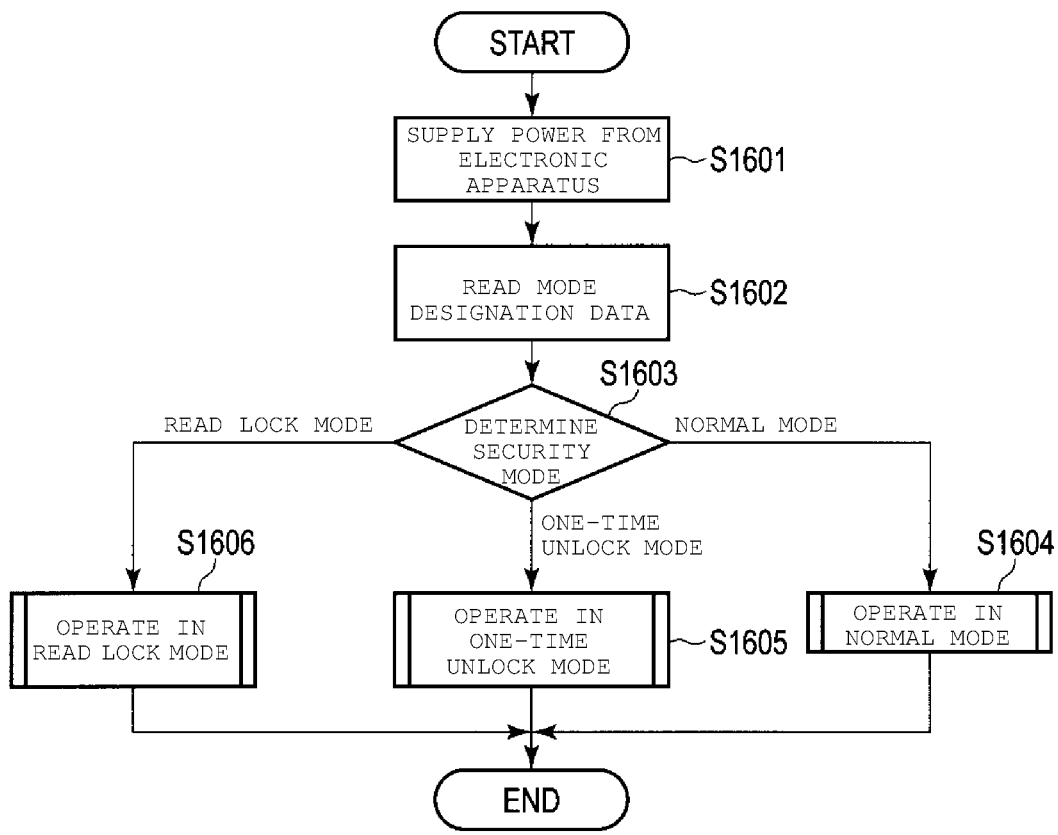
FIG. 16 is a flow chart illustrating an example of a second operation according to the fourth embodiment.

FIG. 16 is a flow chart illustrating an example of the second operation according to the present embodiment. In step S1601, the wireless storage apparatus 3 is supplied with the power from the electronic apparatus 2.

In step S1602, the controller 33 of the wireless storage apparatus 3 reads the mode designation data 50 from the wireless communication memory 37, through the communication controller 34.

In addition, the read-out of the mode designation data 50 may be performed, for example, at the timing when the electronic apparatus 2 accesses the wireless storage apparatus 3, periodically, or in response to a command in a state in which the wireless storage apparatus 3 is supplied with power from the electronic apparatus 2.

In step S1603, the controller 33 determines the security mode of the wireless storage apparatus 3, based on the read mode designation data 50.

If the security mode is the normal mode, the controller 33 operates in the normal mode in step S1604. The process carried out in the normal mode will be described in detail with reference to FIG. 17.

If the security mode is the one-time unlock mode, the controller 33 operates in the one-time unlock mode in step S1605. The process carried out in the one-time unlock mode will be described in detail with reference to FIG. 18.

If the security mode is the read lock mode, the controller 33 operates in the read lock mode in step S1606. The process carried out in the read lock mode will be described in detail with reference to FIG. 19 to FIG. 21.

Figure 17:
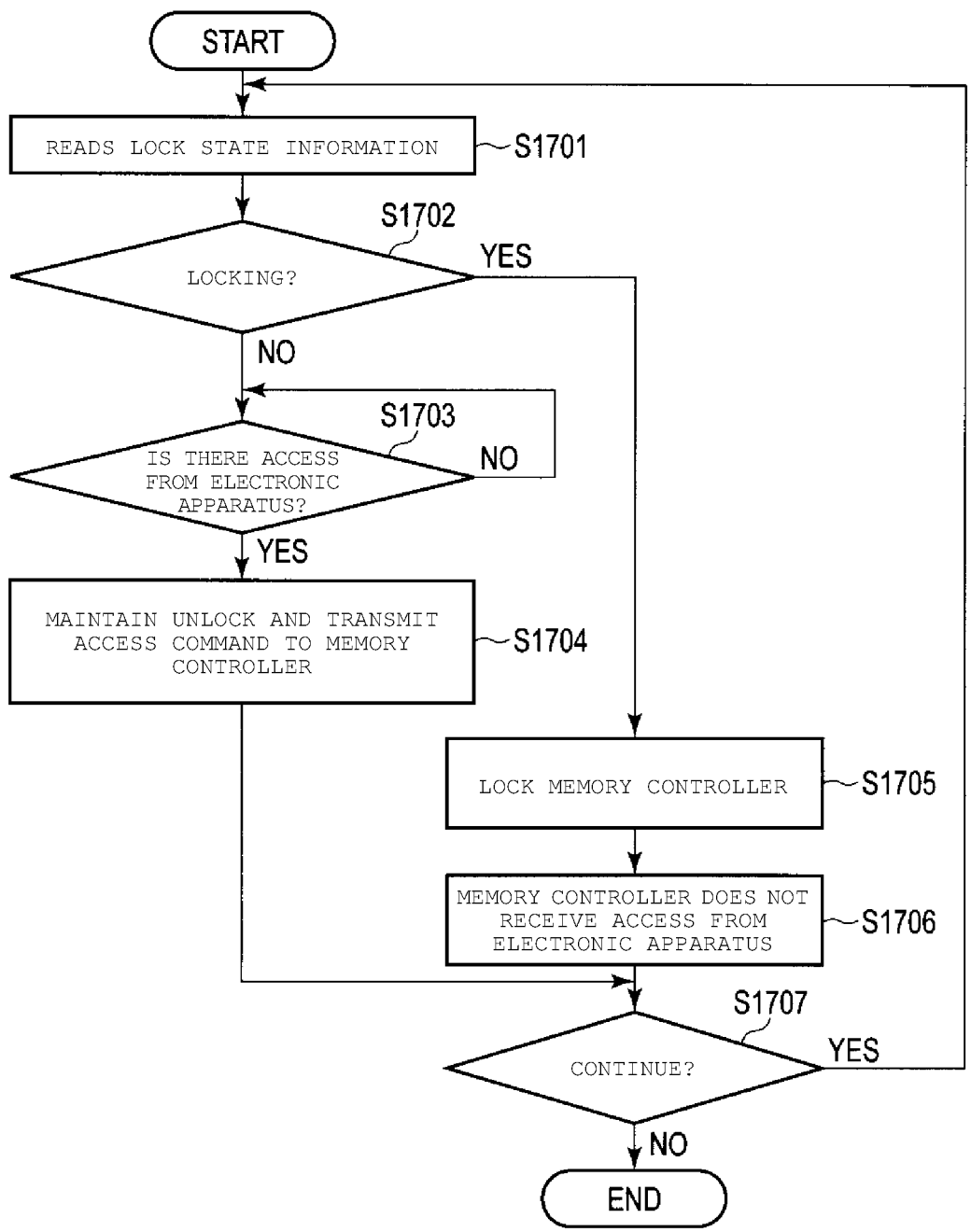
FIG. 17 is a flow chart illustrating an example of a process at a normal mode of the wireless storage apparatus according to the fourth embodiment.

FIG. 17 is a flow chart illustrating an example of the process carried out when the wireless storage apparatus 3 according to the present embodiment operates in the normal mode.

In step S1701, the controller 33 reads the lock state information 101 from the wireless communication memory 37 through the communication controller 34.

Here, the read-out of the lock state information 101 may be performed, for example, periodically, regardless of access from the electronic apparatus 2 to the wireless storage apparatus 3.

In step S1702, the controller 33 determines which one of locking and unlocking is designated in the read lock state information 101.

If it is determined that the lock state information 101 designates unlocking, the controller 33 determines whether or not a write command or a read command is received from the electronic apparatus 2 through the connector 36, in step S1703, and repeats the determination of step S1703 until the controller 33 determines that the write command or the read command is received.

If the controller 33 determines that the write command or the read command is received, in step S1704, the controller 33 maintains the unlock state, sends the write command or the read command, which is received, to the memory controller 35, and the memory controller 35 performs writing or reading to or from the nonvolatile memory 32. Thereafter, the process proceeds to step S1707.

As the result of the determination in step S1702, if the lock state information 101 designates locking, in step S1705, the controller 33 sends a lock command to the memory controller 35. As a result, the memory controller 35 performs locking according to the lock command received from the controller 33.

In step S1706, even if the controller 33 sends the write command or the read command which is received from the electronic apparatus 2 through the connector 36 to the memory controller 35, the memory controller 35 does not receive the write command or the read command from the controller 33. Alternatively, even if the write command or the read command is received from the controller 33, the memory controller 35 may ignore or discard the received command.

After step S1704 or step S1706, the controller 33 determines whether or not to continue the process, in step S1707. If the process is determined to be not continued, the process ends; and if the process is determined to be continued, the process proceeds to step S1701.

Figure 18:
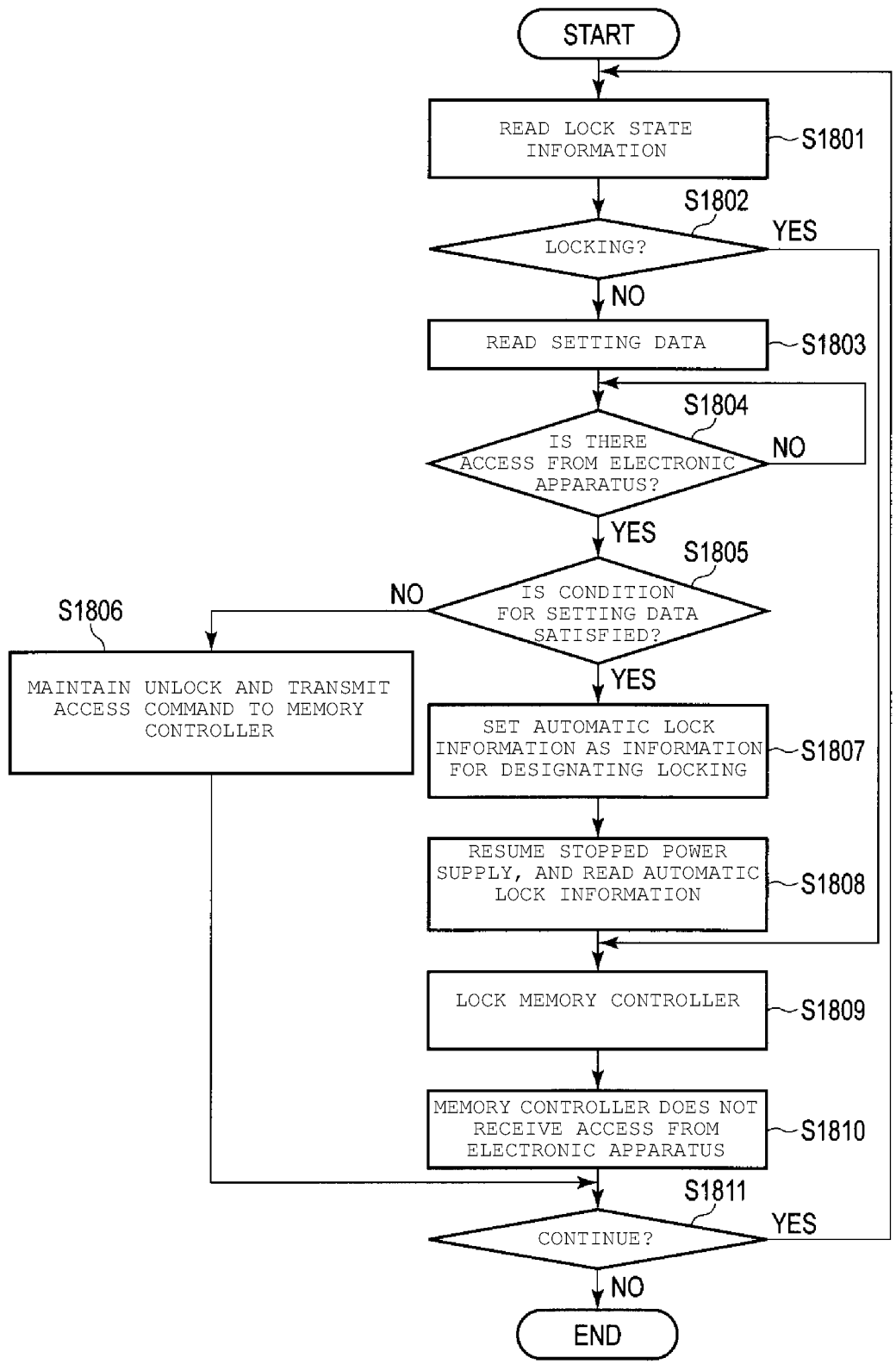
FIG. 18 is a flow chart illustrating a process carried out when the wireless storage apparatus according to the fourth embodiment operates in a one-time unlock mode.

FIG. 18 is a flow chart illustrating an example of a process carried out when the wireless storage apparatus 3 according to the present embodiment operates in the one-time unlock mode.

In step S1801, the controller 33 reads the lock state information 101 from the wireless communication memory 37 through the communication controller 34.

In addition, the read-out of the lock state information 101 may be performed, for example, periodically, regardless of access from the electronic apparatus 2 to the wireless storage apparatus 3.

In step S1802, the controller 33 determines which one of locking and unlocking is designated in the read lock state information 101.

If it is determined that the lock state information 101 designates locking, the process proceeds to step S1809.

If it is determined that the lock state information 101 designates unlocking, the controller 33 reads the setting data 51 from the nonvolatile memory 32 through the memory controller 35 in step S1803. As a result, the controller 33 can recognize the conditions designated in the setting data 51. The process that the controller 33 reads the setting data 51 may be performed, for example, when the power supply from the electronic apparatus 2 to the wireless storage apparatus 3 is started. In this case, step S1803 may be omitted.

The controller 33 determines whether or not the write command or the read command is received from the electronic apparatus 2 through the connector 36, in step S1804, and repeats the determination of step S1804 until the controller 33 receives the write command or the read command.

If the controller 33 receives the write command or the read command, the controller 33 determines whether or not the condition designated in the setting data 51 is satisfied in step S1805.

If it is determined that the condition is not satisfied, the controller 33 maintains the unlock state, and sends the write command or the read command, which is received, to the memory controller 35, and the memory controller 35 performs writing or reading to or from the nonvolatile memory 32, in step S1806. The unlock state is maintained, for example, even when the power supply from the electronic apparatus 2 to the wireless storage apparatus 3 is stopped and thereafter the power supply from the electronic apparatus 2 or another electronic apparatus to the wireless storage apparatus 3 is resumed. Thereafter, the process proceeds to step S1811.

If it is determined that the condition is satisfied, the controller 33 stores the automatic lock information 52 designating automatic locking of the memory controller 35, in the wireless communication memory 37, through the communication controller 34, in step S1807.

In the step S1808, the power supply from the electronic apparatus 2 to the wireless storage apparatus 3 is stopped, and thereafter, the power supply from the electronic apparatus 2 or another electronic apparatus to the wireless storage apparatus 3 is resumed. For example, the wireless storage apparatus 3 is removed from the electronic apparatus 2, and is mounted again on the electronic apparatus 2 or another electronic apparatus. Then, the controller 33 reads out the automatic lock information 52 of the wireless communication memory 37 through the communication controller 34.

If the lock state information 101 designates locking in step S1802, or after the step S1808, the controller 33 sends a lock command to the memory controller 35 in step S1809. As a result, the memory controller 35 performs locking according to the lock command received from the controller 33.

In step S1810, even if the controller 33 sends the write command or the read command to the memory controller 35, the memory controller 35 does not receive the write command or the read command from the controller 33. Alternatively, even if the write command or the read command is received from the controller 33, the memory controller 35 may ignore or discard the received command.

After step S1806 or step S1810, the controller 33 determines whether or not to continue the process, in step S1811. If it is determined that the process is not to be continued, the process ends; and if it is determined that the process is to be continued, the process proceeds to step S1801.

Figure 19:
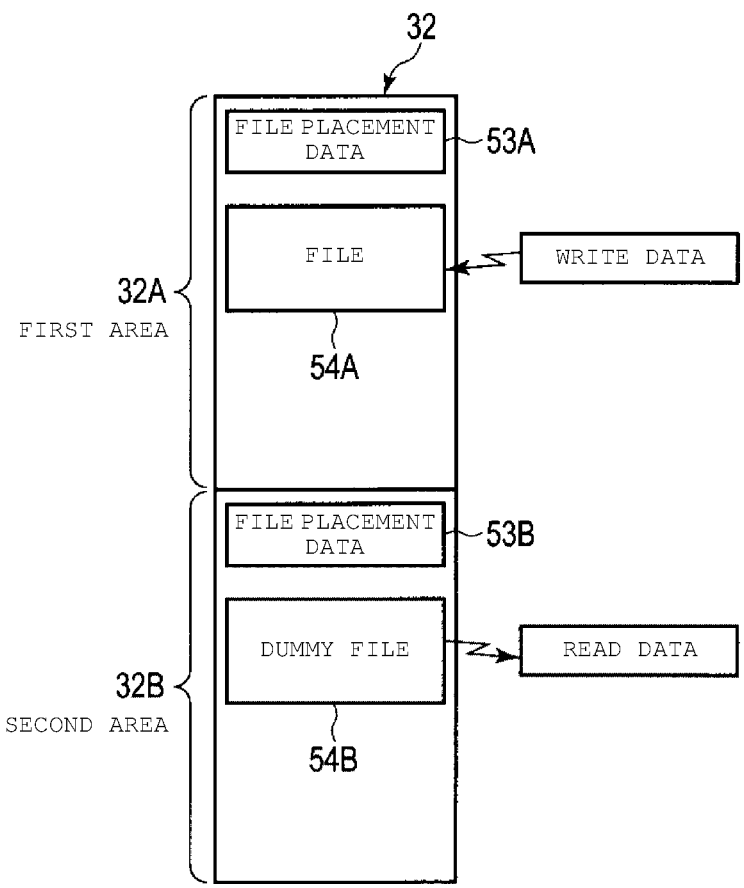
FIG. 19 illustrates an example of data stored in the wireless storage apparatus according to the fourth embodiment that operates in a read lock mode.

FIG. 19 illustrates an example of a state of the nonvolatile memory 32 in the read lock mode according to the present embodiment.

If the wireless storage apparatus 3 operates in the read lock mode, the controller 33 divides the nonvolatile memory 32 into a first area 32A for data writing and a second area 32B for data reading. For example, the storage capacity of the first area 32A and the second area 32B may be the same.

The first area 32A stores, for example, file placement data 53A and a file 54A.

In the file placement data 53A, the file ID and the position of the file 54A stored in the first area 32A are associated with each other. The controller 33 is able to recognize which file (data) is placed in which position of the first area 32A, by referring to the file placement data 53A.

In the second area 32B, for example, file placement data 53B and a dummy file 54B are stored.

In the file placement data 53B, the file ID and the position of the dummy file 54B stored in the second area 32B are associated with each other. The controller 33 is able to recognize which dummy file is placed in which position of the second area 32B, by referring to the file placement data 53B.

The dummy file 54B is read instead of the file 54A for the reading of the file 54A, in order to ensure the security of the file 54A that is written in the first area 32A.

In the wireless storage apparatus 3 in the read lock mode, when the lock state information 101 designates the locking of reading, the controller 33 is able to write the file 54A to the first area 32A of the nonvolatile memory 32 through the memory controller 35, but is not able to read the file 54A from the first area 32A.

The controller 33 in the read lock mode receives an access command from the electronic apparatus 2 through the connector 36, and determines whether the access command is a write command or a read command. When the access command is determined as the write command, the controller 33 selects the first area 32A as a write destination. When the access command is determined as the write command and the reading is not locked, the controller 33 selects the first area 32A as a read destination; and when the reading is locked, the controller 33 selects the second area 32B as a read destination.

If reading from the first area 32A is permitted, the information processing apparatus 4 transmits the apparatus ID and the password to the wireless storage apparatus 3 by wireless communication. The communication controller 34 of the wireless storage apparatus 3 receives the apparatus ID and the password, from the information processing apparatus 4, through the wireless antenna 31, by wireless communication. Then, the communication controller 34 performs authentication of the information processing apparatus 4 by determining whether or not the apparatus ID 48 and the password 49 which are stored in the secret area 37a match the apparatus ID and the password which are received by the communication controller 34 from the information processing apparatus 4 through the wireless antenna 31. When the authentication result is successful, the communication controller 34 transmits authentication success data to the information processing apparatus 4 through the wireless antenna 31 by wireless communication. When the authentication success data is received from the wireless storage apparatus 3 by wireless communication, the information processing apparatus 4 transmits lock state information 101 including the designation to permit the reading from the first area 32A to the wireless storage apparatus 3 by wireless communication. The communication controller 34 of the wireless storage apparatus 3 receives the lock state information 101 through the wireless antenna 31, and stores the received lock state information 101 in the wireless communication memory 37. The controller 33 reads the lock state information 101 from the wireless communication memory 37 through the communication controller 34, and recognizes that the reading of the lock state information 101 from the first area 32A is permitted. The controller 33 receives the read command corresponding to the file 54A from the electronic apparatus 2 through the connector 36. Then, the controller 33 reads the file 54A from the first area 32A of the nonvolatile memory 32 through the memory controller 35, and transmits the read file 54A to the electronic apparatus 2 through the connector 36.

In the present embodiment, for example, when the power supply from the electronic apparatus 2 to the wireless storage apparatus 3 is stopped, or the power supply from the electronic apparatus 2 to the wireless storage apparatus 3 is stopped and thereafter the power supply from the electronic apparatus 2 or another electronic apparatus to the wireless storage apparatus 3 is resumed, the controller 33 may automatically store the mode designation data 50 designating the read lock mode, and the lock state information 101 designating that the reading from the first area 32A is not permitted, in the wireless communication memory 37, through the communication controller 34. Thus, when the read command of data is received, the controller 33 reads the dummy file 54B from the second area 32B of the nonvolatile memory 32 through the memory controller 35.

Further, in the present embodiment, the file placement data 53B and the dummy file 54B are stored in the second area 32B of the nonvolatile memory 32, but the controller 33 may have the file placement data 53B and the dummy file 54B. For example, the file placement data 53B and the dummy file 54B may be stored in the memory 46 of the controller 33.

Figure 20:
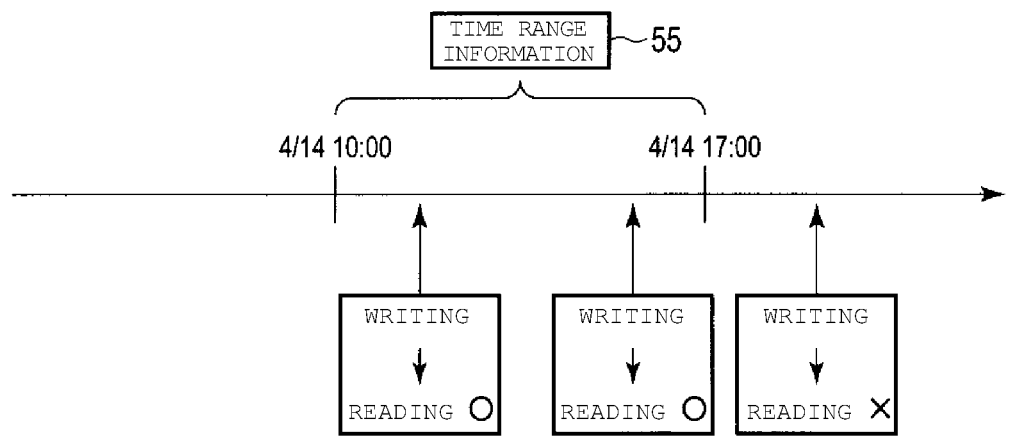
FIG. 20 illustrates an example of a relationship between time range information and a state of lock/unlock in the read lock mode according to the fourth embodiment.

FIG. 20 illustrates an example of a relationship between time range information and lock/unlock states in the read lock mode according to the present embodiment.

In the read lock mode, when the latest file (last file) was stored in the first area 32A within a time range that is designated in the time range information 55, the reading of the file 54A from the first area 32A is permitted; and when the latest file was stored in the first area 32A out of the time range, the reading of the file 54A from the first area 32A is prohibited.

In the present embodiment, for example, the setting data 51 may include time range information 55 designating the time range to permit the reading. However, the time range information 55 may be included in, for example, the data stored in the wireless communication memory 37 (for example, the mode designation data 50, the lock state information 101, the automatic lock information 52, and the like), but is not stored in the nonvolatile memory 32. The time range information 55 may be stored in, for example, the memory 46 of the controller 33.

If the time when the latest file was stored in the first area 32A is within the designated time range, permission of the reading of the file 54A from the first area 32A is optional. With respect to the file 54A, if the time when the latest file was stored in the first area 32A is within the designated time range, the reading is permitted; and if the time when the latest file was stored in the first area 32A is out of the designated time range, the reading is prohibited. However, an option enabling the reading of the file 54A if the time when the latest file was stored in the first area 32A is within the designated time range may not be applied. When this option is not applied and the lock state information 101 designates locking of the reading, for example, immediately after being stored in the first area 32A, the file 54A may be in a state of being prohibited from reading.

For example, the file stored in the first area 32A includes time information (for example, a time stamp) indicating the time when the file was stored in the first area 32A of the nonvolatile memory 32.

The controller 33 reads the time range information 55 included in the setting data 51 from the nonvolatile memory 32 through the memory controller 35, and reads the time information of the latest file from the first area 32A.

When the time information of the latest file is within the time range designated in the time range information 55, the controller 33 enables the reading of the file (for example, the file 54A) stored in the first area 32A.

When the time information of the latest file is out of the time range designated in the time range information 55, the controller 33 reads a dummy file (for example, the dummy file 54B) from the second area 32B.

In the present embodiment, for example, when the power supply from the electronic apparatus 2 to the wireless storage apparatus 3 is stopped, the controller 33 may prohibit the reading of the file 54A from the first area 32A. Thereafter, when the power supply from the electronic apparatus 2 or another electronic apparatus to the wireless storage apparatus 3 is resumed, even if time information of the latest file stored in the first area 32A is within the time range designated in the time range information, the controller 33 may prohibit the reading of the file 54A from the first area 32A.

When the latest file was stored again in the first area 32A after the power supply from the electronic apparatus 2 or another electronic apparatus to the wireless storage apparatus 3 is resumed, the controller 33 determines whether or not the time information included in the latest file is within the designated time range. When the time information included in the latest file is within the designated time range, the controller 33 permits the reading of the file 54A from the first area 32A; but when the time information included in the latest file is out of the designated time range, the controller 33 may read the dummy file 54B from the second area 32B.

Figure 21:
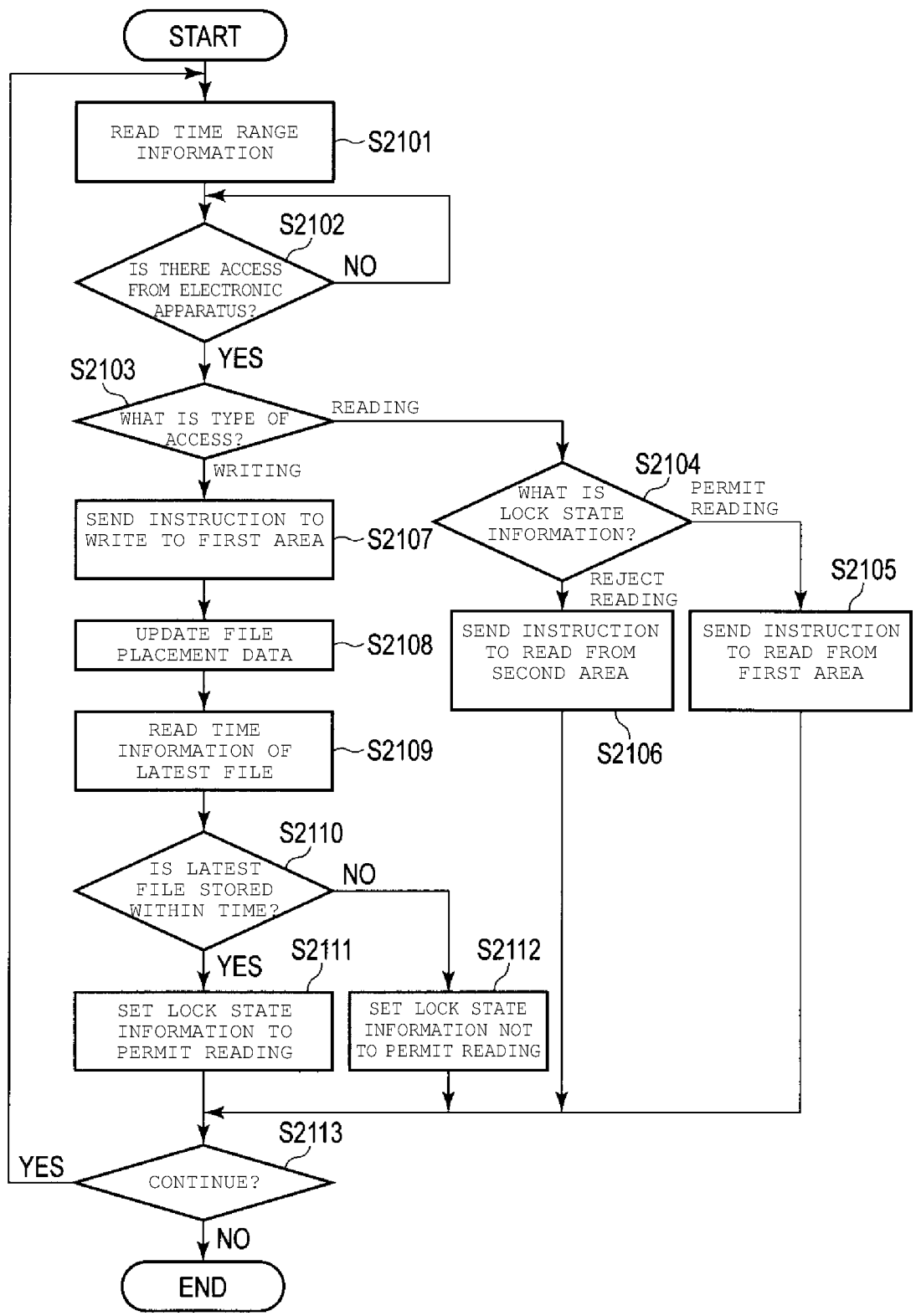
FIG. 21 is a flow chart illustrating a process carried out when the wireless storage apparatus according to the fourth embodiment operates in a read lock mode.

FIG. 21 is a flow chart illustrating a process carried out when the wireless storage apparatus 3 according to the present embodiment operates in the read lock mode.

Here, when there is no need to determine whether time information indicating the storage time of the latest file is within the designated time range, step S2101, and steps S2110 to S2112 in FIG. 21 may be omitted.

In step S2101, the controller 33 reads out the time range information 55 included in the setting data 51 of the nonvolatile memory 32, through the memory controller 35.

In step S2102, the controller 33 determines whether or not a write command or a read command is received from the electronic apparatus 2 through the connector 36, and repeats the determination of step S2102 until the controller 33 receives the write command or the read command.

In step S2103, the controller 33 determines which one of the write command and the read command is received from the electronic apparatus 2 through the connector 36.

When it is determined that the write command is received, the process proceeds to step S2107.

When it is determined that the read command is received, the controller 33 receives the lock state information 101 of the wireless communication memory 37 through the communication controller 34, and determines whether or not the received lock state information 101 permits the reading from the first area 32A, in step S2104.

If it is determined that the reading of the received lock state information 101 from the first area 32A is permitted, the controller 33 instructs the memory controller 35 to read a file from the first area 32A in step S2105. The memory controller 35 reads the file 54A from the first area 32A, and transmits the read file 54A to the controller 33. The controller 33 transmits the file 54A received from the memory controller 35 to the electronic apparatus 2 through the connector 36. Thereafter, the process proceeds to step S2113.

If it is determined that the reading of the lock state information 101 from the first area 32A is not permitted, the controller 33 instructs the memory controller 35 to read the dummy file 54B from the second area 32B, in step S2106. The memory controller 35 reads the dummy file 54B from the second area 32B, and transmits the read dummy file 54B to the controller 33. The controller 33 transmits the dummy file 54B received from the memory controller 35 to the electronic apparatus 2 through the connector 36. Thereafter, the process proceeds to step S2113.

When it is determined in step S2103 that the write command is received, the controller 33 instructs the memory controller 35 to write a file to the first area 32A in step S2107. The memory controller 35 stores the file 54A in the first area 32A.

In step S2108, the controller 33 updates the file placement data 53A in the first area 32A through the memory controller 35, and updates the file placement data 53B in the second area 32B in the same manner.

In step S2109, the controller 33 reads time information of the latest file from the first area 32A and reads the time range information 55 included in the setting data 51, through the memory controller 35.

In step S2110, the controller 33 determines whether or not the time information of the latest file from the first area 32A is within the time range designated in the time range information 55.

When it is determined that the time information of the latest file from the first area 32A is within the designated time range, in step S2111, the controller 33 stores the lock state information 101 designating that the reading from the first area 32A is permitted, in the wireless communication memory 37, through the communication controller 34.

When it is determined that the time information of the latest file from the first area 32A is out of the designated time range, in step S2112, the controller 33 stores the lock state information 101 designating that the reading from the first area 32A is not permitted, in the wireless communication memory 37, through the communication controller 34.

After step S2105, step S2106, step S2111, and step S2112, in step S2113, the controller 33 determines whether or not to continue the process. If it is determined that the process is not to be continued, the process ends; and if it is determined that the process is to be continued, the process proceeds to step S2101.

In the present embodiment, when the reading of a file from the first area 32A is not permitted in the read lock mode, the controller 33 searches for, for example, the second area 32B of the nonvolatile memory 32, in response to the received search command, and may return the results of the search for the second area 32B to the source of the search command.

When reading the dummy file 54B through the memory controller 35, the controller 33 may transmit the dummy file 54B and information for notifying of the dummy file, to the destination of the dummy file 54B.

When the reading of a file from the first area 32A is not permitted in the read lock mode, the controller 33 may permit or prohibit the deletion of the file to the first area 32A.

In the present embodiment described above, when the information processing apparatus 4 and the wireless storage apparatus 3 are moved closer to each other, the lock state information 101 can be transmitted from the information processing apparatus 4 to the wireless storage apparatus 3 by wireless communication. As a result, it is possible to permit or prohibit the reading and writing from and to the nonvolatile memory 32 of the wireless storage apparatus 3 depending on the lock state information 101. In this manner, by locking the access to the nonvolatile memory 32, it is possible to prevent the leakage of confidential information and reduce the operational burden of the user.

In the present embodiment, the wireless storage apparatus 3 is a portable device. However, even if the wireless storage apparatus 3 is lost or stolen while being carried, it is possible to ensure security, and protect the privacy of the user. In addition, when the security is locked or unlocked, the user does not need to enter and manage the password, and it is possible to perform locking or unlocking only by moving the information processing apparatus 4 close to the wireless storage apparatus 3. Therefore, the work load of the user is reduced. The user can lock or unlock the access to the nonvolatile memory 32, for example, only by moving a smartphone close to the wireless storage apparatus 3.

In the present embodiment, three security modes can be selected and used, and the security mode may be changed only by moving the information processing apparatus 4 and the wireless storage apparatus 3 close to each other. Therefore, the user can easily and quickly switch the security mode according to the user's own intention.

In the present embodiment, in the one-time unlock mode, if the power supply from the electronic apparatus 2 to the wireless storage apparatus 3 is stopped and power is supplied again, the reading and writing from and to the nonvolatile memory 32 is locked. However, in the present embodiment, a condition of not locking the reading and writing from and to the nonvolatile memory 32 can be set even if the power is supplied again, and the condition may be included in the setting data 51. In the present embodiment, in the one-time unlock mode, the reading and writing from and to the nonvolatile memory 32 may be locked by the operation from the electronic apparatus 2.

Fifth Embodiment

In a fifth embodiment, a modification example of the first to fourth embodiments will be described. In the present embodiment, mirroring (synchronization) between the nonvolatile memory 32 and the wireless communication memory 37 of the wireless storage apparatus 3 is performed. Here, it is assumed that the synchronization is a process of making a plurality of pieces of data have the same contents. In the present embodiment, the controller 33 is assumed to control the mirroring. However, for example, a controller other than the controller 33 may be included in the wireless storage apparatus 3 and control the mirroring. Also, an integrated controller of the controller 33 and the memory controller 35 may control the mirroring.

For example, the controller 33 may perform the mirroring periodically, at a timing when power starts to be supplied from the electronic apparatus 2 to the wireless storage apparatus 3, at a timing when data writing from the electronic apparatus 2 to the wireless storage apparatus 3 is detected, or at a timing when data writing from the information processing apparatus 4 to the wireless storage apparatus 3 is detected.

Figure 22:
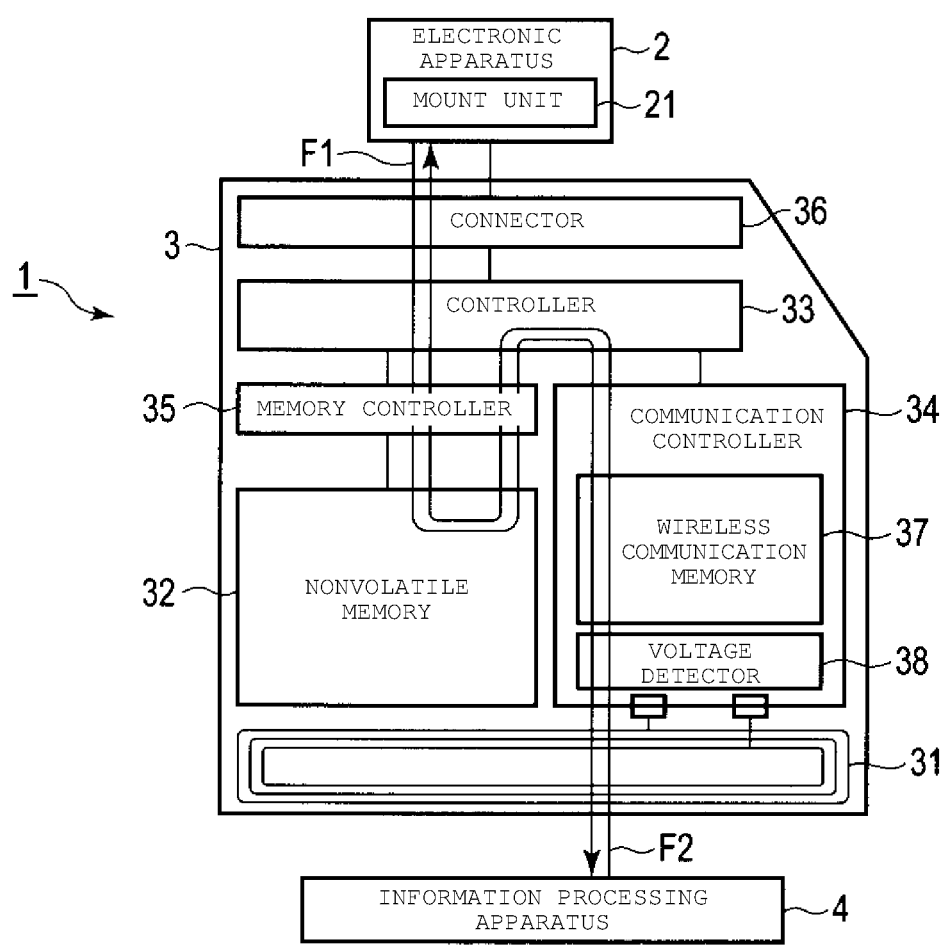
FIG. 22 is a block diagram of an information processing system according to a fifth embodiment.

FIG. 22 is a block diagram of an information processing system 1 according to the present embodiment.

First, a first flow F1 of data will be described in which the electronic apparatus 2 transmits data to the wireless storage apparatus 3 and thereafter the wireless storage apparatus 3 transmits data to the information processing apparatus 4.

If the wireless storage apparatus 3 is mounted into the mount unit 21 of the electronic apparatus 2, the electronic apparatus 2 supplies power to the wireless storage apparatus 3. Further, the electronic apparatus 2 transmits write data and a write command corresponding to the write data to the wireless storage apparatus 3.

The wireless storage apparatus 3 is supplied with power from the electronic apparatus 2 through the connector 36. Further, the controller 33 of the wireless storage apparatus 3 receives the write data and the write command from the electronic apparatus 2 through the connector 36. The controller 33 stores the write data in the nonvolatile memory 32 through the memory controller 35.

The controller 33 performs the mirroring between the nonvolatile memory 32 and the wireless communication memory 37. Specifically, the controller 33 reads data from the nonvolatile memory 32 through the memory controller 35, and stores the read data in the wireless communication memory 37 through the communication controller 34.

If the wireless storage apparatus 3 and the information processing apparatus 4 become close to each other, the communication controller 34 reads data from the wireless communication memory 37, and transmits the read data to the information processing apparatus 4 through the wireless antenna 31 by wireless communication.

Next, a second flow F2 of data will be described in which the information processing apparatus 4 transmits data to the wireless storage apparatus 3 and thereafter the wireless storage apparatus 3 transmits the data to the electronic apparatus 2.

If the wireless storage apparatus 3 and the information processing apparatus 4 become close to each other, the information processing apparatus 4 transmits write data and a write command corresponding to the write data to the wireless storage apparatus 3 by wireless communication.

The communication controller 34 of the wireless storage apparatus 3 receives the write data and the write command from the information processing apparatus 4 through the wireless antenna 31 by wireless communication. The communication controller 34 stores the write data in the wireless communication memory 37.

When the wireless storage apparatus 3 is mounted into the mount unit 21 of the electronic apparatus 2, the electronic apparatus 2 supplies power to the wireless storage apparatus 3.

The controller 33 performs the mirroring between the nonvolatile memory 32 and the wireless communication memory 37. Specifically, the controller 33 reads data from the wireless communication memory 37 through the communication controller 34, and stores the read data in the nonvolatile memory 32 through the memory controller 35.

The electronic apparatus 2 transmits a read command to the wireless storage apparatus 3. The controller 33 of the wireless storage apparatus 3 receives the read command from the electronic apparatus 2 through the connector 36. The controller 33 reads data from the nonvolatile memory 32 through the memory controller 35, and transmits the read data to the electronic apparatus 2 through the connector 36.

As described in the first flow F1, even if the communication interface of the electronic apparatus 2 and the communication interface of the information processing apparatus 4 are different, it is possible to transmit the data of the electronic apparatus 2 to the information processing apparatus 4 through the wireless storage apparatus 3, via the wireless storage apparatus 3 operating between the electronic apparatus 2 and the information processing apparatus 4. In addition, as described in the second flow F2, it is possible to transmit the data of the information processing apparatus 4 to the electronic apparatus 2 through the wireless storage apparatus 3.

Figure 23:
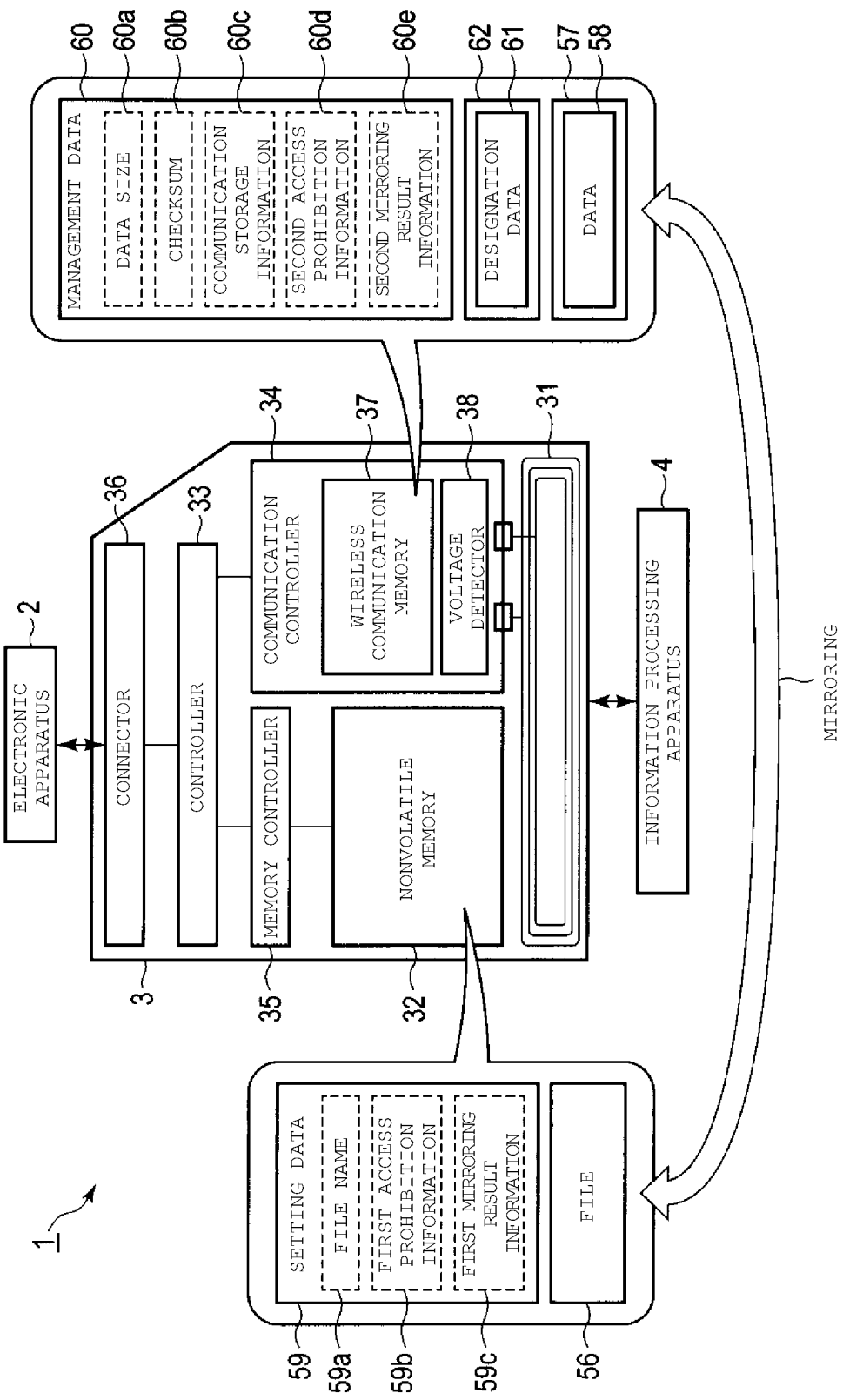
FIG. 23 is a block diagram of a wireless storage apparatus according to the fifth embodiment.

FIG. 23 is a block diagram of a wireless storage apparatus 3 according to the present embodiment.

In the present embodiment, a file or data to be mirrored by the controller 33 between the memory controller 35 and the communication controller 34 is referred to as a mirroring target file or data. In the present embodiment, a file 56 stored in the nonvolatile memory 32 is assumed to be the mirroring target. In addition, data 58 stored in a specific or designated address area 57 included in the wireless communication memory 37 is assumed to be the mirroring target.

In other words, in the present embodiment, the data 58 corresponding to the file 56 which is a mirroring target, among files stored in the nonvolatile memory 32, is stored in the address area 57 of the wireless communication memory 37. Also, the file 56 corresponding to the mirroring target data 58 which is stored in the address area 57 of the wireless communication memory 37 is stored in the nonvolatile memory 32.

However, the data stored in the nonvolatile memory 32 may not be to be mirrored in unit of file, but mirrored in unit of data piece. For example, a specific or designated address area included in the nonvolatile memory 32 may be a mirroring target. The data stored in the wireless communication memory 37 may be to be mirrored, for example, in unit of file.

In FIG. 23, if the file 56 stored in the nonvolatile memory 32 is updated, the data 58 stored in the address area 57 of the wireless communication memory 37 is updated by using the updated file 56. Similarly, if the data 58 stored in the address area 57 of the wireless communication memory 37 is updated, the file 56 stored in the nonvolatile memory 32 is updated by using the updated data 58.

The nonvolatile memory 32 stores setting data 59 and a mirroring target file 56.

The setting data 59 includes a filename 59a, first access prohibition information 59b, and first mirroring result information 59c.

The file name 59a is a file name of the file 56 to be mirrored, among files stored in the nonvolatile memory 32. If a plurality of files stored in the nonvolatile memory 32 is to be mirrored, the setting data 59 includes a plurality of file names. In the present embodiment, since the data stored in the nonvolatile memory 32 is mirrored in unit of file, a mirroring target is designated by the file name 59a, but data identification information may be used instead of the file name 59a. For example, the address area of the nonvolatile memory 32 may be designated as a mirroring target.

The first access prohibition information 59b indicates whether or not to prohibit access to the nonvolatile memory 32, in order to prevent conflict of a plurality of accesses to the nonvolatile memory 32, and is, for example, flag information. In the present embodiment, for example, when the access to the nonvolatile memory 32 is prohibited, the first access prohibition information 59b is turned ON; and when the access to the nonvolatile memory 32 is permitted, the first access prohibition information 59b is turned OFF.

The first mirroring result information 59c indicates which one of the mirroring from the nonvolatile memory 32 (the file 56) to the wireless communication memory 37 (the data 58) and the mirroring from the wireless communication memory 37 to the nonvolatile memory 32 is completed. The first mirroring result information 59c is, for example, flag information. In the present embodiment, when the mirroring from the nonvolatile memory 32 to the wireless communication memory 37 is completed, for example, the first mirroring result information 59c becomes 1; and when the mirroring from the wireless communication memory 37 to the nonvolatile memory 32 is completed, it becomes 0.

The wireless communication memory 37 includes management data 60, designation data 61, and the mirroring target data 58.

The management data 60 includes a data size 60*a*, a checksum 60*b*, communication storage information 60*c*, second access prohibition information 60*d*, and second mirroring result information 60*e*.

The data size 60*a* is the size of the data 58. When the data 58 is updated by the mirroring, the data size 60*a* is updated to the size corresponding to the updated data 58 by the controller 33.

The checksum 60*b* is an error detection code for the data 58. When the data 58 is updated by the mirroring, the checksum 60*b* is updated to the checksum 60*b* corresponding to the updated data 58 by the controller 33.

When the communication controller 34 receives the data 58 from the information processing apparatus 4 through the wireless antenna 31, and stores the received data 58 in the wireless communication memory 37, the data size 60*a* and the checksum 60*b* are updated by the communication controller 34.

In addition, another error detection code or another error correction code other than the checksum 60*b* may be used, for example, such as a CRC code, as the error detection code or the error correction code for the data 58.

The communication storage information 60*c* indicates that the data 58 was stored in the wireless communication memory 37 from the information processing apparatus 4 by wireless communication and thereafter the mirroring from the wireless communication memory 37 to the nonvolatile memory 32 is not executed, and is, for example, flag information. For example, when the data 58 is stored in the wireless communication memory 37 from the information processing apparatus 4 by wireless communication and thereafter the mirroring from the wireless communication memory 37 to the nonvolatile memory 32 is not executed, the communication storage information 60*c* is turned ON, and is turned OFF in other cases.

The second access prohibition information 60*d* indicates whether or not to prohibit access to the wireless communication memory 37, in order to prevent the conflict of a plurality of accesses to the wireless communication memory 37, and is, for example, flag information. In the present embodiment, for example, when the access to the wireless communication memory 37 is prohibited, the second access prohibition information 60*d* is turned ON; and when the access to the wireless communication memory 37 is permitted, the second access prohibition information 60*d* is turned OFF.

The second mirroring result information 60*e* indicates which one of the mirroring from the nonvolatile memory 32 to the wireless communication memory 37 and the mirroring from the wireless communication memory 37 to the nonvolatile memory 32 is completed. The second mirroring result information 60*e* is, for example, flag information. In the present embodiment, when the mirroring from the nonvolatile memory 32 to the wireless communication memory 37 is completed, for example, the second mirroring result information 60*e* becomes 1; and when the mirroring from the wireless communication memory 37 to the nonvolatile memory 32 is completed, it becomes 0.

The designation data 61 is data that the information processing apparatus 4 stores in the wireless communication memory 37 of the communication controller 34 through the wireless antenna 31, when the information processing apparatus 4 rewrites, for example, the file name 59*a* of the setting data 59 or the like of the nonvolatile memory 32. The designation data 61 is stored in the address area 62 of the wireless communication memory 37.

In the present embodiment, the controller 33 reads the setting data 59 from the nonvolatile memory 32 through the memory controller 35, and reads the management data 60 from the wireless communication memory 37 through the communication controller 34. The controller 33 executes the mirroring from the nonvolatile memory 32 to the wireless communication memory 37 or the mirroring from the wireless communication memory 37 to the nonvolatile memory 32, based on the setting data 59 and the management data 60 which are read, and updates the setting data 59 and the management data 60.

Further, the controller 33 reads the designation data 61 from the wireless communication memory 37 through the communication controller 34. The controller 33 updates the file name 59*a* of the setting data 59 of the nonvolatile memory using the file name that is designated in the read designation data 61 through the memory controller 35. The controller 33 may add the file name that is designated in the read designation data 61 to the setting data 59 of the nonvolatile memory 32.

For example, when the file name 59*a* of the setting data 59 and the file name designated in the designation data 61 are different from each other, the controller 33 may execute the update of the file name 59*a* or the addition of a new file name to the setting data 59. Alternatively, for example, when the file name 59*a* and the file name designated in the designation data 61 are different from each other and the length of the file name 59*a* and the length of the file name designated in the designation data 61 are same as each other, the controller 33 may execute the update of the file name 59*a* or the addition of a new file name to the setting data 59.

Below, an operation of the electronic apparatus 2 to store (or updates) the file 56 in the nonvolatile memory 32 of the wireless storage apparatus 3 will be described.

The electronic apparatus 2 reads the first access prohibition information 59*b* stored in the setting data 59 from the nonvolatile memory 32, through the memory controller 35, controller 33, and the connector 36.

The electronic apparatus 2 determines whether or not the read first access prohibition information 59*b* indicates prohibition of the access to the nonvolatile memory 32.

When it is determined that the access to the nonvolatile memory 32 is not prohibited, the electronic apparatus 2 updates the first access prohibition information 59*b* in the nonvolatile memory 32 to a state where the access to the nonvolatile memory 32 is prohibited, through the connector 36, the controller 33, and the memory controller 35. Then the electronic apparatus 2 stores the file 56 and returns the first access prohibition information 59*b* to a state where the access to the nonvolatile memory 32 is not prohibited.

Thereafter, the electronic apparatus 2 reads the first access prohibition information 59*b* included in the setting data 59*a* from the nonvolatile memory 32 through the memory controller 35, the controller 33, and the connector 36.

The electronic apparatus 2 determines whether or not the read first access prohibition information 59*b* indicates prohibition of the access to the nonvolatile memory 32.

When the access to the nonvolatile memory 32 is not prohibited, the electronic apparatus 2 reads the first mirroring result information 59*c* from the nonvolatile memory 32, through the connector 36, the controller 33, and the memory controller 35. The electronic apparatus 2 is able to recognize whether the file 56 of the nonvolatile memory 32 is in a state of being stored by the electronic apparatus 2 or in a state of being mirrored from the data 58 of the wireless communication memory 37 to the file 56 of the nonvolatile memory 32, based on the first mirroring result information 59*c*.

Below, an operation of the information processing apparatus 4 to receive the data 58 from the wireless storage apparatus 3 by wireless communication will be described.

The information processing apparatus 4 receives the second access prohibition information 60*d* included in the management data 60 of the wireless communication memory 37, through the communication controller 34 and the wireless antenna 31, by wireless communication.

The information processing apparatus 4 determines whether or not the read second access prohibition information 60*d* indicates prohibition of the access to the wireless communication memory 37.

When it is determined that the access to the wireless communication memory 37 is not prohibited, the information processing apparatus 4 updates the second access prohibition information 60*d* included in the management data 60 of the wireless communication memory 37 to a state where the access to the wireless communication memory 37 is prohibited, through the wireless antenna 31 and the communication controller 34 by wireless communication. The information processing apparatus 4 receives the data 58 stored in the address area of the wireless communication memory 37 through the communication controller 34 and the wireless antenna 31, by wireless communication. Thereafter, the information processing apparatus 4 returns the second access prohibition information 60*d* included in the management data 60 of the wireless communication memory 37 to a state where the access to the wireless communication memory 37 is not prohibited, through the wireless antenna 31 and the communication controller 34 by wireless communication.

Below, an operation of the information processing apparatus 4 to store the data 58 in the wireless storage apparatus 3 will be described.

The information processing apparatus 4 receives the second access prohibition information 60*d* included in the management data 60 of the wireless communication memory 37 through the communication controller 34 and the wireless antenna 31, by wireless communication.

The information processing apparatus 4 determines whether or not the read second access prohibition information 60*d* indicates prohibition of the access to the wireless communication memory 37.

When it is determined that the access to the wireless communication memory 37 is not prohibited, the information processing apparatus 4 updates the second access prohibition information 60*d* included in the management data 60 of the wireless communication memory 37 to a state where the access to the wireless communication memory 37 is prohibited, through the wireless antenna 31 and the communication controller 34 by wireless communication. The information processing apparatus 4 stores the data 58 in the address area 57 of the wireless communication memory 37, through the wireless antenna and the communication controller 34, and sets the communication storage information 60*c* stored in the wireless communication memory 37 to a state indicating that the data 58 of the wireless communication memory 37 is stored from the information processing apparatus 4 by wireless communication. By wireless communication, the communication controller 34 updates the data size 60*a* and the checksum 60*b* of the wireless communication memory 37 corresponding to the data 58 stored in the address area 57 of the wireless communication memory 37. Then, the information processing apparatus 4 returns the second access prohibition information 60*d* included in the management data 60 of the wireless communication memory 37 to a state where the access to the wireless communication memory 37 is not prohibited, through the wireless antenna 31 and the communication controller 34 by wireless communication.

Thereafter, the information processing apparatus 4 receives the second access prohibition information 60*d* included in the management data 60 of the wireless communication memory 37, through the communication controller 34 and the wireless antenna 31 by wireless communication.

The information processing apparatus 4 determines whether or not the read second access prohibition information 60*d* indicates that the access to the wireless communication memory 37 is prohibited.

When it is determined that the access to the wireless communication memory 37 is not prohibited, the information processing apparatus 4 receives the second mirroring result information 60*e* included in the management data 60 of the wireless communication memory 37 through the communication controller 34 and the wireless antenna 31 by wireless communication. The information processing apparatus 4 can recognize whether the data 58 in the wireless communication memory 37 is in a state of being stored from the information processing apparatus 4 by wireless communication, or in a state where the file 56 in the nonvolatile memory 32 is mirrored to the data 58 in the wireless communication memory 37.

Below, a specific control performed by the controller 33 to carry out the mirroring will be described.

Figure 24:
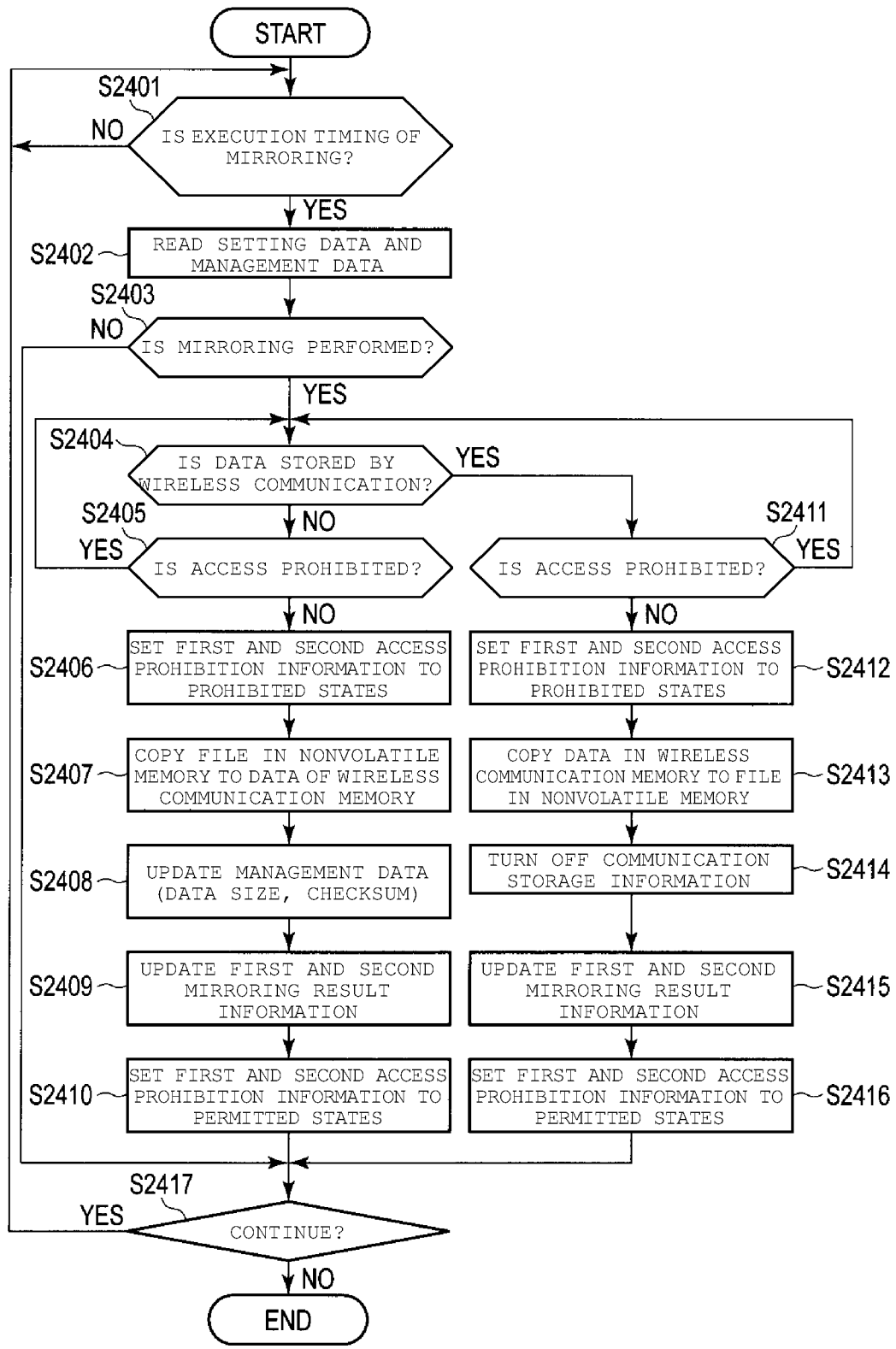
FIG. 24 is a flowchart illustrating a mirroring process performed by a controller according to the fifth embodiment.

FIG. 24 is a flow chart illustrating an example of a mirroring process performed by the controller 33 according to the present embodiment.

In step S2401, the controller 33 determines whether it is an execution timing of mirroring. For example, when it is detected that the data 58 is stored in the wireless communication memory 37 of the communication controller 34 from the information processing apparatus 4 through the wireless antenna 31 by wireless communication, when power is supplied from the electronic apparatus 2 through the connector 36, or when a write command of the file 56 is received from the electronic apparatus 2 through the connector 36, the controller 33 determines that it is the execution timing of mirroring.

When it is not the execution timing of mirroring, the controller 33 repeats the determination of step S2401.

When it is the execution timing of mirroring, the controller 33 reads the setting data 59 from the nonvolatile memory 32 through the memory controller 35, and reads the management data 60 from the wireless communication memory 37 through the communication controller 34, in step S2402.

In step S2403, the controller 33 checks the read setting data 59, and determines whether or not to perform the mirroring. For example, the controller 33 determines whether or not respective conditions are satisfied, such as determination as to whether the setting data 59 is stored in the nonvolatile memory 32, determination as to whether the file name 59*a* is included in the setting data 59, and determination as to whether the file 56 corresponding to the file name 59*a* is stored in the nonvolatile memory 32. If all of these conditions are satisfied, the controller 33 determines to execute the mirroring. Then, if at least one of these conditions is not satisfied, the controller 33 determines not to execute the mirroring. For example, the controller 33 may add at least one of a condition in which the length of the file name 59a of the setting data 59 is the same as the length of the current file name of the file 56, a condition in which the file size of the file 56 and the data size of the data 58 are the same, and a condition in which the checksum 60b included in the management data 60 is the same as the checksum calculated based on the data 58, to the conditions for executing the mirroring.

When the mirroring is not executed, the process proceeds to step S2417.

When executing the mirroring, in step S2404, the controller 33 determines whether the communication storage information 60c of the management data 60 indicates that the data 58 is stored in the wireless communication memory 37 by wireless communication from the information processing apparatus 4 and thereafter the mirroring from the wireless communication memory 37 to the nonvolatile memory 32 is not executed, in other words, whether the communication storage information 60c is in an On state.

When the communication storage information 60c is in an ON state, the process proceeds to step S2411 in order to execute the mirroring from the wireless communication memory 37 to the nonvolatile memory 32.

When the communication storage information 60c is in an OFF state, the process proceeds to step S2405 in order to execute the mirroring from the nonvolatile memory 32 to the wireless communication memory 37.

In the present embodiment, the controller 33 determines whether the mirroring from the wireless communication memory 37 to the nonvolatile memory 32 is executed, or the mirroring from the nonvolatile memory 32 to the wireless communication memory 37 is executed, based on the communication storage information 60c. Alternatively, the controller 33 may compare, for example, the storage time information corresponding to the file 56 with the storage time information corresponding to the data 58, and rewrite the data which is not the latest one of the file 56 and the data 58 by mirroring, based on the latest data of the file 56 and the data 58.

In step S2405, the controller 33 determines whether or not the first access prohibition information 59b and the second access prohibition information 60d are in a state in which the access is not prohibited, in other words, an OFF state.

When it is determined that the first access prohibition information 59b and the second access prohibition information 60d are in an ON state, and indicate the access prohibition, the process proceeds to step S2404.

When it is determined that the first access prohibition information 59b and the second access prohibition information 60d are in an OFF state, and indicate the access permission, the controller 33 changes the first access prohibition information 59b and the second access prohibition information 60d to a state in which access is prohibited, in other words, an ON state, in step S2406.

In step S2407, the controller 33 copies the file 56 of the nonvolatile memory 32 to the data 58 of the wireless communication memory 37, using the memory controller 35 and the communication controller 34.

In step S2408, the controller 33 calculates the data size 60a and the checksum 60b which correspond to the copied data 58, and updates the management data 60 by using the data size 60a and the checksum 60b which are calculated, through the communication controller 34.

In step S2409, the controller 33 sets the first mirroring result information 59c and the second mirroring result information 60e to 1, which indicates that the mirroring from the nonvolatile memory 32 to the wireless communication memory 37 is completed, by using the memory controller 35 and the communication controller 34.

In step S2410, the controller 33 changes the first access prohibition information 59b and the second access prohibition information 60d to a state in which access is permitted, in other words, an OFF state, by using the memory controller 35 and the communication controller 34.

When it is determined in step S2404 that the communication storage information 60c is in an ON state, the controller 33 determines in step S2411 that the first access prohibition information 59b and the second access prohibition information 60d are in an OFF state.

When it is determined that the first access prohibition information 59b and the second access prohibition information 60d are in an ON state, and indicate the access prohibition, the process proceeds to step S2404.

When it is determined that the first access prohibition information 59b and the second access prohibition information 60d are in an OFF state, and indicate the access permission, the controller 33 turns ON the first access prohibition information 59b and the second access prohibition information 60d, in step S2412.

In step S2413, the controller 33 copies the data 58 of the wireless communication memory 37 to the file 56 of the nonvolatile memory 32, using the memory controller 35 and the communication controller 34.

In step S2414, the controller 33 turns OFF the communication storage information 60c.

In step S2415, the controller 33 sets the first mirroring result information 59c and the second mirroring result information 60e to 0, which indicates that the mirroring from the wireless communication memory 37 to the nonvolatile memory 32 is completed, by using the memory controller 35 and the communication controller 34.

In step S2416, the controller 33 changes the first access prohibition information 59b and the second access prohibition information 60d to an OFF state by using the memory controller 35 and the communication controller 34.

After step S2410 or step S2416, the controller 33 determines whether or not to continue the process, in step S2417.

If the process is not to be continued, the process ends; and if the process is to be continued, the process proceeds to step S2401.

Figure 25:
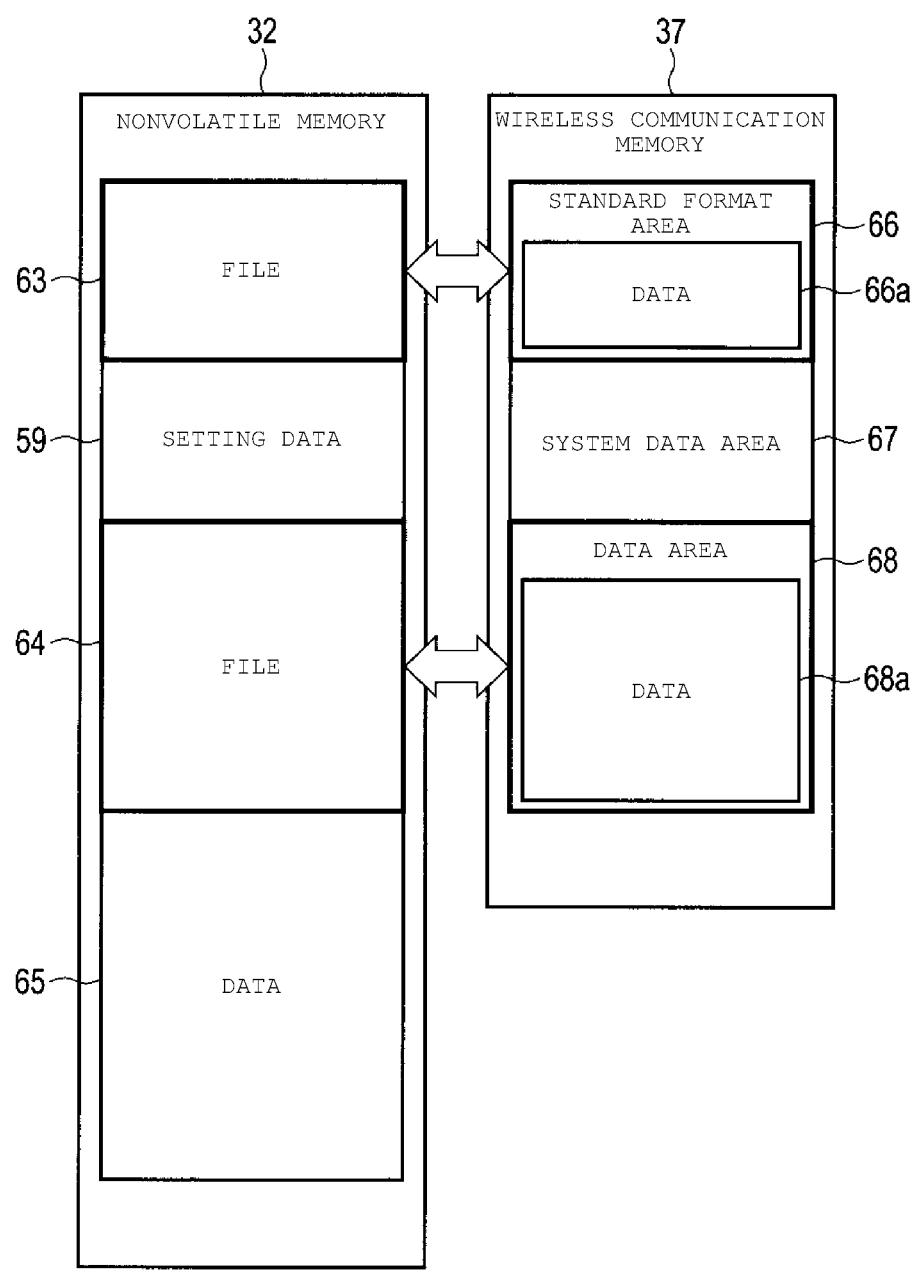
FIG. 25 illustrates a first example of data transferred through mirroring performed by the wireless storage apparatus according to the fifth embodiment.

FIG. 25 illustrates a first example of data transferred through the mirroring performed by the wireless storage apparatus 3 according to the present embodiment. FIG. 25 and FIG. 26 to FIG. 29 described below illustrate only a relationship between the nonvolatile memory 32 and the wireless communication memory for simplification.

For example, it is assumed that the capacity of the nonvolatile memory 32 is greater than the capacity of the wireless communication memory 37. The controller 33 performs mirroring between some files among files and data stored in the nonvolatile memory 32 and some pieces of data stored in the wireless communication memory 37.

In FIG. 25, the nonvolatile memory 32 stores a file 63, setting data 59, a file 64, and data 65.

The wireless communication memory 37 includes a standard format area 66, a system data area 67, and a data area 68.

In the present embodiment, the standard format area 66 stores data of a standard format that conforms to the wireless communication standard. For example, an NFC data exchange format (NDEF) is used as the standard format. The information processing apparatus 4 is able to automatically receive data (for example, a message code) stored in the standard format area 66 from the communication controller 34 through the wireless antenna 31, without executing a special application program, by performing wireless communication conforming to NFC.

The system data area 67 is, for example, an area to be used when software such as an operating system is executed.

The data area 68 is, for example, an area for storing user data or the like.

The setting data 59 includes one or a plurality of file names of mirroring targets, and includes the file name in the file 63 and the file name of the file 64 in the example in FIG. 25. In addition, the mirroring target data may be designated by another data ID which is not a file name, and may be designated by the address area.

The controller 33 performs mirroring between the file 63 and the data 66a of the standard format area 66, and mirroring between the file 64 and the data 68a of the data area 68, using the memory controller 35 and the communication controller 34.

In this manner, since the data 66a of the standard format area 66 is a mirroring target, the data 66a of the standard format area 66 can be rewritten from either the electronic apparatus 2 or the information processing apparatus 4.

It is possible to update the file 64 of the nonvolatile memory 32, for example, by using the data 68a such as log data or maintenance data received from the information processing apparatus 4 by wireless communication, by performing mirroring from the data 68a of the wireless communication memory 37 to the file 64 of the nonvolatile memory 32.

The information processing apparatus 4 is able to acquire the data 68a corresponding to the file 64 which is written from the electronic apparatus 2 by wireless communication, by performing mirroring from the file 64 of the nonvolatile memory 32 to the data 68a of the wireless communication memory 37.

Figure 26:
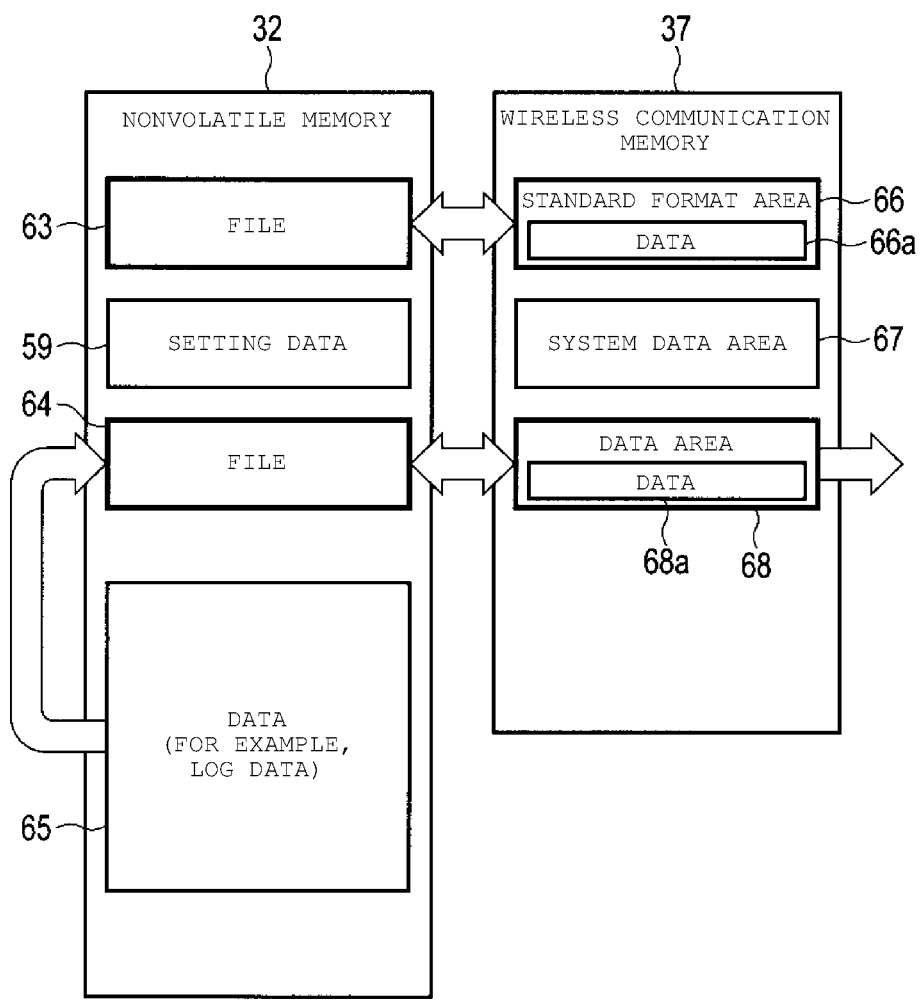
FIG. 26 illustrates a second example of data transferred through mirroring performed by the wireless storage apparatus according to the fifth embodiment.

FIG. 26 illustrates a second example of data transferred through mirroring performed by the wireless storage apparatus 3 according to the present embodiment. In FIG. 26, the controller 33 extracts data which is designated from the outside (for example, the electronic apparatus 2 or the information processing apparatus 4) or specific data, among a plurality of pieces of data stored in the nonvolatile memory 32, and executes a process of making the file 64 including the extracted data and the data 68a of the wireless communication memory 37 be the same as each other.

The controller 33 receives, for example, data 65 having a large data size such as log data from the electronic apparatus 2 through the connector 36, and stores the received data 65 in the nonvolatile memory 32 through the memory controller 35.

In the present embodiment, the setting data 59 includes designation of extracting for example, error log data or specific data such as an abnormal value from the data 65, and storing the extracted data in the file 64, and designation of the file 64 to a mirroring target.

The controller 33 extracts data that is designated by the setting data 59 from the data 65 of the nonvolatile memory 32, using the memory controller 35, and stores the extracted data in the file 64 that is designated by the setting data 59. The controller 33 stores data 68a corresponding to the file 64 that is designated by the setting data 59, in the data area 68 of the wireless communication memory 37, using the memory controller 35 and the communication controller 34. The communication controller 34 reads the data 68a of the wireless communication memory 37, and transmits the read data 68a to the information processing apparatus 4 through the wireless antenna 31 by wireless communication.

In FIG. 26, it is possible to designate mirroring target data by the electronic apparatus 2.

Further, the controller 33 is able to extract specific data from among data stored in the nonvolatile memory 32, through the memory controller 35, and store the extracted data in the file 64. The controller 33 is able to copy the file 64 including the extracted data to the data 68a of the wireless communication memory 37, by using the memory controller 35 and the communication controller 34. The designation of extraction of data and storing the extracted data in the file 64, and the designation of the file 64 to be mirrored by the controller 33 are included in the setting data 59. The controller 33 may receive the setting data 59 including the designation from the electronic apparatus 2 through the connector 36, and store the data in the nonvolatile memory 32 through the memory controller 35. The communication controller 34 may receive new setting data from the information processing apparatus 4 through the wireless antenna 31 by wireless communication, and store the data in the data 66a or the data 68a of the wireless communication memory 37. The controller 33 may copy the data 66a or the data 68a to the file 63 or the file 64 of the nonvolatile memory 32 by using the communication controller 34 and the memory controller 35, and reflect new setting data included in the file 63 or the file 64 in the setting data 59 of the nonvolatile memory 32.

Figure 27:
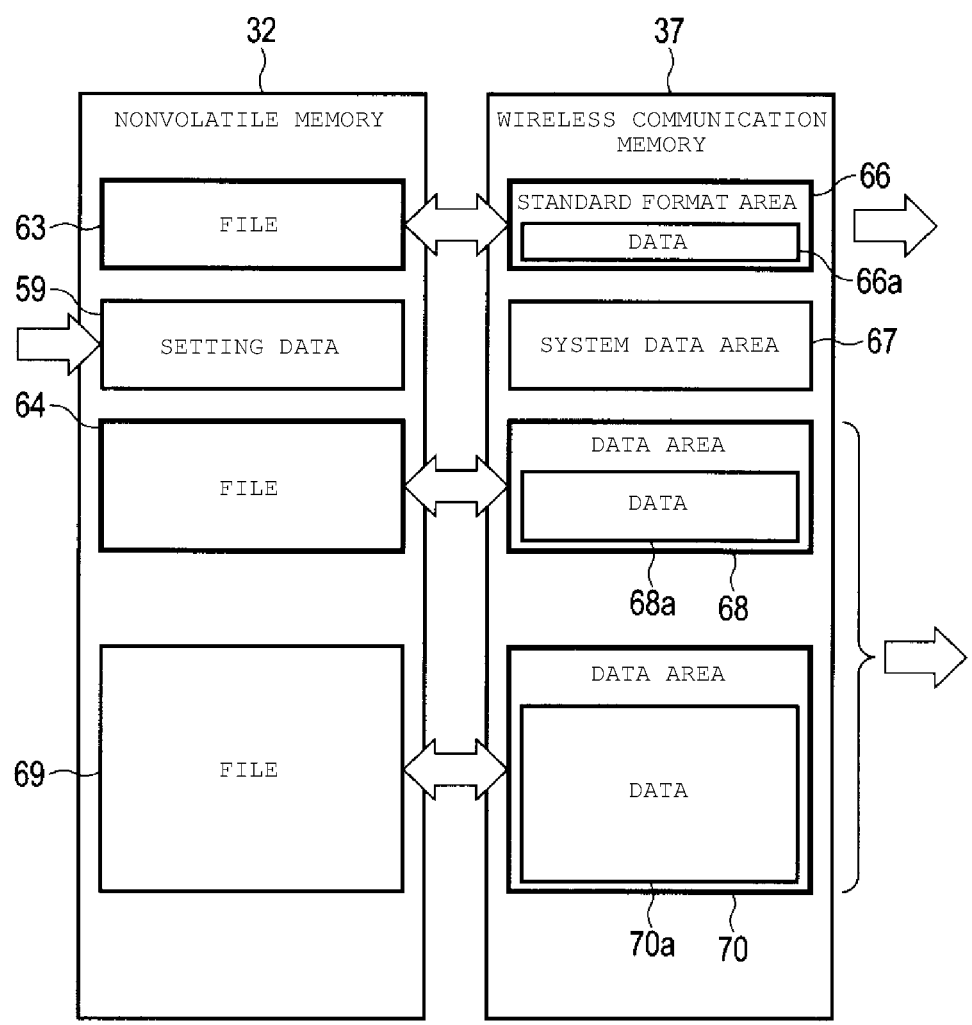
FIG. 27 illustrates a third example of data transferred through mirroring performed by the wireless storage apparatus according to the fifth embodiment.

FIG. 27 illustrates a third example of data transferred through mirroring performed by the wireless storage apparatus 3 according to the present embodiment.

The controller 33 receives the setting data 59 from the electronic apparatus 2 through the connector 36, and stores the received setting data 59 in the nonvolatile memory 32 through the memory controller 35.

The setting data 59 includes, for example, designation of mirroring target files 63, 64, and 69, and designation of a standard format area 66, a data area 68, and a data area 70 of the wireless communication memory 37 to be mirrored.

The standard format area 66, the data area 68, and the data area 70 are designated by, for example, the address information of the wireless communication memory 37. More specifically, the standard format area 66, the data area 68, and the data area 70 are designated by, for example, a memory block which is an erase unit.

Further, the setting data 59 designates which data is to be extracted and form the file 64, and which data is to be extracted and form the file 69, from data stored in the nonvolatile memory 32.

The controller 33 reads the setting data 59, forms the files 64 and 69 based on the setting data 59, and stores the formed files 64 and 69 in the nonvolatile memory 32, by using the memory controller 35. More specifically, for example, the controller 33 may search the nonvolatile memory 32, and store the searched data in any one of the mirroring target files 63, 64, and 69, by using the memory controller 35. The search condition in this case may be included in the setting data 59.

The controller 33 stores the data 66a, 68a, and 70a corresponding to the files 63, 64, and 69 which are designated by the setting data 59, in the standard format area 66 and the data areas 68 and 70 of the wireless communication memory 37, which are designated in the setting data 59, by using the memory controller 35 and the communication controller 34.

The information processing apparatus 2 receives the data 66a, 68a, and 70a which are stored in the standard format area 66 and the data areas 68 and 70 of the wireless communication memory 37 through the communication controller 34 and the wireless antenna 31 through the wireless communication.

The files 64 and 69 are not formed by the controller 33, but may be stored from the electronic apparatus 2 through the connector 36, the controller 33, and the memory controller 35.

In FIG. 27, it is possible to designate the mirroring target data by the electronic apparatus 2.

The setting data 59 is able to designate the mirroring target files 63, 64, and 69 on the nonvolatile memory 32 side and the standard format area 66 and the data areas 68 and 70 which are mirroring targets on the wireless communication memory 37. Therefore, it is possible to freely set the mirroring target data and the number thereof.

Figure 28:
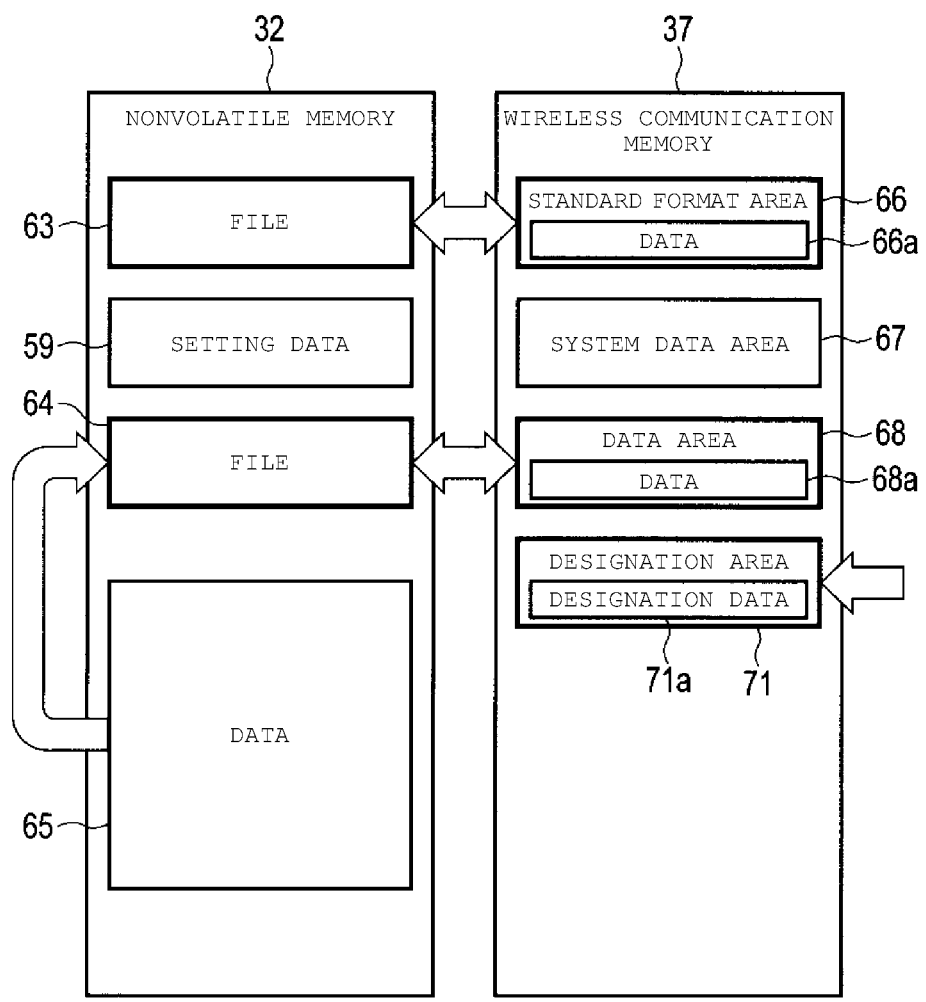
FIG. 28 illustrates a fourth example data transferred through of mirroring performed by the wireless storage apparatus according to the fifth embodiment.

FIG. 28 illustrates a fourth example of data transferred through mirroring performed by the wireless storage apparatus 3 according to the present embodiment.

The wireless communication memory 37 includes a designation area 71.

The information processing apparatus 4 transmits designation data 71a to the wireless storage apparatus 3 by wireless communication.

The communication controller 34 receives the designation data 71a from the information processing apparatus 4 through the wireless antenna 31, and stores the received designation data 71a in the designation area 71 of the wireless communication memory 37.

The designation data 71a designates that the data 65 or data extracted from the data 65 is to be stored in the mirroring target file 64.

The controller 33 reads the designation data 71a in the wireless communication memory 37 through the communication controller 34. The controller 33 adds the data 65 or the data extracted from the data 65 which are stored in the nonvolatile memory 32 and designated by the designation data 71a to the mirroring target file 64, through the memory controller 35.

The controller 33 stores data 68a corresponding to the file 64 of the nonvolatile memory 32, in the data area 68 of the wireless communication memory 37, through the mirroring, using the memory controller 35 and the communication controller 34.

In FIG. 28, it is possible to designate mirroring target data by the information processing apparatus 4.

Figure 29:
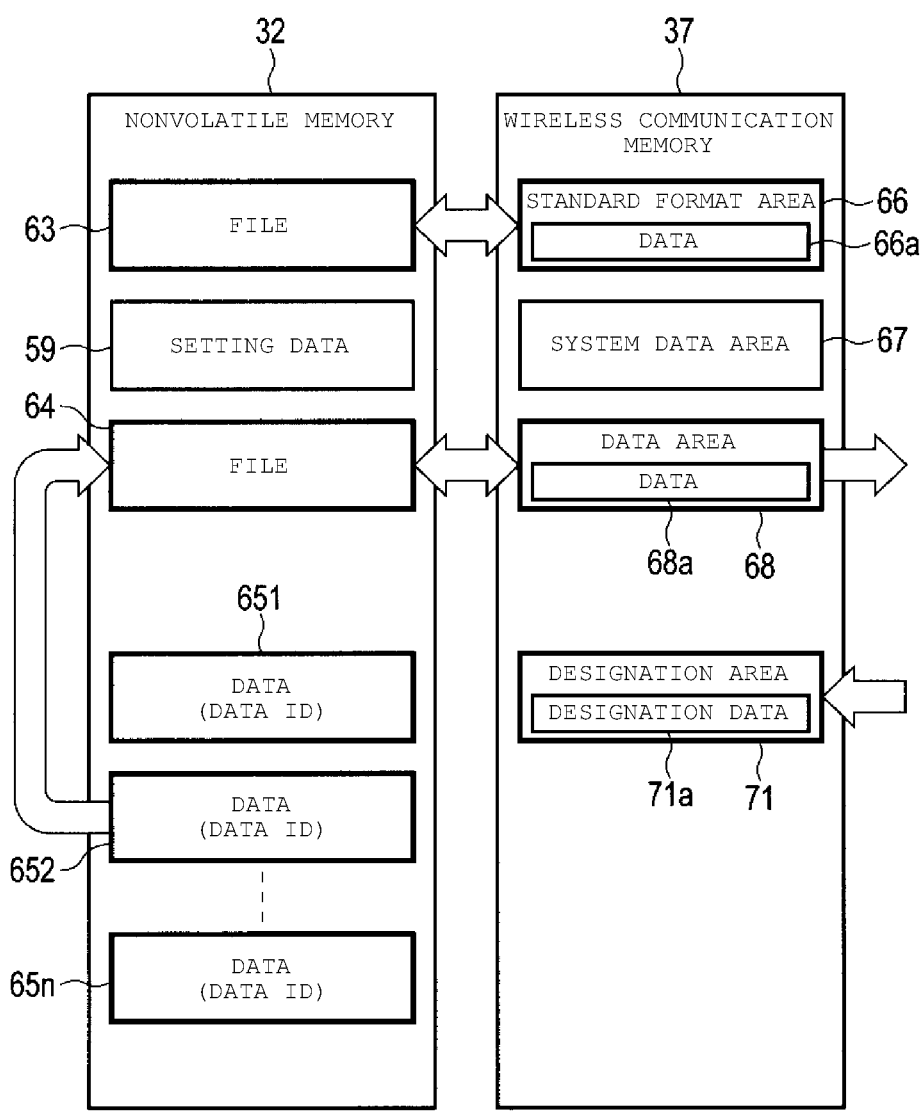
FIG. 29 illustrates a fifth example of data transferred through mirroring performed by the wireless storage apparatus according to the fifth embodiment.

FIG. 29 illustrates a fifth example of data transferred through mirroring performed by the wireless storage apparatus 3 according to the present embodiment.

The nonvolatile memory 32 stores data 651 to 65n corresponding to the unique data ID.

The communication controller 34 receives designation data 71a from the information processing apparatus 4 through the wireless antenna 31, and stores the received designation data 71a in the designation area 71 of the wireless communication memory 37.

The designation data 71a designates that the data 652 corresponding to a specific data ID is to be included in the mirroring target file 64. In addition, the designation data 71a may designate other IDs such as a user ID, a data name, or a file name, instead of the data ID.

The controller 33 reads the designation data 71a in the wireless communication memory 37 through the communication controller 34. The controller 33 adds the data 652 corresponding to the data ID which is stored in the nonvolatile memory 32 and designated by the designation data 71a to the mirroring target file 64, through the memory controller 35.

The controller 33 stores data 68a corresponding to the file 64 of the nonvolatile memory 32, in the data area 68 of the wireless communication memory 37, through the mirroring, using the memory controller 35 and the communication controller 34.

In FIG. 29, it is possible to designate mirroring target data by the information processing apparatus 4.

For example, the data pieces 651 to 65n are coupon information for n users. In this case, since the designation data 71a stored in the wireless communication memory 37 designates the coupon information of a specific user, it is possible to wirelessly communicate the coupon information of the specific user from the wireless storage apparatus 3 to the information processing apparatus 4.

According to the present embodiment described above, the wireless storage apparatus 3 includes the nonvolatile memory 32 and the wireless communication memory 37. If the wireless storage apparatus 3 is supplied with power from the electronic apparatus 2, the wireless storage apparatus 3 mirrors data between the nonvolatile memory 32 and the wireless communication memory 37. This enables the transmission and reception of data between the electronic apparatus 2 and the information processing apparatus 4. For example, the information processing apparatus 4 can access the data 58 corresponding to the file 56 of the nonvolatile memory 32, and the electronic apparatus 2 can update the data 58 of the wireless communication memory 37. The wireless storage apparatus 3 can be used for, for example, maintenance of industrial equipment, management of health appliances and promotional coupon information, or management of a smart poster.

According to the present embodiment, the user can easily check the data stored in the nonvolatile memory 32 of the wireless storage apparatus 3. Further, the user can easily update the data stored in the wireless communication memory 37.

According to the present embodiment, the electronic apparatus 2 can designate the mirroring target file 56, by rewriting the file name 59a of the setting data 59 of the nonvolatile memory 32. Since the information processing apparatus 4 rewrites the designation data 61 of the wireless communication memory 37 by wireless communication, and the controller 33 rewrites the file name 59a of the nonvolatile memory 32 according to the designation data 61, such that it is possible to designate the mirroring target file 56.

According to the present embodiment, whether or not the access to the nonvolatile memory 32 and the access to the wireless communication memory 37 are possible is managed by the first access prohibition information 59b and the second access prohibition information 60d. Therefore, in the present embodiment, even if the file 56 is stored from the electronic apparatus 2 to the wireless storage apparatus 3 and the data 58 is stored from the information processing apparatus 4 to the wireless storage apparatus 3 by wireless communication, it is possible to prevent the file 56 and the data 58 from being damaged.

According to the present embodiment, it is possible to set a plurality of pieces of files or data as mirroring targets.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of changing a lock state of a storage device, comprising:
    wirelessly transmitting a lock state inquiry to a storage device;
    wirelessly receiving lock state information from the storage device in response to the lock state inquiry, the lock state information indicating a present lock state of the storage device; and
    wirelessly transmitting a lock state change instruction to the storage device, wherein
    the storage device includes:
        an antenna to receive the transmission of the lock state inquiry;
        a connector to electrically connect to a host device;
        a first nonvolatile memory storing lock state information that is accessible using power generated at the antenna by electromagnetic induction caused by the transmission of the lock state inquiry;
        a second nonvolatile memory separate from the first nonvolatile memory, the second nonvolatile memory being configured to operate on power supplied from the host device via the connector;
        a first controller connected to the antenna and configured to operate on the power generated at the antenna to change the lock state information stored in the first nonvolatile memory in response to the lock state change instruction; and
        a second controller configured to control access by the host device to the second nonvolatile memory through the connector according to the lock state information stored in the first nonvolatile memory.

2. The method according to claim 1, wherein the second controller allows the host device to access the second nonvolatile memory when the lock state information indicates that storage device is unlocked and denies access to the second nonvolatile memory when the lock state information indicates that the storage device is locked.

3. The method according to claim 2, wherein
    the access includes reading of data from storage device, and
    the second controller allows writing of data to storage device even when the lock state information indicates that the storage device is locked.

4. The method according to claim 1, wherein
    the first nonvolatile memory further stores a change condition required to be met to permit a change in the lock state information, and
    the lock state change instruction includes condition information for meeting the change condition.

5. The method according to claim 4, wherein the change condition relates to one of a time, an identification of an external device, a user identification, a passcode, or an encryption key.

6. The method according to claim 4, wherein the condition information is provided as flag information indicating the change condition has been met.

7. The method according to claim 4, wherein
    the first nonvolatile memory stores automatic lock information,
    the first controller changes the automatic lock information to an automatic lock state when an access request from the host device that is physically connected to the connector meets a predetermined condition.

8. The method according to claim 1, further comprising:
    returning dummy data in response to an access request from the host device when the lock state information stored in the first nonvolatile memory indicates the second nonvolatile memory is not accessible by the host device.

9. The method according to claim 1, further comprising:
    in response to an access request from the host device for a first memory region of the second nonvolatile memory, returning data stored in a second memory region of the second nonvolatile memory that is different from the first memory region if the lock state information stored in the first nonvolatile memory indicates the second nonvolatile memory is not accessible by the host device.

10. The method according to claim 1, wherein the wireless transmissions conform to a short-range wireless communication standard.

11. The method according to claim 1, wherein the storage device is an SD card.

12. The method according to claim 1, wherein the storage device is a USB device.

13. The method according claim 1, wherein the host device is a personal computer.

14. The method according to claim 1, wherein the host device is an electronic device.

15. The method according to claim 1, wherein the lock change instruction is transmitted by a smartphone.

16. A method of changing a lock state of a storage device, comprising:
    wirelessly transmitting a lock state inquiry from a smartphone to a storage device;
    wirelessly receiving lock state information with the smartphone from the storage device in response to the lock state inquiry, the lock state information indicating a present lock state of the storage device; and
    wirelessly transmitting a lock state change instruction from the smartphone to the storage device, wherein
    the storage device includes:
        an antenna to receive the transmission of the lock state inquiry;
        a connector to electrically connect to a host device;
        a first nonvolatile memory storing lock state information that is accessible using power generated at the antenna by electromagnetic induction caused by the transmission of the lock state inquiry;
        a second nonvolatile memory separate from the first nonvolatile memory, the second nonvolatile memory being configured to operate on power supplied from the host device via the connector;
        a first controller connected to the antenna and configured to operate on the power generated at the antenna to change the lock state information stored in the first nonvolatile memory in response to the lock state change instruction; and
        a second controller configured to control access by the host device to the second nonvolatile memory through the connector according to the lock state information stored in the first nonvolatile memory.

17. The method according to claim 16, wherein the wireless transmissions conform to a short-range wireless communication standard.

18. The method according to claim 16, wherein the storage device is an SD card.

19. The method according to claim 16, wherein the storage device is a USB device.

* * * * *